US009857610B2

(12) United States Patent
Arimoto et al.

(10) Patent No.: US 9,857,610 B2
(45) Date of Patent: Jan. 2, 2018

(54) OPTICAL MODULATOR AND METHOD FOR MANUFACTURING SAME

(71) Applicant: HITACHI, LTD., Chiyoda-ku, Tokyo (JP)

(72) Inventors: Hideo Arimoto, Tokyo (JP); Kazuki Tani, Tokyo (JP); Takashi Takahama, Tokyo (JP); Daisuke Ryuzaki, Tokyo (JP); Yoshitaka Sasago, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/311,434

(22) PCT Filed: Jun. 19, 2014

(86) PCT No.: PCT/JP2014/066239
§ 371 (c)(1),
(2) Date: Nov. 15, 2016

(87) PCT Pub. No.: WO2015/194002
PCT Pub. Date: Dec. 23, 2015

(65) Prior Publication Data
US 2017/0082877 A1 Mar. 23, 2017

(51) Int. Cl.
*G02F 1/025* (2006.01)
*G02F 1/225* (2006.01)
(Continued)

(52) U.S. Cl.
CPC ............ *G02F 1/025* (2013.01); *G02F 1/2257* (2013.01); *G02F 2001/0151* (2013.01); *G02F 2001/212* (2013.01); *G02F 2202/104* (2013.01)

(58) Field of Classification Search
CPC .................. G02F 1/025; G02F 1/2257; G02F 2001/0151; G02F 2001/0154; G02F 2001/104; G02F 2001/212
(Continued)

(56) References Cited

U.S. PATENT DOCUMENTS 7,283,690 B2 * 10/2007 Komura ................. G02B 6/125
385/40
8,450,186 B2 5/2013 Rong et al.
(Continued)

FOREIGN PATENT DOCUMENTS

JP 2006-301379 * 11/2006 ............ G02F 1/025
JP 2006-301379 A 11/2006
(Continued)

OTHER PUBLICATIONS

S. Akiyama et al., "12.5-Gb/s operation of efficient silicon modulator using side-wall grating waveguide," 8th IEEE International Conference on Group IV Photonics, London, 2011, pp. 14-16.*
(Continued)

*Primary Examiner* — Akm Enayet Ullah
*Assistant Examiner* — Michael Mooney
(74) *Attorney, Agent, or Firm* — Miles & Stockbridge P.C.

(57) ABSTRACT

In an optical modulator 115 of an embodiment, an optical waveguide core 121 is configured from an $n^-$ type semiconductor region 134, a gate insulating film 136 on the $n^-$ type semiconductor region 134, and a $p^-$ type semiconductor region 137 on the gate insulating film 136. Further, a width W1 of the $n^-$ type semiconductor region 134 and a width W1 of the $p^-$ type semiconductor region 137 are equally formed and are layered without being shifted. Therefore, an optical modulator having stable optical characteristics can be provided.

7 Claims, 40 Drawing Sheets

(51) Int. Cl.
*G02F 1/015* (2006.01)
*G02F 1/21* (2006.01)

(58) Field of Classification Search
USPC ........................................ 385/1–10, 129–132
See application file for complete search history.

(56) References Cited

U.S. PATENT DOCUMENTS

| | | | |
|---|---|---|---|
| 8,909,021 | B2 | 12/2014 | Saito et al. |
| 9,454,059 | B1 * | 9/2016 | Nagarajan .............. H04B 10/25 |
| 2007/0058896 | A1 * | 3/2007 | Toyoda .............. G02B 6/12011 |
| | | | 385/3 |
| 2011/0073989 | A1 | 3/2011 | Rong et al. |
| 2012/0033910 | A1 | 2/2012 | Morini et al. |
| 2012/0288228 | A1 | 11/2012 | Saito et al. |

FOREIGN PATENT DOCUMENTS

| | | |
|---|---|---|
| JP | 2012-027198 A | 2/2012 |
| JP | 2012-521576 A | 9/2012 |
| JP | 2013-505485 A | 2/2013 |
| WO | WO 2011/092861 A1 | 8/2011 |

OTHER PUBLICATIONS

S. Akiyama et al., "Compact PIN-Diode-Based Silicon Modulator Using Side-Wall-Grating Waveguide," in IEEE Journal of Selected Topics in Quantum Electronics, vol. 19, No. 6, pp. 74-84, Nov.-Dec. 2013.*

Akiyama, S. et al.; "12.5-Gb/s Operation of Efficient Silicon Modulator Using Side-Wall Grating Waveguide"; pp. 14-16; 2011; IEEE.

Akiyama; S. et al.; "Compact PIN-Diode-Based Silicon Modulator Using Side-Wall-Grating Waveguide"; vol. 19; No. 6; Nov./Dec. 2013; IEEE Journal of Selected Topics in Quantum Electronics.

* cited by examiner

OPTICAL MODULATOR AND METHOD FOR MANUFACTURING SAME

TECHNICAL FIELD

The present invention relates to an optical modulator for converting an electrical signal modulated to a high speed of 10 Gbps into an optical signal, and a method of manufacturing the same, and especially relates to a Mach-Zehnder-type modulator and a method of manufacturing the same.

BACKGROUND ART

As a background art of the field of the present technology, there is JP 2013-505485 A (PTL 1). This publication describes an optical modulator using a wafer bonding technology.

Further, WO 2011/092861 A (PTL 2) describes an optical element having an uneven side wall flattened in an atomic level, formed on a silicon substrate through a buried oxide film, and in which orientation of a surface of a silicon optical waveguide is a (110) plane and orientation of the side wall is a (111) plane, in order to provide a silicon optical waveguide with a less optical loss and without polarization dependency.

Further, "12.5-Gb/s Operation of Efficient Silicon Modulator Using Side-Wall Grating Waveguide" (NPL 1) discloses a Mach-Zehnder-type modulator including a sidewall grating waveguide.

CITATION LIST

Patent Literature

PTL 1: JP 2013-505485 A
PTL 2: WO 2011/092861 A

Non-Patent Literature

NPL 1: S. Akiyama, "12.5-Gb/s Operation of Efficient Silicon Modulator Using Side-Wall Grating Waveguide" (WA4) Proceeding of 8th IEEE International Conference on Group IV Photonics (GFP 2011).

SUMMARY OF INVENTION

Technical Problem

Interconnect capacitance in an information device such as a router or a server is increasing year by year. Conventionally, electrical interconnect has been used. To realize larger interconnect capacitance, optical interconnect is desirable. As a technology to realize the optical interconnect, optical transmitter/receiver using silicon photonics have been developed.

In the silicon photonics, a small optical modulator with a small optical loss is required to decrease the size and save power of the optical transmitter. Typically, a Mach-Zehnder-type structure is used and a high-speed electrical modulation signal is applied to a branched optical waveguide, so that a refractive index of the optical waveguide is adjusted, and the electrical modulation signal is converted into a high-speed optical modulation signal. As a structure to highly efficiently change the refractive index of the optical waveguide with respect to the electrical modulation signal, there is a metal oxide semiconductor (MOS)-type structure. Typically, one side of a semiconductor in contact with a gate oxide film of the MOS is crystal silicon and the other one side is polycrystal silicon. Since the polycrystal silicon is configured from a plurality of silicon crystals, an optical loss of light passing through the polycrystal silicon becomes large, and the loss is about 10 dB/mm.

PTL 1 discloses, as a technology to solve the above problem, a technology to decrease the optical loss by using the crystal silicon in place of the polycrystal silicon. As illustrated in FIGS. 2 and 3, in PTL 1, a wafer bonding technology is used. FIG. 5 of PTL 1 illustrates a MOS capacitor optical modulation device 500. A BOX insulating film 565 is formed on a silicon substrate 570. A silicon layer 575 including a dummy silicon region 545, a high-concentration doping n++ region 555, an n-type silicon semiconductor region 550, and an insulating region 567 is formed on the BOX insulating film 565. A crystal silicon layer 580 including a p-type silicon semiconductor region 535, and a high-concentration doped p++-type region 530 is formed on the silicon layer 575 through an oxide layer 540. The oxide layer 540 is an oxide layer formed between the crystal silicon layer 580 and the silicon layer 575 using the wafer bonding technology. Further, the oxide layer 540 is a gate oxide film having the MOS capacitor structure of the optical modulation device 500, and the silicon layer 575 and the crystal silicon layer 580 include a channel that forms an optical modulation waveguide 585.

Here are two problems. One of the problems is bonding defect of an interface caused by insufficiency of flatness and deterioration of modulation efficiency of the modulator associated with the bonding defect. Flattening of a surface of the silicon layer 575 before bonding is difficult, and fine unevenness exists in the surface. This is because the n-type silicon layer 550 having low doping concentration and the insulating region 567 that are made of different materials (substances) exist on the surface of the silicon layer 575. Even if the silicon layer 575 having the unevenness is bonded to the crystal silicon layer 580, a gap is caused between the n-type silicon layer 550 and the oxide layer 540, or between the p-type silicon semiconductor region 535 and the oxide layer 540, and a voltage more than desired needs to be applied between the MOS capacitors, and the modulation efficiency of the modulator is deteriorated.

The second problem is that controllability of the width of the waveguide is low because the wafer bonding technology is used. As illustrated in FIG. 5 of PTL 1, since the silicon layer 575 on which the n-type silicon layer 550 is formed and the crystal silicon layer 580 on which the p-type silicon semiconductor region 535 is formed are bonded, a distance between a left end of the n-type silicon layer 550 and a right end of the p-type silicon semiconductor region 535 is substantially changed, and optical characteristics of the modulator cannot be stabilized.

Other problems and new characteristics will become clear from the description of the present specification and the drawings.

Solution to Problem

To solve the above problem, in an optical modulator of the present invention, an optical waveguide core is made of a first conductivity type first crystal silicon layer, a second conductivity type second crystal silicon layer, and a gate insulating film lying between the first crystal silicon layer and the second crystal silicon layer, and the first crystal silicon layer and the second crystal silicon layer have an equal width and are laminated without being shifted.

Advantageous Effects of Invention

According to the invention, an optical modulator with stable optical characteristics can be provided.

The above-described problems, configurations, and effects will become clear from description of embodiments below.

DESCRIPTION OF EMBODIMENTS

Figure 1:
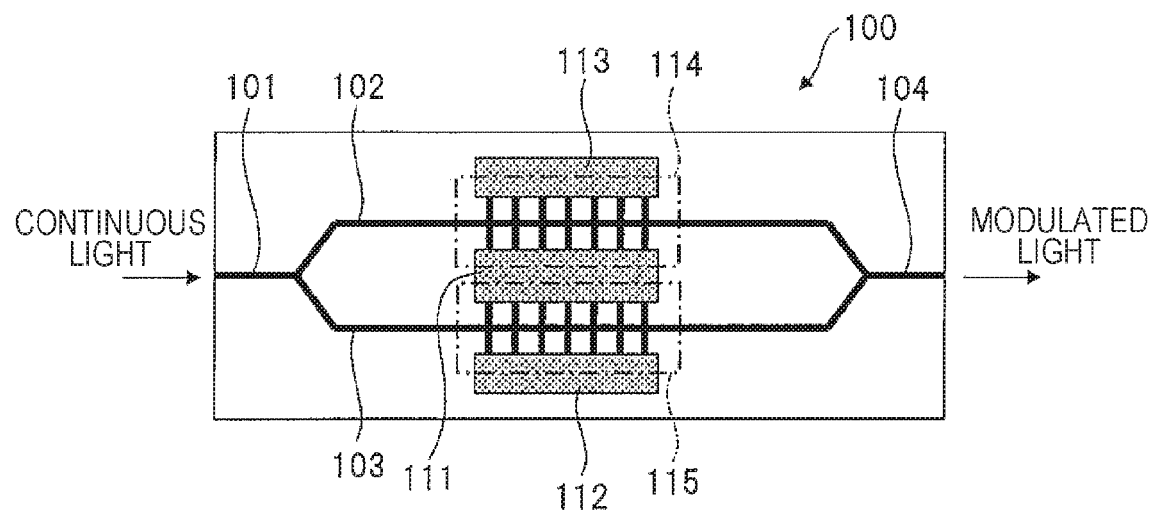
FIG. 1 is a top view of a Mach-Zehnder-type modulator according to a first embodiment.

Hereinafter, embodiments of the present invention will be specifically described in detail. Note that, in all of the drawings for describing the embodiments, members having the same function are denoted with the same reference sign, and repetitive description is omitted. Further, the description of the embodiments will be merely given, and a size in the drawings and a scale described in the embodiment are not necessarily matched.

First Embodiment

Figure 2:
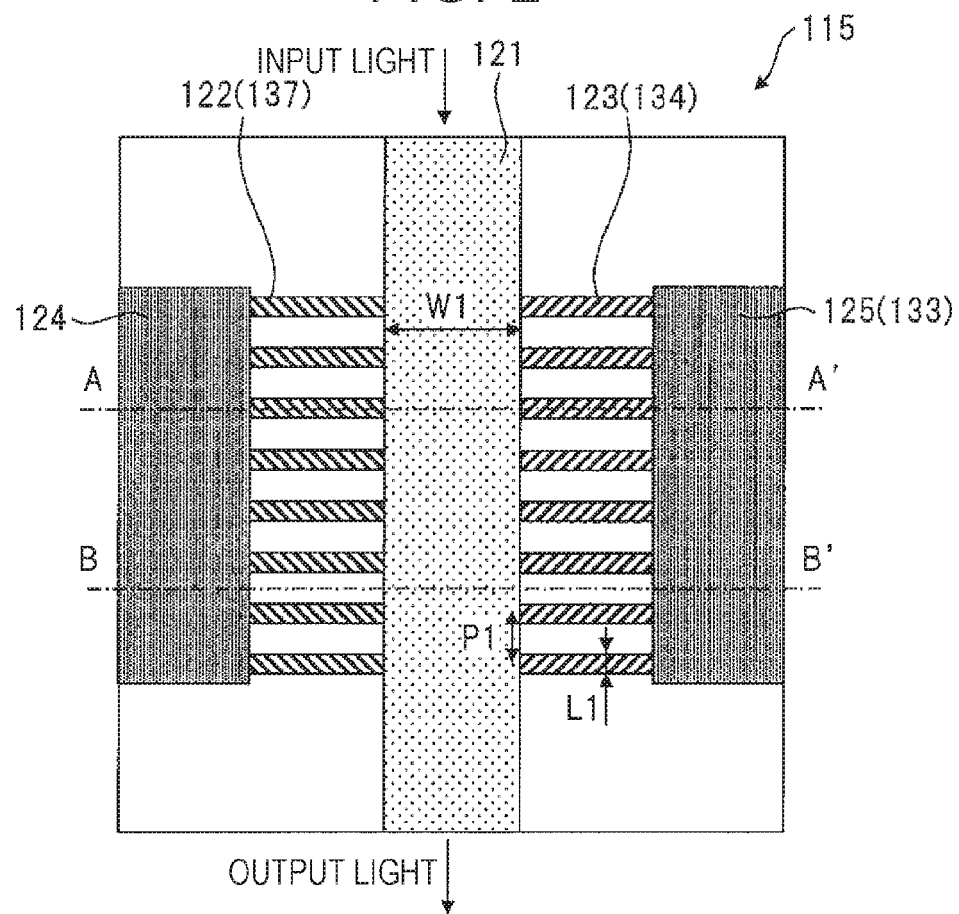
FIG. 2 is a principal portion plan view of an optical modulator according to the first embodiment.
Figure 3:
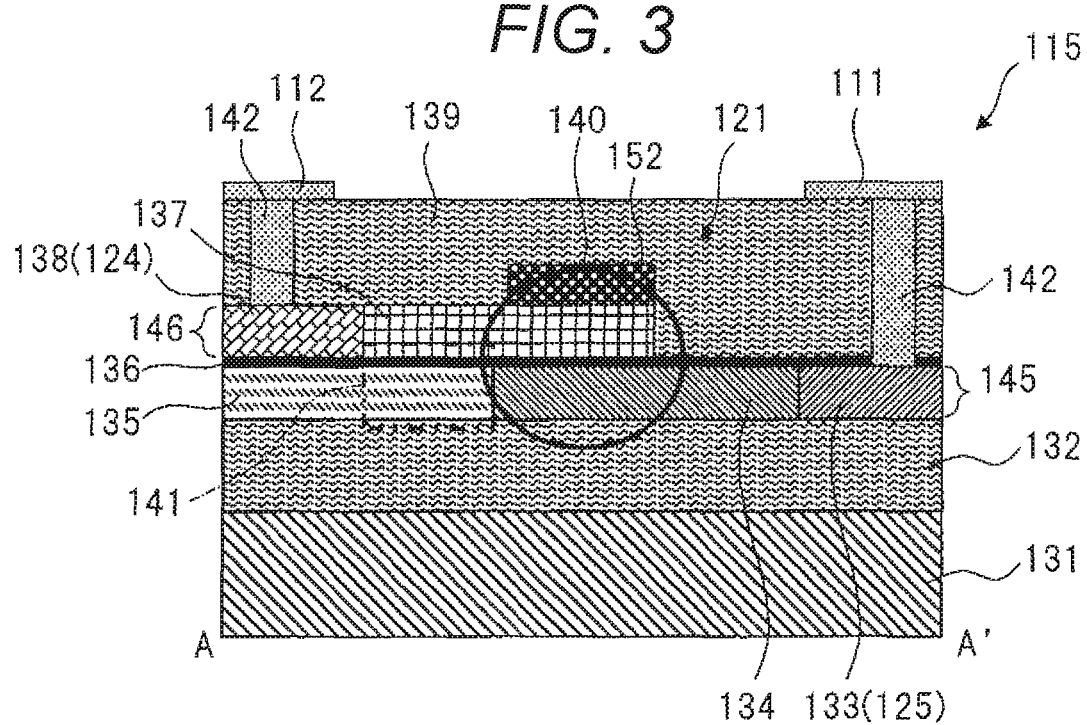
FIG. 3 is a principal portion sectional view along an A-A' line of FIG. 2.
Figure 4:
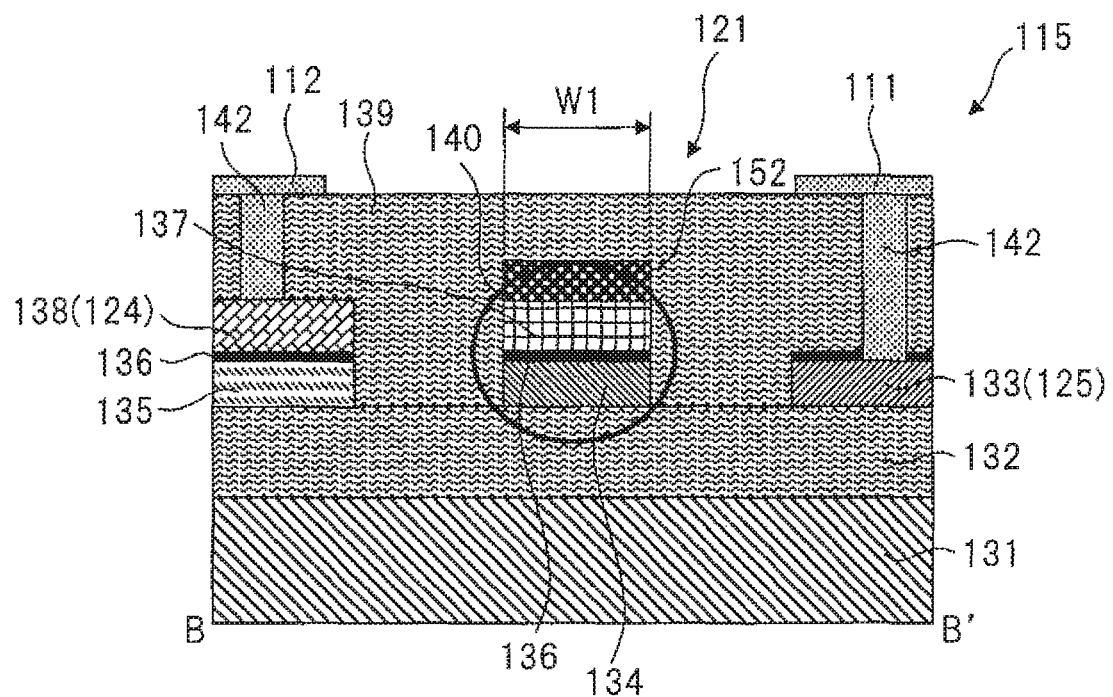
FIG. 4 is a principal portion sectional view along a B-B' line of FIG. 2.

FIG. 1 is a top view of a Mach-Zehnder-type modulator according to a first embodiment, FIG. 2 is a principal portion plan view of an optical modulator 115, FIG. 3 is a principal portion sectional view along an A-A' line of FIG. 2, FIG. 4 is a principal portion sectional view along a B-B' line of FIG. 2, and FIGS. 5 to 14 are principal portion plan views or principal portion sectional views during a process of manufacturing the optical modulator 115 of the first embodiment.

As illustrated in FIG. 1, an optical waveguide 101 is branched into an optical waveguide 102 and an optical waveguide 103. The optical waveguides 102 and 103 are connected to optical modulators 114 and 115, and are merged in an optical waveguide 104. In the optical modulators 114 and 115, refractive indexes of the optical waveguides are changed according to voltages (electrical signals) respectively applied between electrodes 111 and 113, and between electrodes 111 and 112. As a result, an interference state of light multiplexed in the optical waveguide 104 is changed, and a signal with modulated intensity is obtained.

As illustrated in FIG. 2, an optical waveguide core 121 is arranged in a central portion of the optical modulator 115. The optical waveguide core 121 extends along an extending direction of the waveguide 103 of FIG. 1, and input light from the waveguide 103 to the optical modulator 115 passes through the optical waveguide core 121 and is output to the waveguide 103 as output light. A width W1 of the optical waveguide core 121 is set to 400 nm, and a left pad 124 and a right pad 125 extend on both sides of the optical waveguide core 121 along an extending direction of the optical waveguide core 121. Although not illustrated in FIG. 2, the electrodes 111 and 112 are respectively arranged on the right pad 125 and the left pad 124, and are electrically connected with the right pad 125 and the left pad 124. A plurality of right fins 123 is arranged between the optical waveguide core 121 and the right pad 125, and electrically connects the optical waveguide core 121 and the right pad 125. Further, a plurality of left fins 122 is arranged between the optical waveguide core 121 and the left pad 124, and electrically connects the optical waveguide core 121 and the left pad 124. That is, the voltages applied to the electrodes 111 and 112 are applied to the optical waveguide core 121 through the pad (the right pad 125 or the left pad 124) and the fins (the right fins 123 or the left fins 122). The plurality of right fins 123 is arranged with a width L1 of 60 nm and at a pitch P1 of 240 nm. The plurality of left fins 122 is arranged with a similar width and at a similar pitch. The right fins 123 and the left fins 122 extend to the right and left from equal positions in the extending direction of the optical waveguide core 121.

As illustrated in FIG. 3, a buried insulating layer 132 is formed on a silicon substrate 131. The buried insulating layer 132 is made of a silicon oxide film or the like. A first silicon layer 145, a gate insulating film 136, and a second silicon layer 146 are formed in order on the buried insulating film 132. The first silicon layer 145 is provided with an $n^+$ semiconductor region 133 containing n-type impurities in high concentration, an $n^-$ semiconductor region 134 containing the n-type impurities in lower concentration than the $n^+$ semiconductor region 133, and a high resistance region 135 containing lower-concentration impurities than the $n^-$ semiconductor region 134. The gate insulating film 136 is made of a silicon oxide film ($SiO_2$). However, the gate insulating film 136 may be another dielectric such as a hafnium oxide ($HfO_2$).

The second silicon layer 146 is formed on the first silicon layer 145, having the gate insulating film 136 lie therebetween. The second silicon layer 146 is provided with a $p^+$ semiconductor region 138 containing p-type impurities in high concentration and a $p^-$ semiconductor region 137 containing the p-type impurities in lower concentration than the p+ semiconductor region 138. In plan view, a region where the three regions including the n− semiconductor region 134, the gate insulating film 136, and the p− semiconductor region 137 are layered is the region of the optical waveguide core 121, and the optical waveguide core 121 is configured from a laminated structure of the n− semiconductor region 134, the gate insulating film 136, and the p− semiconductor region 137. Further, the n+ semiconductor region 133 corresponds to the right pad 125, and the p+ semiconductor region 138 corresponds to the left pad 124. The n− semiconductor region 134 that configures the optical waveguide core 121 is in contact with the n+ semiconductor region 133, and the p− semiconductor region 137 is in contact with the p+ semiconductor region 138. That is, a part of the n− semiconductor region 134 configures the right fins 123, and a part of the p− semiconductor region 137 configures the left fins 122.

A core forming mask 152 is arranged on the p− semiconductor region 137, and one end (side wall) of the p− semiconductor region 137 accords with one end (side wall) of the core forming mask 152. An interlayer insulating film 139 is formed to coat the second silicon layer 146, and the electrodes 111 and 112 are formed on the interlayer insulating film 139. The electrode 111 is electrically connected with the n+ semiconductor region 133 through a conductor plug 142 formed in the interlayer insulating film 139. Similarly, the electrode 112 is electrically connected with the p+ semiconductor region 138 through the conductor plug 142 formed in the interlayer insulating film 139. The interlayer insulating film 139 is made of a silicon oxide film, for example.

As illustrated in FIG. 3, the high resistance region 135 is arranged adjacent to the n− semiconductor region 134 that configures the optical waveguide core 121, whereby the capacitance connected to the optical waveguide core 121 can be reduced, and the response speed of the optical modulator 114 can be improved. For example, in a case where the n− semiconductor region 134 that configures the optical waveguide core 121 extends to a region 141 surrounded by the one-dot chain line of FIG. 3, the capacitance configured from the n− semiconductor region 134, the gate insulating film 136, and the p− semiconductor region 137 in the region 141 is connected in parallel to the capacitance configured from the n− semiconductor region 134, the gate insulating film 136, and the p− semiconductor region 137 in the optical waveguide core 121, and the response speed of the optical modulator 114 is decreased. In the first embodiment, the region 141 adjacent to the optical waveguide core 121 and layered with the p− semiconductor region 137 serving as the left fins 122 is the high resistance region 135, whereby the response speed of the optical modulator 114 can be improved.

Here, the high resistance region 135 has resistivity of 100 Ωcm, for example. However, important things are that the high resistance region 135 has sufficiently higher resistance than the adjacent n− semiconductor region 134 and is not conducted with the n− semiconductor region 134. Note that the resistivity of the n− semiconductor region 134 is about $10^{-1}$ cm, and it can be said that the high resistance region 135 is not conducted with the n− semiconductor region 134 if the resistivity of the high resistance region 135 is 100 times or more, desirably, 1000 times or more of the resistivity of the n− semiconductor region 134.

Next, as illustrated in FIG. 4, the optical waveguide core 121 with the width W1 is formed on the buried insulating film 132. Although it will become clear in the manufacturing method described below, the width of the n− semiconductor region 134, the gate insulating film 136, and the p− semiconductor region 137 that configure the optical waveguide core 121 is equal to the width W1 of the core forming mask 152.

Further, the optical waveguide core 121 is configured from a laminated structure of the n− semiconductor region 134 configured from the first silicon layer 145 and the p− semiconductor region 137 configured from the gate insulating film 136 and the second silicon layer 146. Then, right and left both sides of the optical waveguide core 121 are coated with the interlayer insulating film 139 having a smaller refractive index than the silicon layers. Note that the refractive index of silicon is about 4.0 and the refractive index of a silicon oxide film is about 1.5. In FIGS. 3 and 4, a region in which light is propagated in the optical modulator 114 is indicated by an optical waveguide 140.

In the cross section along the B-B' line of FIG. 2, illustrated in FIG. 4, the right and left both sides of the optical waveguide core 121 have a structure coated with the interlayer insulating film 139 made of a silicon oxide film having a smaller refractive index than the silicon layer, and thus a light propagation mode is formed. However, in the cross section along the A-A' line of FIG. 2, illustrated in FIG. 3, the left fins 122 (in other words, the p− semiconductor region 137 made of the second silicon layer) are connected to the optical waveguide core 121, and thus the optical propagation mode is not formed. That is, the light propagation mode is not formed in the region where the right fins 123 or the left fins 122 are formed, but the light propagation mode is formed in the region where the right fins 123 or the left fins 122 are not formed, for the optical waveguide core 121. By alternately arranging the region where the light propagation mode is formed and the region where the light propagation mode is not formed, and setting the length of the region where the light propagation mode is formed to be longer than the length of the region where the light propagation mode is not formed, the light can be propagated in the optical modulator 115. This is disclosed in NPL 1 as a structure called side-wall grating structure. In the first embodiment, upper and lower regions of the gate insulating film 136 are formed of the n− semiconductor region 134 in low concentration formed in the first silicon layer and the p− semiconductor region 137 in low concentration formed in the second silicon layer, whereby a light propagation loss is decreased.

Further, as described above, the high resistance region 135 adjacent to the n− semiconductor region 134 that configures the optical waveguide core 121, whereby an unnecessary capacitance is not formed in the portion 141 next to the optical waveguide 140, and high responsibility can be achieved.

Note that, in the first embodiment, the conductivity type of the n− semiconductor region 134 and the n+ semiconductor region 133 can be the p-type, and the conductivity type of the p− semiconductor region 137 and the p+ semiconductor region 138 can be the n-type.

Figure 5:
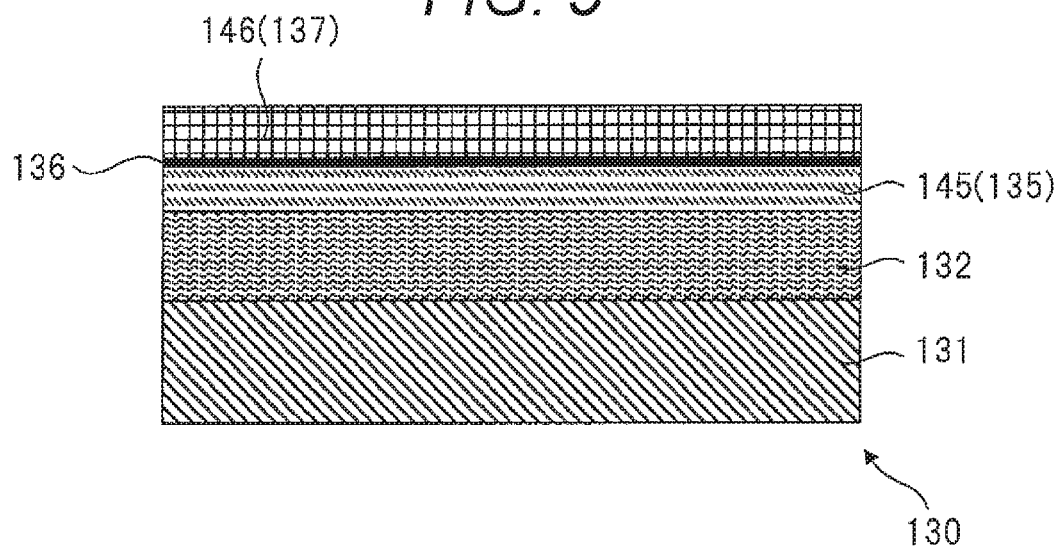
FIG. 5 is a principal portion sectional view during a process of manufacturing the optical modulator according to the first embodiment.

Next, a method of manufacturing the optical modulator 115 of the first embodiment will be described using FIGS. 5 to 14. First, as illustrated in FIG. 5, a substrate 130 in which the silicon substrate 131, the buried insulating film 132, the first silicon layer 145, the gate insulating film 136, and the second silicon layer 146 are laminated in order is prepared. All planes of the first silicon layer 145 and the second silicon layer 146 are made of single crystal silicon. That is, the first silicon layer 145 and the second silicon layer 146 can also be called first crystal silicon layer 145 and second crystal silicon layer 146. Further, planes in contact with the gate insulating film 136, of the first silicon layer 145 and the second silicon layer 146, are thoroughly configured from only single crystal silicon. That is, no region made of a member different from the single crystal silicon such as a silicon oxide film or the like exists in the planes in contact with the gate insulating film 136, of the first silicon layer 145 and the second silicon layer 146. Therefore, no local unevenness exists in surfaces of the planes in contact with the gate insulating film 136, of the first silicon layer 145 and the second silicon layer 146, and no gap or the like exists in boundaries between the planes and the gate insulating film 136. For example, the silicon substrate 131 is configured to have 700 µm, the buried insulating film 132 has 2 µm, the first silicon layer 145 has 100 to 220 nm, the gate insulating film 136 has 4 to 6 nm, and the second silicon layer 146 has 100 to 220 nm.

In the first embodiment, the first silicon layer 145 has the resistivity of 100 Ωcm, for example, for formation of the high resistance region 135, and the second silicon layer 146 is introduced with the impurities such as B (boron) ions or the like to have the concentration of $1 \times 10^{18}$ cm$^{-3}$, for formation of the p$^-$ semiconductor region 137.

Figure 6:
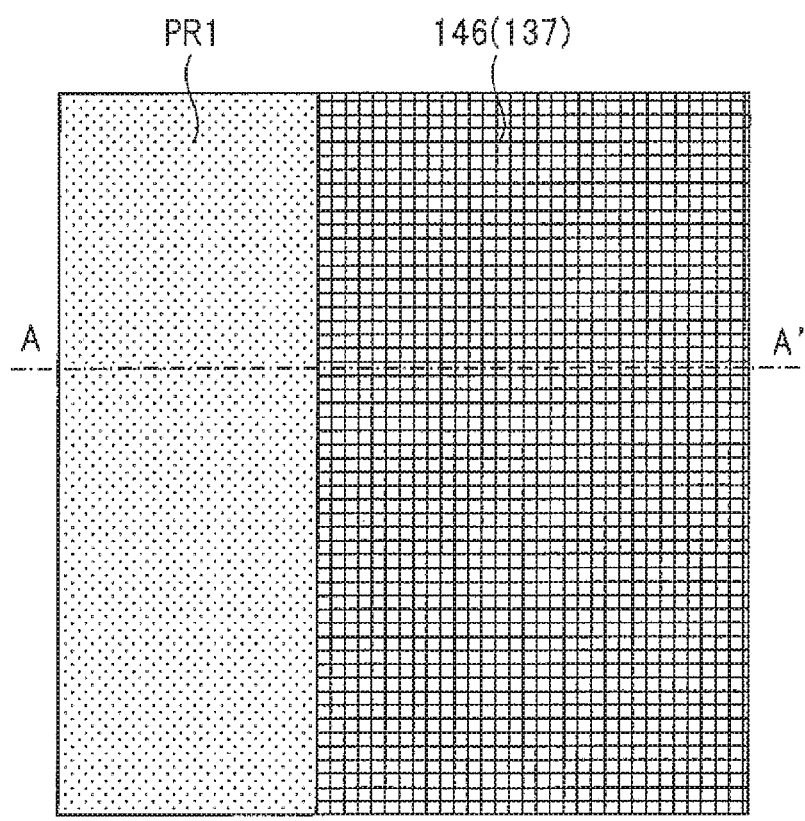
FIG. 6 is a principal portion plan view during the process of manufacturing the optical modulator, which follows FIG. 5.
Figure 7:
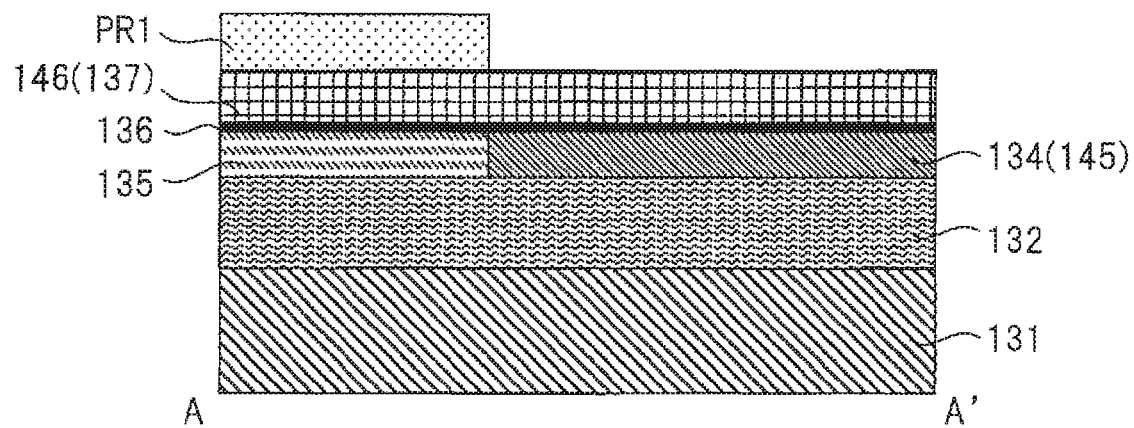
FIG. 7 is a principal portion sectional view along an A-A' line of FIG. 6.

FIGS. 6 and 7 are a principal portion plan view and a principal portion sectional view of the optical modulator, illustrating a process following FIG. 5. A photoresist film PR1 that partially coats the second silicon layer 146 is formed, and the impurities such as P (phosphorus) ions or the like are introduced into the first silicon layer 145 in a region exposed from the photoresist film PR1 by an ion implantation method, and the n$^-$ semiconductor region 134 having the concentration of $1 \times 10^{18}$ cm$^{-3}$ is formed.

Figure 8:
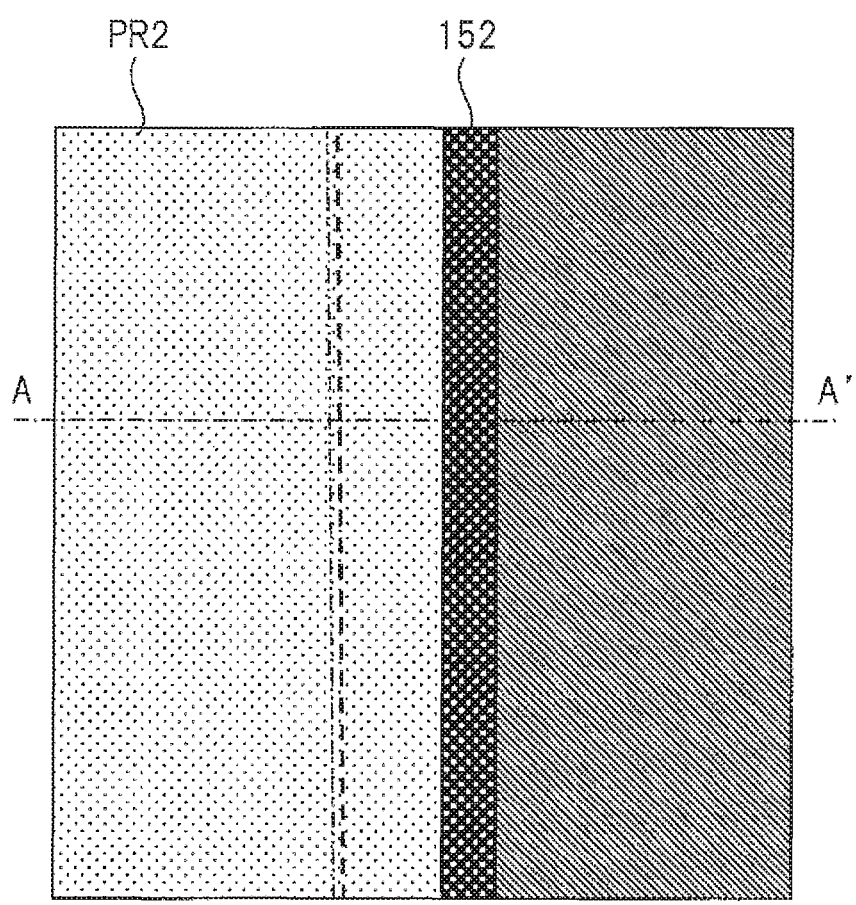
FIG. 8 is a principal portion plan view during the process of manufacturing the optical modulator, which follows FIG. 7.
Figure 9:
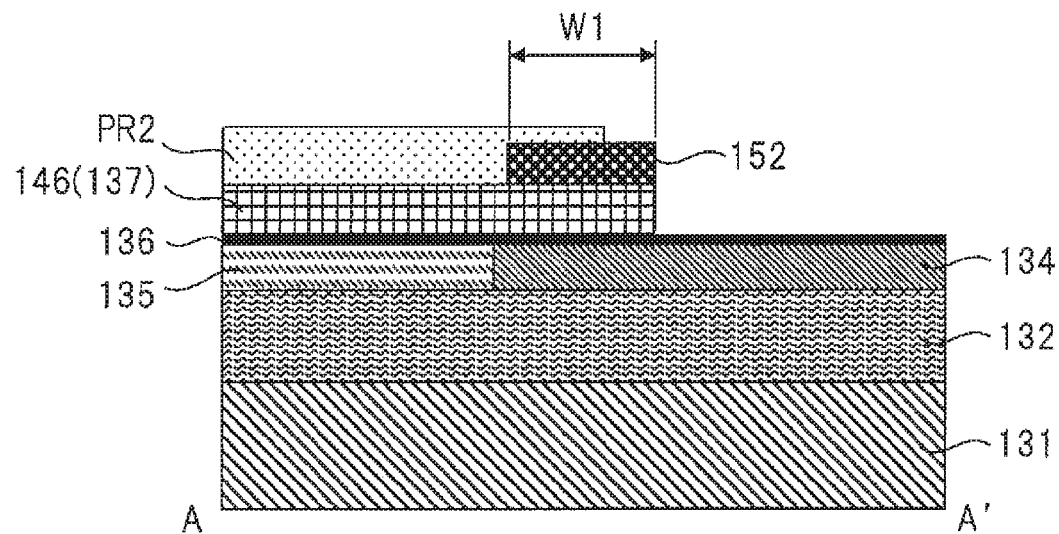
FIG. 9 is a principal portion sectional view along an A-A' line of FIG. 8.

FIGS. 8 and 9 are a principal portion plan view and a principal portion sectional view of the optical modulator, illustrating a process following FIG. 7. After the photoresist film PR1 is removed, the core forming mask 152 made of a silicon oxide film for forming the optical waveguide core 121 is formed on the second silicon layer 146. As illustrated in FIG. 9, the core forming mask 152 having the width W1 is arranged such that the entire core forming mask 152 is positioned on the n$^-$ semiconductor region 134. In other words, a left-side end portion (the broken line of FIG. 8) of the core forming mask 152 is positioned on a right side with respect to a boundary portion (two-dot chain line of FIG. 8) between the n$^-$ semiconductor region 134 and the high resistance region 135. Next, a photoresist film PR2 that coats the formed region of the p$^+$ semiconductor region 138 and the p$^-$ semiconductor region 137, and coats the left-side end portion of the core forming mask 152 is formed, and anisotropic dry etching such as reactive ion etching (RIE) is applied to the second silicon film 146, using the core forming mask 152 and the photoresist film PR2 as a mask, and the second silicon film 146 in a portion exposed from the core forming mask 152 or the photoresist film PR2 is removed. As a result, as illustrated in FIG. 9, a remaining right-side end portion (side wall) of the second silicon film 146 accords with a right-side end portion (side wall) of the core forming mask 152.

Figure 10:
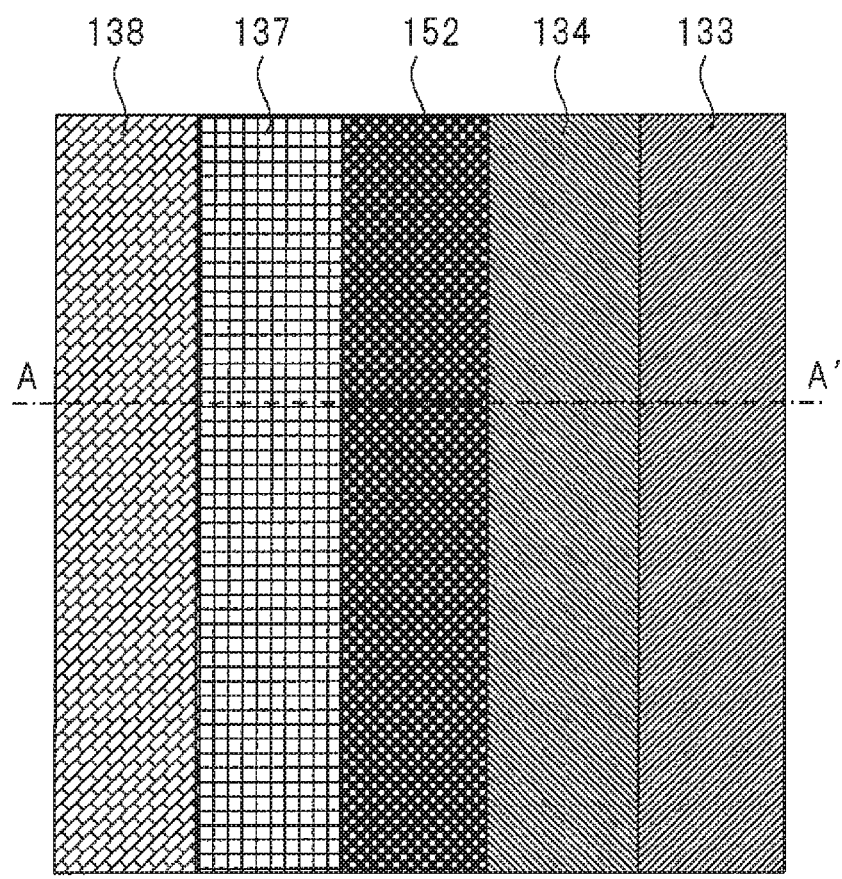
FIG. 10 is a principal portion plan view during the process of manufacturing the optical modulator, which follows FIG. 9.
Figure 11:
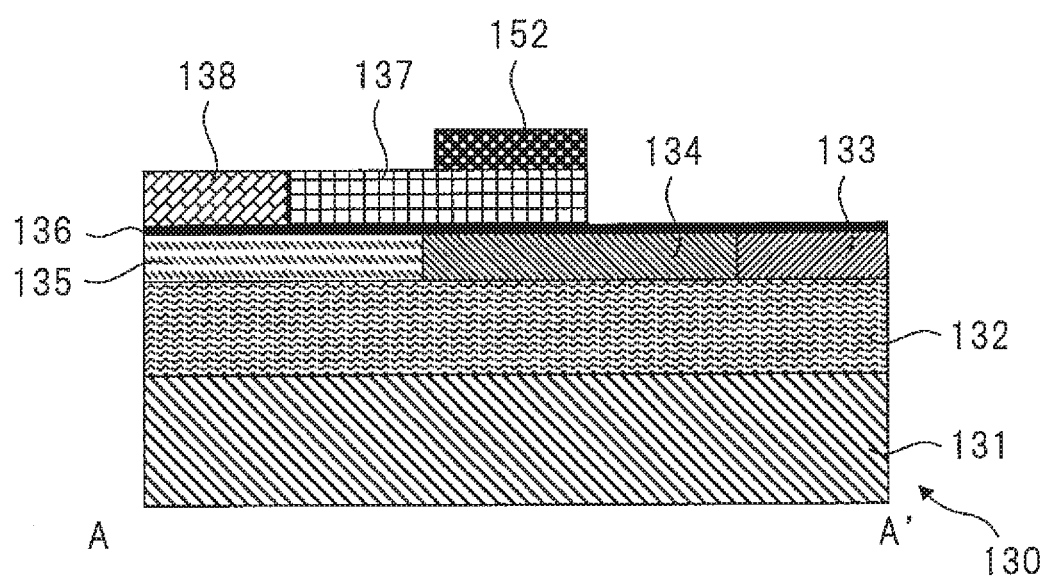
FIG. 11 is a principal portion sectional view along an A-A' line of FIG. 10.

FIGS. 10 and 11 are a principal portion plan view and a principal portion sectional view of the optical modulator, illustrating a process following FIG. 9. After the photoresist film PR2 is removed, the impurities such as P (phosphorus) ions or the like are introduced by the ion implantation method, using the photoresist film as a mask, and the n$^+$ semiconductor region 133 having the concentration of $1 \times 10^{20}$ cm$^{-3}$ is formed. Further, the impurities such as B (boron) ions or the like are introduced by the ion implantation method, using another photoresist film as a mask, and the p$^+$ semiconductor region 138 having the concentration of $1 \times 10^{20}$ cm$^{-3}$ is formed. Following that, annealing is applied to the substrate 130, for damage recovery from the ion implantation and electrical activation of the ions after the introduction of the P (phosphorus) ions or the B (boron) ions. Note that, in FIG. 10, the gate insulating film 136 is omitted.

Figure 12:
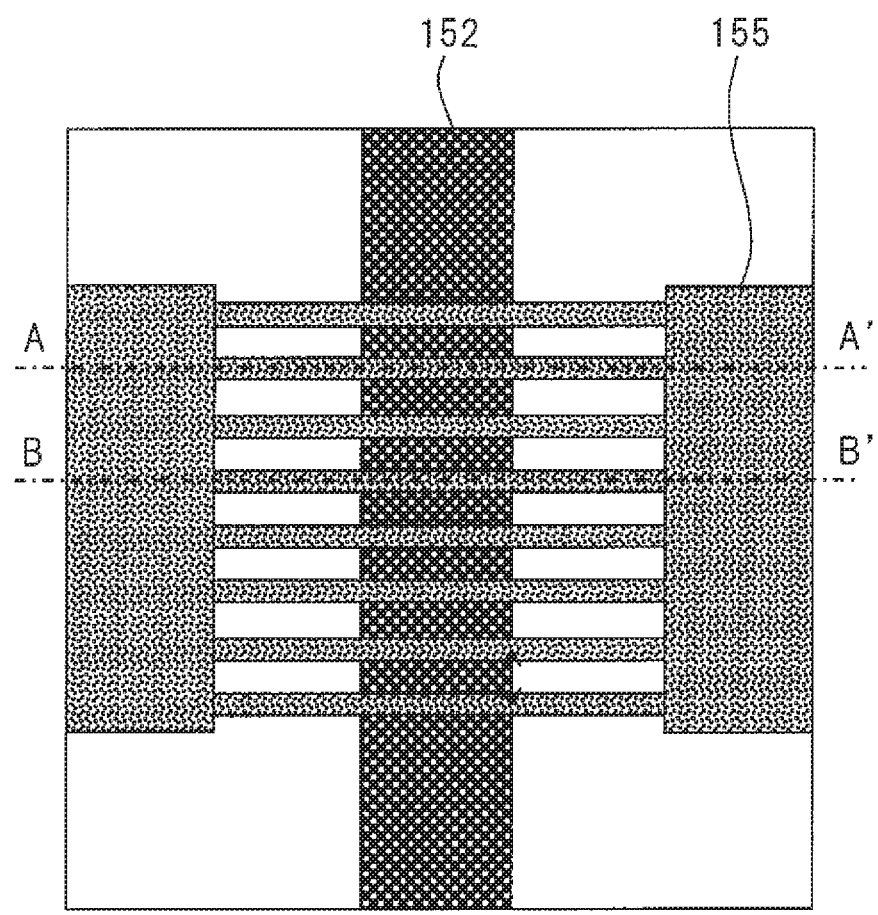
FIG. 12 is a principal portion plan view during the process of manufacturing the optical modulator, which follows FIG. 11.
Figure 13:
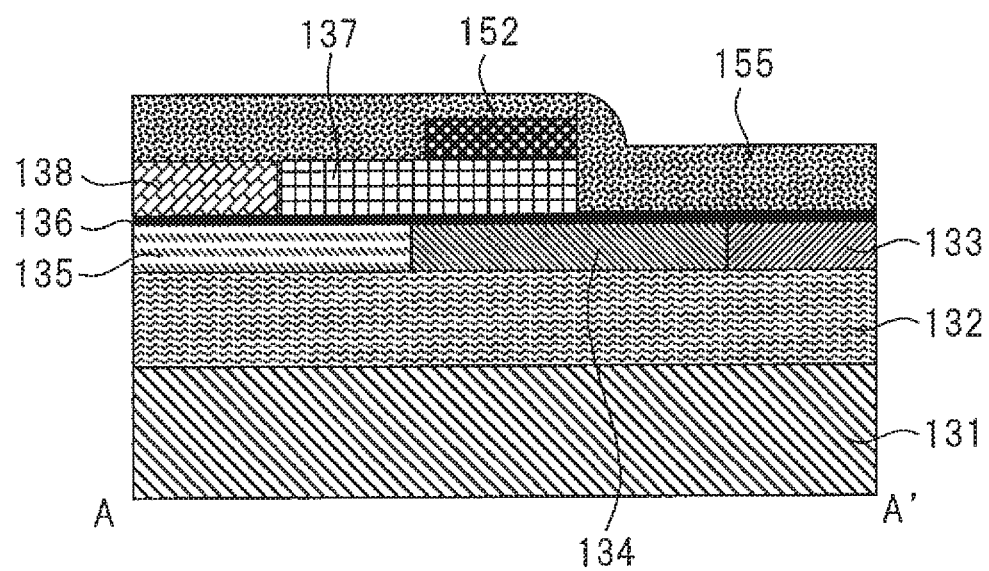
FIG. 13 is a principal portion sectional view along an A-A' line of FIG. 12.
Figure 14:
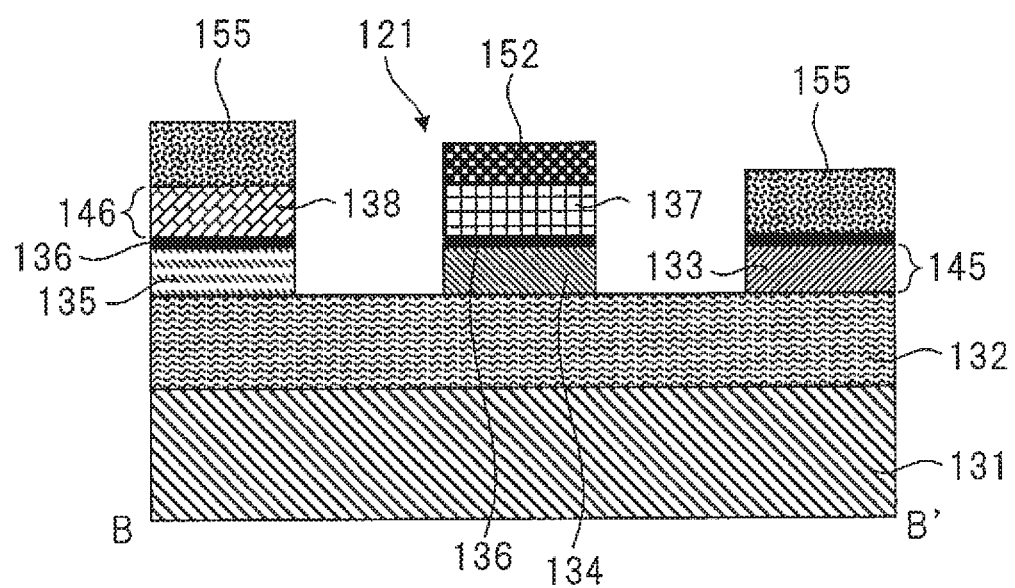
FIG. 14 is a principal portion sectional view along a B-B' line of FIG. 12.

FIGS. 12 to 14 are a principal portion plan view and principal portion sectional views of the optical modulator, illustrating a process following FIG. 11. FIGS. 13 and 14 are a principal portion sectional view of the A-A' line of FIG. 12 and a principal portion sectional view of the B-B' line of FIG. 12. FIG. 12 illustrates only a grating mask 155 and the core forming mask 152. The grating mask 155 for forming side-wall grating is formed on the substrate 130. The grating mask 155 is made of a silicon nitride film, and has a plurality of grating patterns that selectively coats the right pad, the right fins, the left pad, the left fins, and between the right fins and the left fins, as illustrated in FIG. 12. The anisotropic dry etching such as RIE is applied to the substrate 130, and the second silicon layer 146, the gate insulating film 136, and the first silicon layer 145 in portions exposed from the grating mask 155 and the core forming mask 152 are removed. As a result, as illustrated in FIG. 14, the optical waveguide core 121 having the width equal to the width W1 of the core forming mask 152 is formed on a central portion of the substrate 130. As illustrated in FIG. 14, both ends (side walls) of the p$^-$ semiconductor region 137 and the n$^-$ semiconductor region 134 accord with both ends (side walls) of the core forming mask 152. As described using FIGS. 8 and 9, the core forming mask 152 having the width W1 is arranged such that the entire core forming mask 152 is positioned on the n$^-$ semiconductor region 134. Therefore, as illustrated in FIG. 14, the high resistance region 135 cannot be included in the optical waveguide core 121.

Next, the grating mask 155 is removed by heated phosphoric acid (a heating bath of the phosphoric acid and water of about 150° C.), or the like. Following that, the interlayer insulating film 139 is deposited on the substrate 130, and the right and left both sides of the optical waveguide core 121 are coated with the interlayer insulating film 139. Following that, after the surface of the interlayer insulating film 139 is flattened by a chemical mechanical polishing (CMP) method, an opening reaching the p$^+$ semiconductor region 138 and the n$^+$ semiconductor region 133 is provided in the interlayer insulating film 139, and the conductor plug 142 made of a tungsten film is formed in the opening. Further, the electrodes 111 and 112 made of aluminum, for example, and electrically connected with the conductor plug 142 are formed, so that the optical modulator 115 illustrated in FIGS. 3 and 4 is completed.

According to the manufacturing method of the first embodiment, by processing (performing the anisotropic dry etching such as RIE for) the second silicon layer 146, the gate insulating film 136, and the first silicon layer 145, using the core forming mask 152 having the width W1, the width of the optical waveguide core 121 can be highly accurately processed, and manufacturing accuracy thereof is about ±5 nm. Meanwhile, in a case of using the wafer bonding technology of PTL 1, the manufacturing accuracy thereof is about ±10 nm. If the width of the optical waveguide core 121 becomes too narrower than a design value, a loss of light propagated in the optical modulator is increased. Therefore, an incident light amount needs to be increased, and there is a problem of an increase in the power of the transmission-side device. On the contrary, if the width of the optical waveguide core 121 becomes too broad, the optical modulator cannot be normally operated, and there is a problem of occurrence of modulation failure (transmission failure).

According to the manufacturing method of the first embodiment, the width of the optical waveguide core 121 can be highly accurately formed. Therefore, the optical modulator having stable optical characteristics can be provided. Further, highly accurate modulation becomes possible, and reduction of power of a transmission-side device can be realized.

Further, by using the high-quality substrate 130 in which no gap or the like exists in the plane where the first silicon layer 145 or the second silicon layer 146, and the gate insulating film 136 are in contact, modulation efficiency of the optical modulator 115 can be improved. The modulation efficiency depends on the applied voltage between the electrodes 111 and 112. If the gap or the like exists, a higher voltage needs to be applied to between the electrodes 111 and 112, and thus the modulation efficiency is decreased.

Second Embodiment

Figure 15:
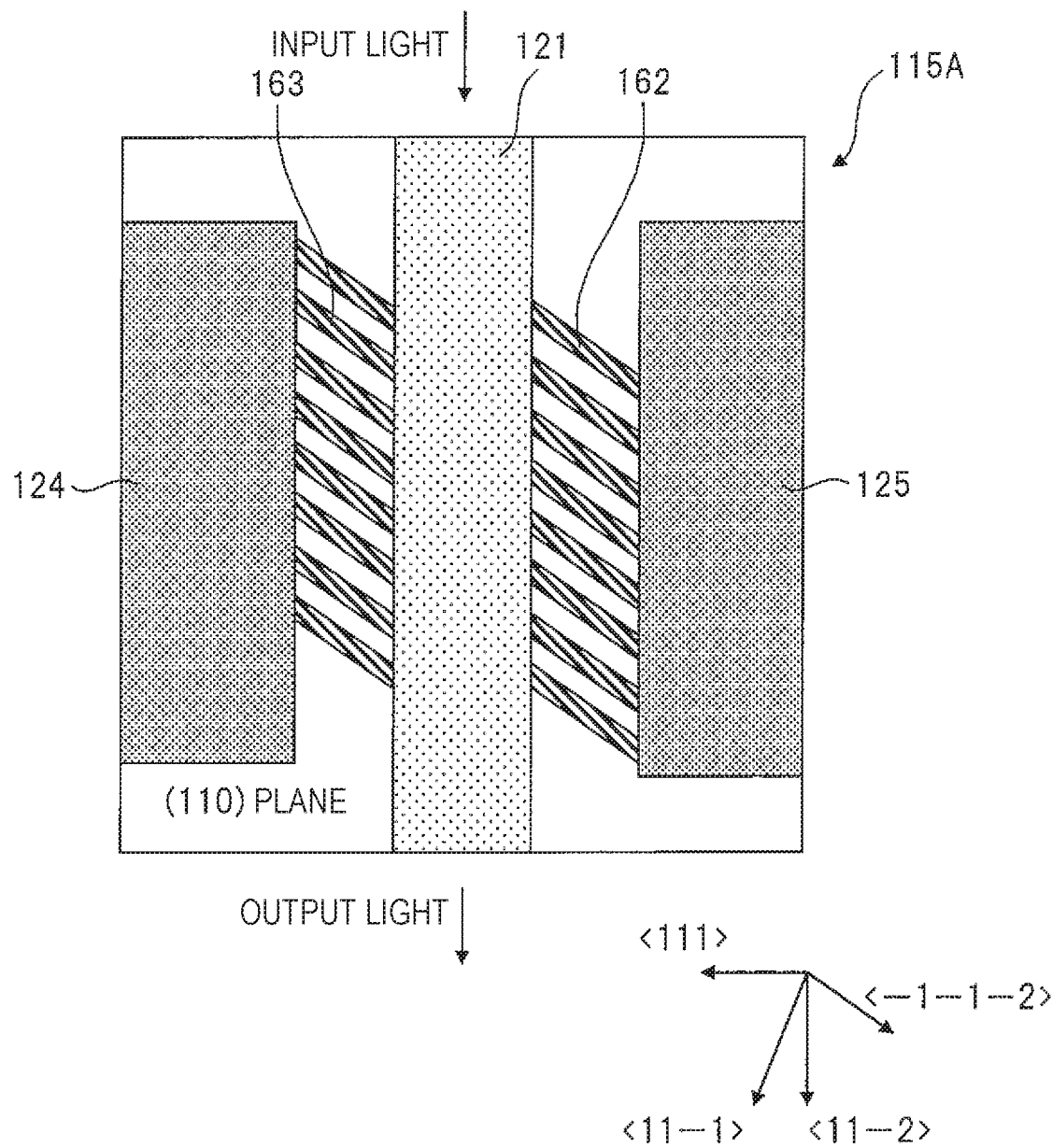
FIG. 15 is a principal portion plan view of an optical modulator according to a second embodiment.

A second embodiment corresponds to a modification of the first embodiment, and is a modification of the optical modulator 115 in the Mach-Zehnder-type modulator 100 illustrated in FIG. 1. FIG. 15 is a principal portion plan view of an optical modulator 115A of the second embodiment, and a portion denoted with a similar reference sign to the first embodiment has a similar configuration to the first embodiment. Further, in the subsequent embodiments, when a similar reference sign is denoted, description becomes similar, and therefore description may be omitted.

In the second embodiment, as illustrated in FIG. 15, orientations of a first silicon layer 145 and a second silicon layer 146 are a (110) plane. Then, an extending direction of an optical waveguide core 121 is a <11-2> direction, and extending directions of right fins 162 and left fins 163 are a <-1-1-2> direction. In this case, a side-wall plane of the optical waveguide core 121 becomes a (111) plane, and side-wall planes of the right fins 162 and the left fins 163 are a (11-1) plane.

A method of manufacturing the optical modulator 115A of the second embodiment is nearly similar to the processes described in the first embodiment. In the process of FIG. 14 of the first embodiment, the second silicon layer 146, the gate insulating film 136, and the first silicon layer 145 have been processed by the anisotropic dry etching to form the optical waveguide core 121. In the second embodiment, this process is performed by wet etching, in place of the anisotropic dry etching. To be specific, anisotropic wet etching using an alkaline solution in which tetramethyl ammonium hydroxide (TMAH) is diluted is performed. The wet etching is performed using a phenomenon that an etching rate of single crystal silicon differs according to the orientation in the alkaline solution, and especially, etching in the alkaline solution rarely proceeds when a silicon surface is a (111) plane.

As a result, the side-wall plane of the optical waveguide core 121 can be processed to be flat in an atomic level. Roughness of the side wall has gone, and a propagation loss can be further decreased. Further, effect similar to the first embodiment can be obtained, in addition to the above-described effect.

Third Embodiment

Figure 16:
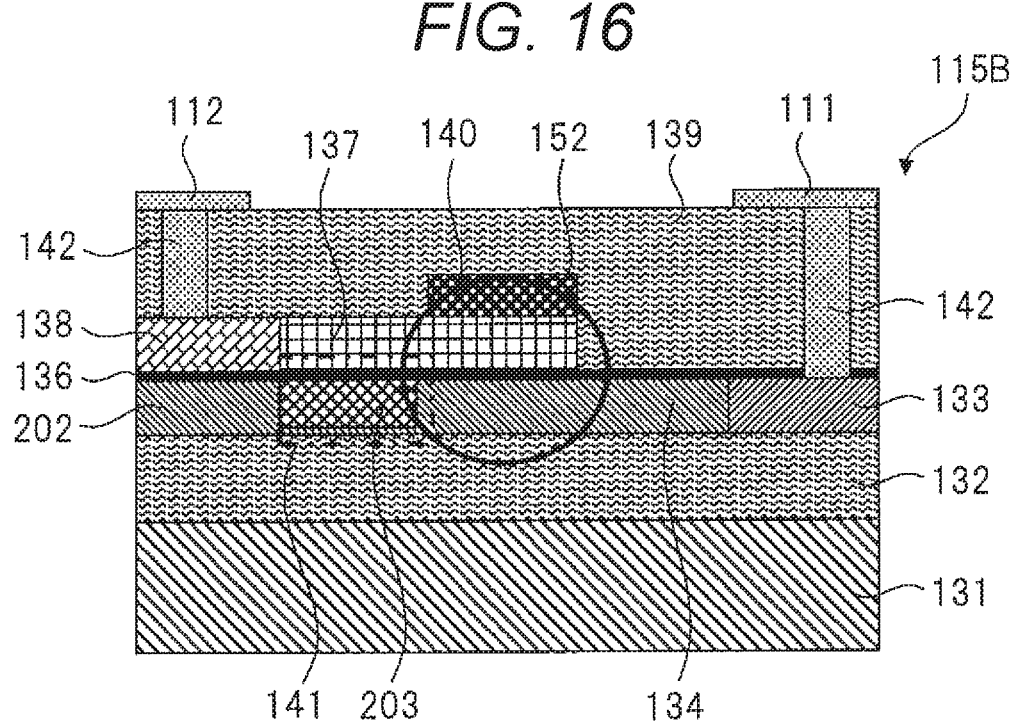
FIG. 16 is a principal portion plan view of an optical modulator according to a third embodiment.
Figure 17:
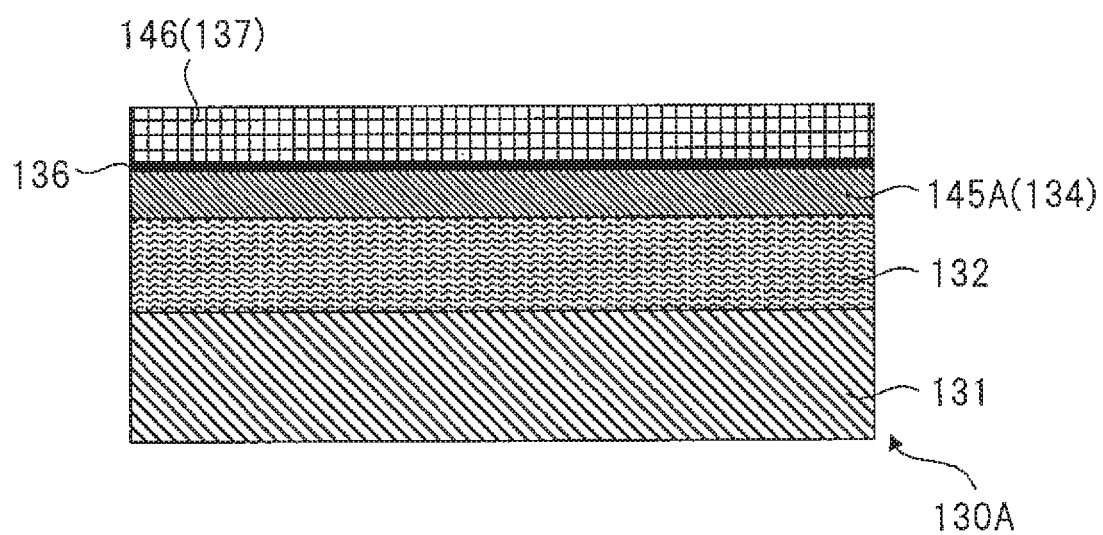
FIG. 17 is a principal portion sectional view during a process of manufacturing the optical modulator according to the third embodiment.
Figure 18:
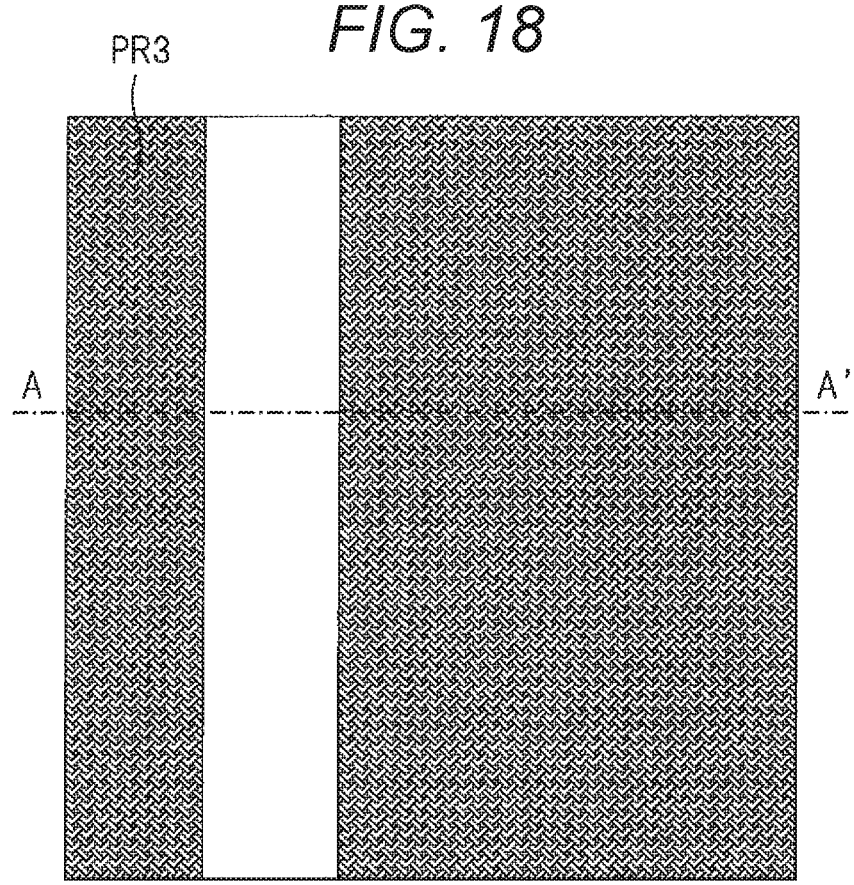
FIG. 18 is a principal portion plan view during the process of manufacturing the optical modulator, which follows FIG. 17.
Figure 19:
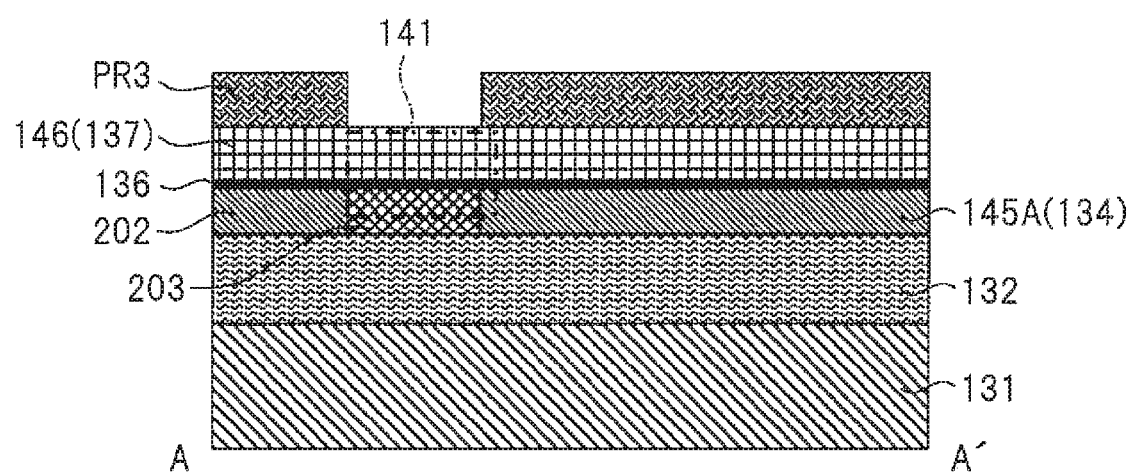
FIG. 19 is a principal portion sectional view along an A-A' line of FIG. 18.

A third embodiment corresponds to a modification of the first embodiment, and is a modification of the optical modulator 115 in the Mach-Zehnder-type modulator 100 illustrated in FIG. 1. FIG. 16 is a principal portion sectional view of an optical modulator 115B of the third embodiment, and corresponds to the principal portion sectional view (FIG. 3) along the A-A' line of FIG. 2 of the first embodiment. FIGS. 17 to 19 are a principal portion plan view and principal portion sectional views during a process of manufacturing the optical modulator 115B of the third embodiment. A portion denoted with a similar reference sign to the first embodiment has a similar configuration to the first embodiment.

In the optical modulator 115B of the third embodiment, the high resistance region 135 in the first embodiment is a p-type semiconductor region 203. Further, in a manufacturing method, an n⁻ type semiconductor region 134 is formed in a preparation stage of a first silicon layer 145, instead of being formed by the ion implantation method.

A p-type semiconductor region 203 illustrated in FIG. 16 is a semiconductor region having low impurity concentration of about $2 \times 10^{18}$ cm$^{-3}$, and a pn junction is formed between the p-type semiconductor region 203 and the adjacent n⁻ type semiconductor region 134. The capacitance by the pn junction is smaller than the capacitance configured from the p-type semiconductor region 203, a gate insulating film 136, and a p⁻ type semiconductor region 137, of a portion 141 adjacent to an optical waveguide core 121. Therefore, a capacitance component of the portion 141 adjacent to the optical waveguide core 121 does not hinder high-speed response of the optical modulator 115B, and the optical modulator 115B with high-speed response can be provided.

Next, a method of manufacturing the optical modulator 115B of the third embodiment will be described using FIGS. 17 to 19. FIG. 17 is a principal portion sectional view during a process of manufacturing the optical modulator 115B of the third embodiment. First, a substrate 130A in which a silicon substrate 131, a buried insulating film 132, a first silicon layer 145A, a gate insulating film 136, and a second silicon layer 146 are laminated in order is prepared. In this preparation stage of the substrate 130A, the first silicon layer 145A is a single crystal silicon layer, and for example, impurities such as P (phosphorus) in low concentration are introduced and the impurity concentration thereof is $1 \times 10^{18}$ cm$^{-3}$. Further, similarly to the first embodiment, the second silicon layer 146 is a single crystal silicon layer, and impurities such as B (boron) in low concentration are introduced and the impurity concentration thereof is $1 \times 10^{18}$ cm$^{-3}$. That is, in the preparation stage of the substrate 130A, the first silicon layer 145A has the impurity concentration of the n⁻ type semiconductor region 134, and the second silicon layer 146 has the impurity concentration of the p⁻ type semiconductor region 137.

FIGS. 18 and 19 are a principal portion plan view and a principal portion sectional view during the process of manufacturing the optical modulator 115B, following FIG. 17. As illustrated in FIG. 19, a photoresist film PR3 including an opening is formed on the second silicon layer 146, and for example, the impurities such as B (boron) are introduced into the first silicon layer 145A positioned in the opening portion by an ion implantation method to form the p-type semiconductor region 203.

After that, the manufacturing process described in FIG. 9 of the first embodiment follows, and the optical modulator 115B of the third embodiment illustrated in FIG. 16 is completed. Note that a left-side portion of the p-type semiconductor region 203 is an n-type semiconductor region 202, due to a difference from the manufacturing method of the first embodiment.

According to the third embodiment, the n-type doping concentration and the p-type doping concentration can be controlled in the state of the substrate 130A. Therefore, the optical modulator 115B with a lower optical loss and higher modulation efficiency than the case of forming the n⁻ type semiconductor region 134 by the ion implantation in the first embodiment can be obtained.

Further, effect similar to that obtained in the first embodiment can be obtained.

Further, the second embodiment can be applied to the third embodiment. Accordingly, the optical modulator 115 with a further lower optical loss can be formed.

Fourth Embodiment

Figure 20:
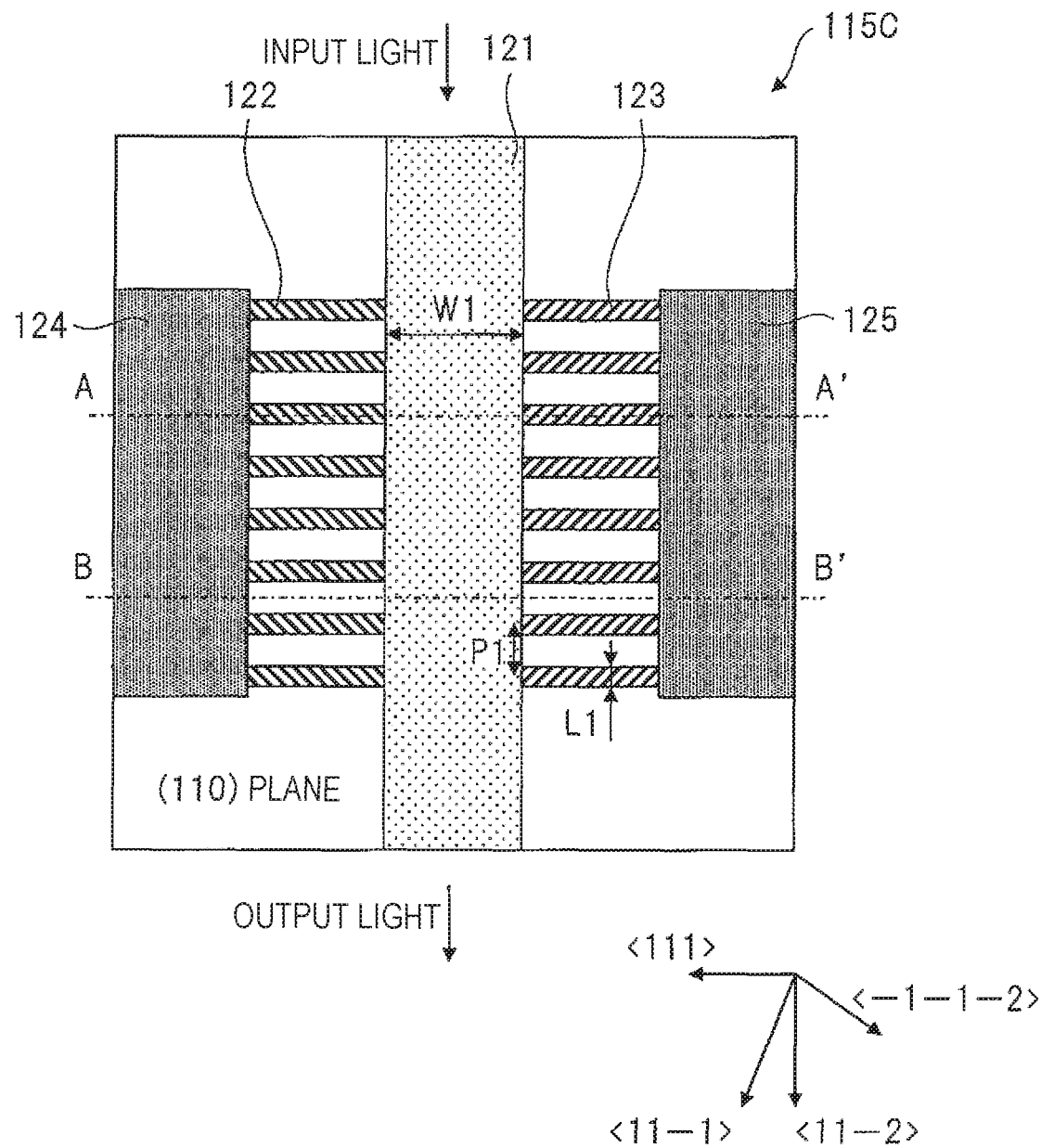
FIG. 20 is a principal portion plan view of an optical modulator according to a fourth embodiment
Figure 21:
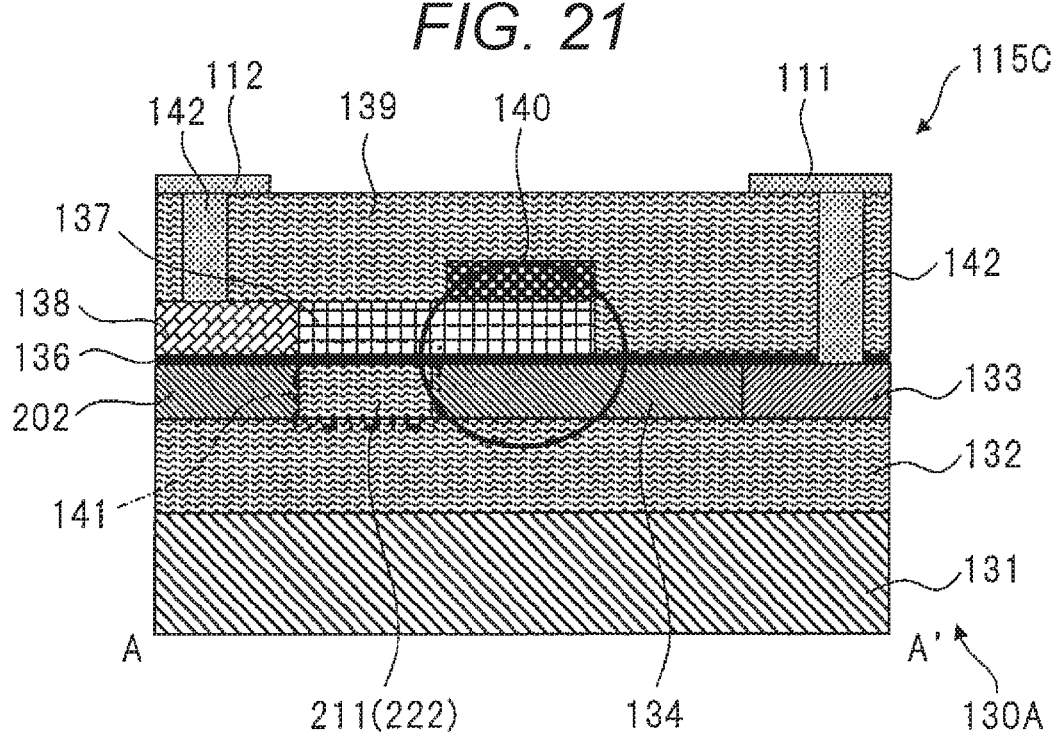
FIG. 21 is a principal portion sectional view along an A-A' line of FIG. 20.
Figure 22:
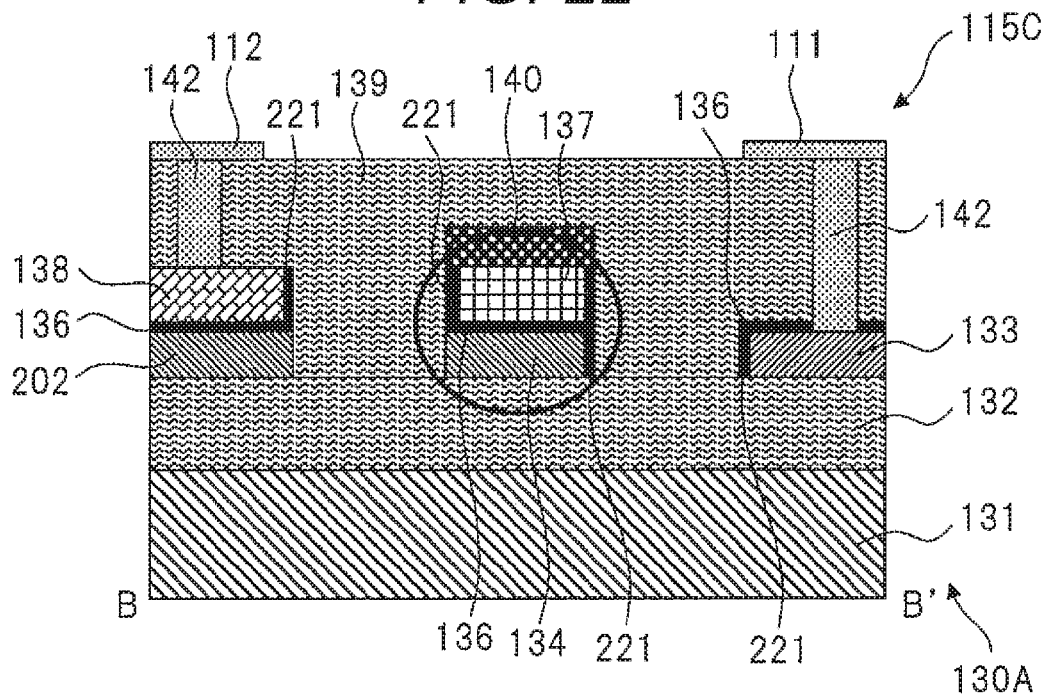
FIG. 22 is a principal portion sectional view along a B-B' line of FIG. 20.
Figure 23:
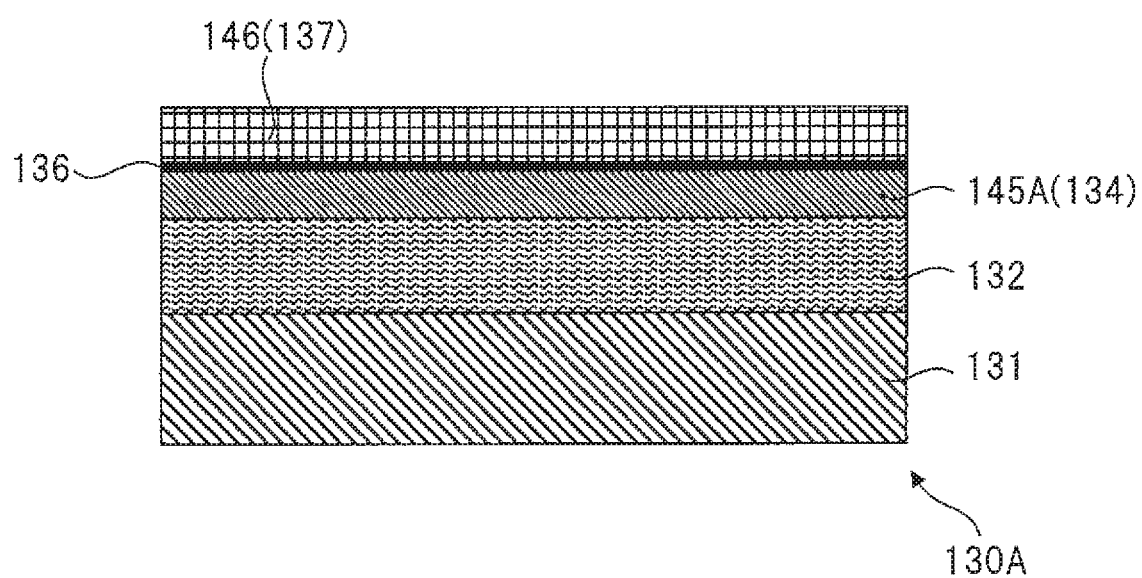
FIG. 23 is a principal portion sectional view during a process of manufacturing the optical modulator according to the fourth embodiment.

A fourth embodiment corresponds to a modification of the first embodiment, and is a modification of the optical modulator 115 in the Mach-Zehnder-type modulator 100 illustrated in FIG. 1. FIG. 20 is a principal portion plan view of an optical modulator 115C of the fourth embodiment, and FIGS. 21 and 22 are principal portion sectional views. FIGS. 23 to 35 are principal portion plan views and principal portion sectional views during a process of manufacturing the optical modulator 115C of the fourth embodiment. FIGS. 23, 25, and 27 are common in an A-A' section and a B-B' section. A portion denoted with a similar reference sign to the first embodiment has a configuration similar to the first embodiment.

The plan view of FIG. 20 is similar to the first embodiment. Note that, in the fourth embodiment, an optical waveguide core 121 and the like are formed in (110) planes of a first silicon layer 145 and a second silicon layer 146. The optical waveguide core 121 extends in a <11-2> direction, and right fins 123 and left fins 122 extend in a direction other than a <-1-1-2> direction, for example, in a <111> direction.

FIG. 21 is a principal portion sectional view along the A-A' line of FIG. 20, and FIG. 22 is a principal portion sectional view along the B-B' line of FIG. 20. In the optical modulator 115C of the fourth embodiment, the high resistance region 135 in the first embodiment is an insulating region (insulating film) 211. Although it will become clear in a manufacturing method described below, the insulating region 211 is configured from an interlayer insulating film 139, and is made of a silicon oxide film, for example.

A portion 141 next to the optical waveguide core 121 is formed into the insulating region 211, whereby parasitic capacitance connected to the optical waveguide core 121 can be decreased, and the optical modulator 115C with high-speed response can be provided.

As illustrated in FIG. 22, a side-wall insulating film 221 made of a silicon oxide film is formed on side walls of an n⁻ type semiconductor region 134 and a p⁻ type semiconductor region 137 that configure the optical waveguide core 121. Roles of the side-wall insulating film 221 will become clear in the description of a manufacturing method below.

Next, a method of manufacturing the optical modulator 115C of the fourth embodiment will be described. First, a substrate 130A illustrated in FIG. 23 is prepared. This substrate 130A is similar to that described in the third embodiment.

Figure 24:
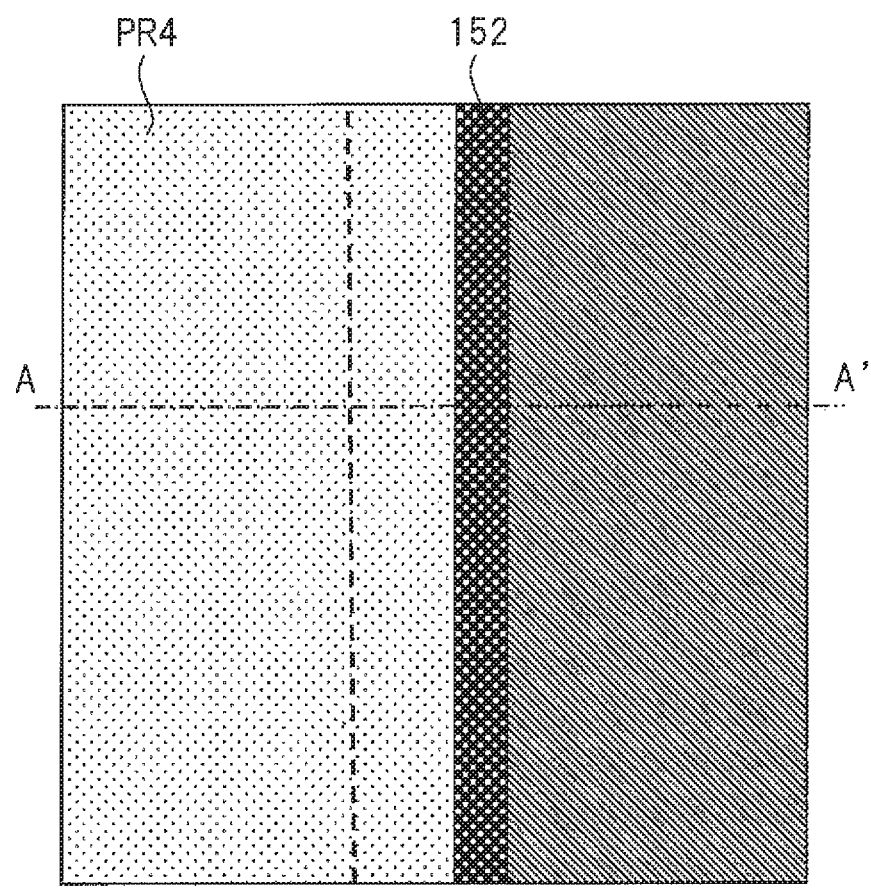
FIG. 24 is a principal portion plan view during the process of manufacturing the optical modulator, which follows FIG. 23.
Figure 25:
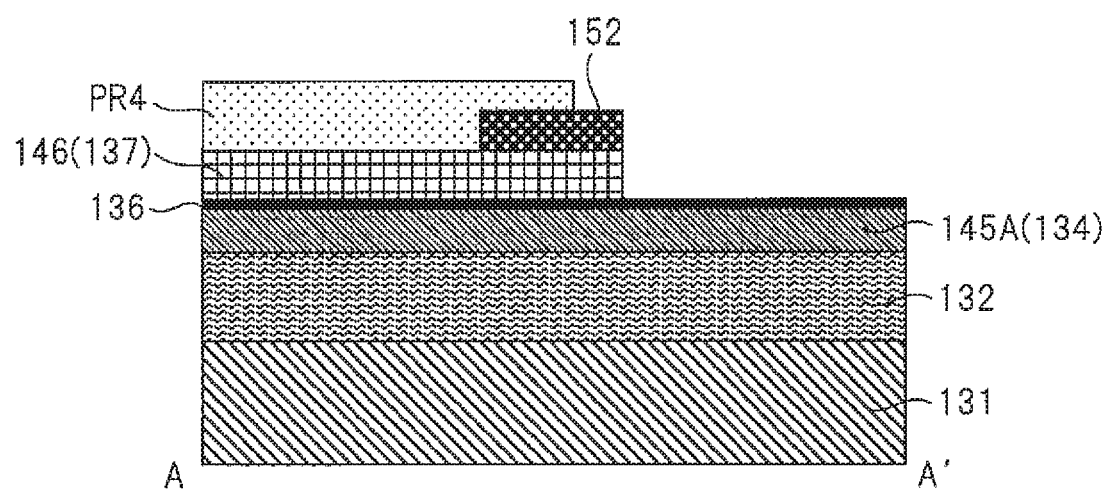
FIG. 25 is a principal portion sectional view along an A-A' line of FIG. 24.

FIGS. 24 and 25 are a principal portion plan view and a principal portion sectional view during a manufacturing process following FIG. 23. A core forming mask 152 made of a silicon oxide film and a photoresist film PR4 are formed. Anisotropic dry etching such as RIE is applied to the second silicon layer 146, using the aforementioned films as a mask, and the second silicon layer 146 is patterned. This method is similar to the method of the first embodiment. FIG. 24 does not illustrate a gate insulating film 136.

Figure 26:
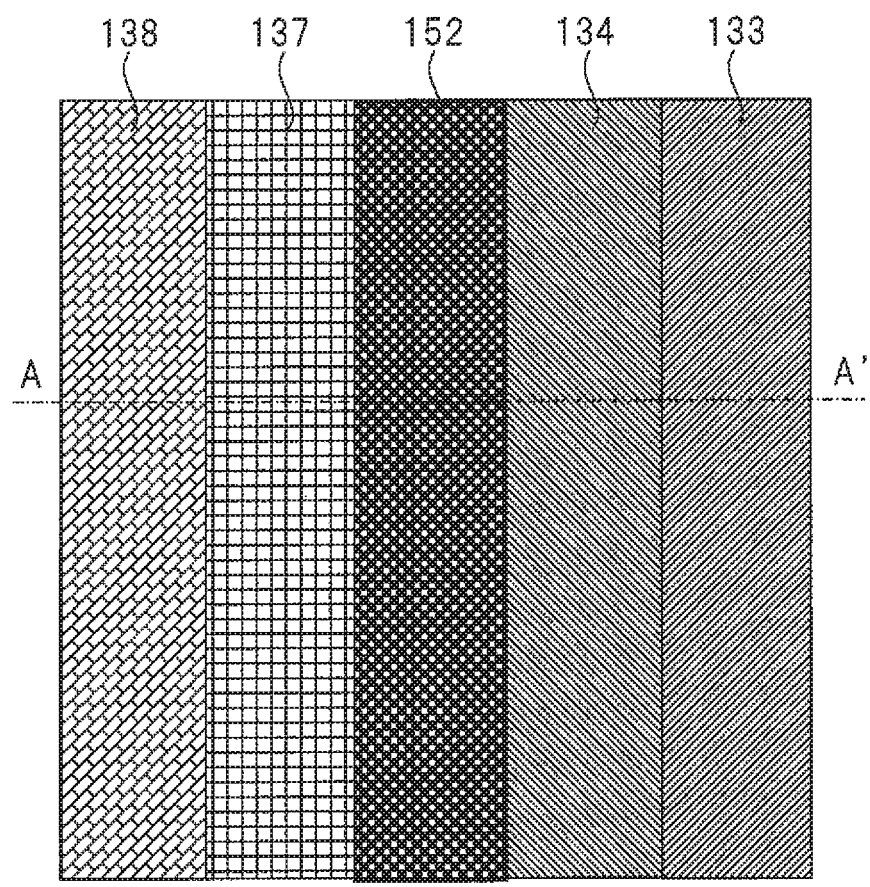
FIG. 26 is a principal portion plan view during the process of manufacturing the optical modulator, which follows FIG. 25.
Figure 27:
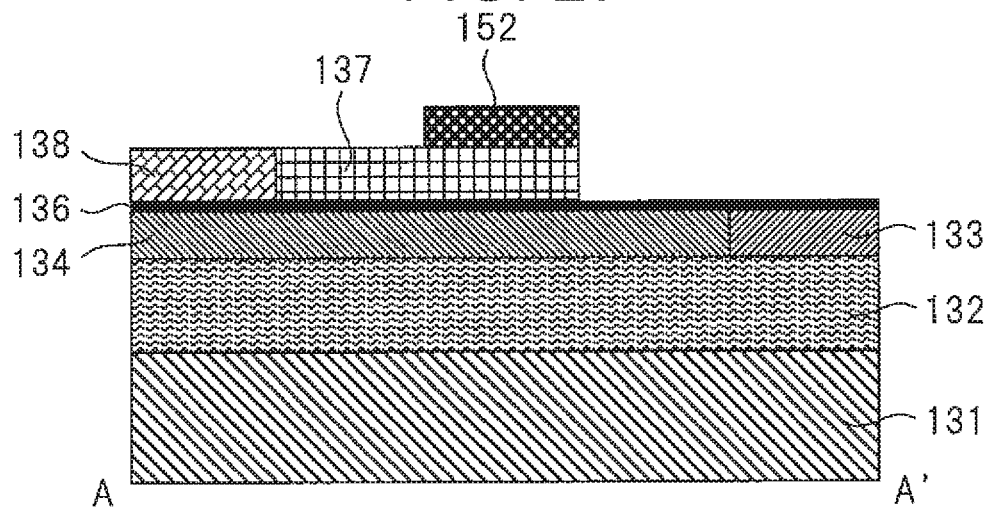
FIG. 27 is a principal portion sectional view along an A-A' line of FIG. 26.

FIGS. 26 and 27 are a principal portion plan view and a principal portion sectional view during the manufacturing process following FIG. 25. An n⁺ semiconductor region 133 and a p⁺ semiconductor region 138 are formed by a method similar to the first embodiment. FIG. 26 also does not illustrate the gate insulating film 136.

Figure 28:
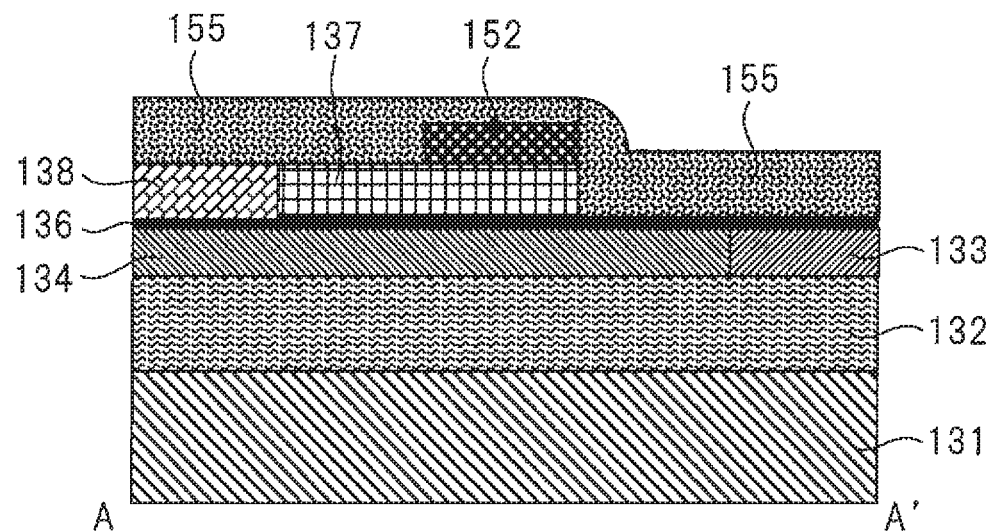
FIG. 28 is a principal portion sectional view along an A-A' line of FIG. 20, which follows FIG. 27.
Figure 29:
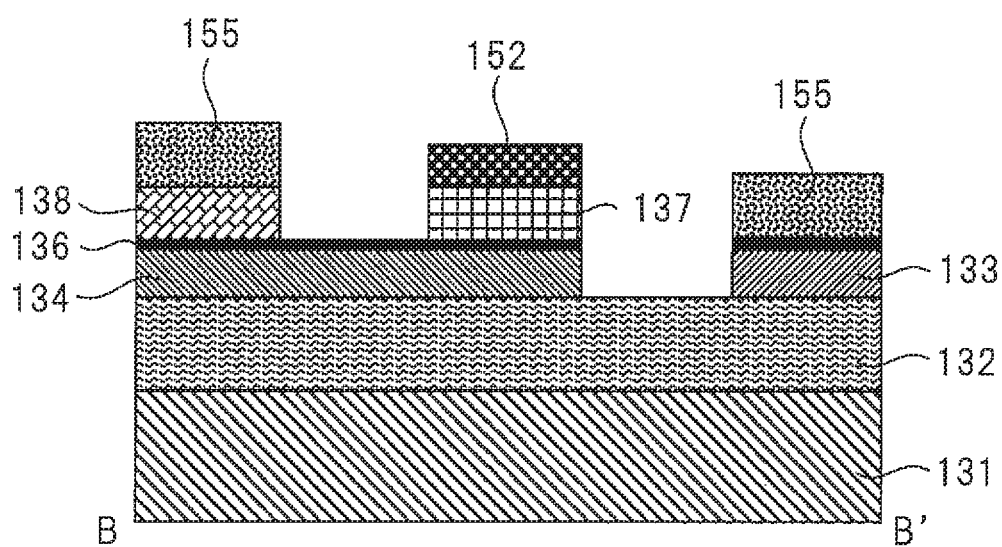
FIG. 29 is a principal portion sectional view along a B-B' line of FIG. 20, which follows FIG. 27.

FIGS. 28 and 29 are a principal portion sectional view along an A-A line and a principal portion sectional view along a B-B' line during the manufacturing process following FIG. 27. Similarly to the first embodiment, a grating mask 155 made of a silicon nitride film is formed. A plan shape of the grating mask 155 is illustrated in FIG. 12. Next, the anisotropic dry etching such as RIE is applied to the second silicon layer 146 and the first silicon layer 145 using the grating mask 155 and the core forming mask 152 as a mask, and patterning is performed. Unlike the first embodiment, the anisotropic dry etching is not performed and the first silicon layer 145 remains in a region between the p⁺ type semiconductor region 138 and the p⁻ type semiconductor region 137.

Figure 30:
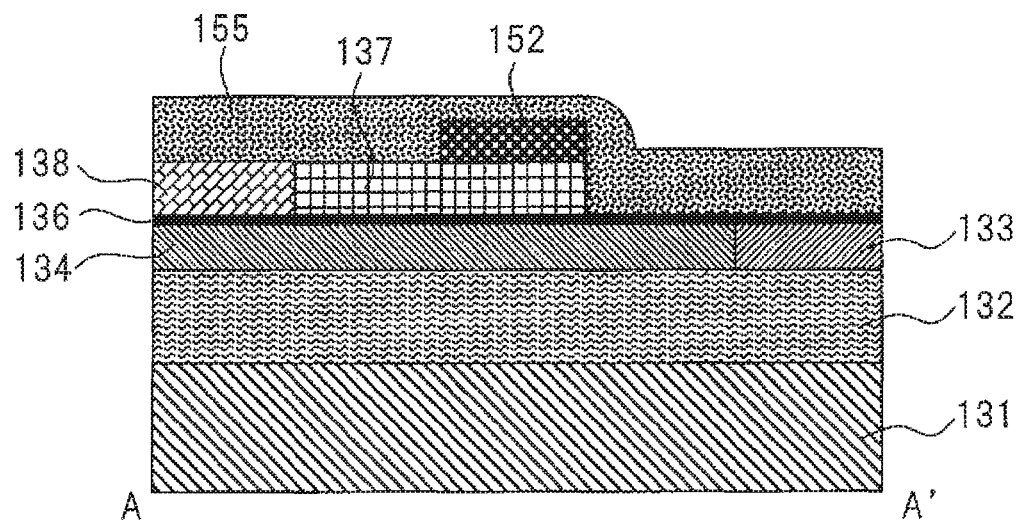
FIG. 30 is a principal portion sectional view along an A-A' line of FIG. 20, which follows FIG. 28.
Figure 31:
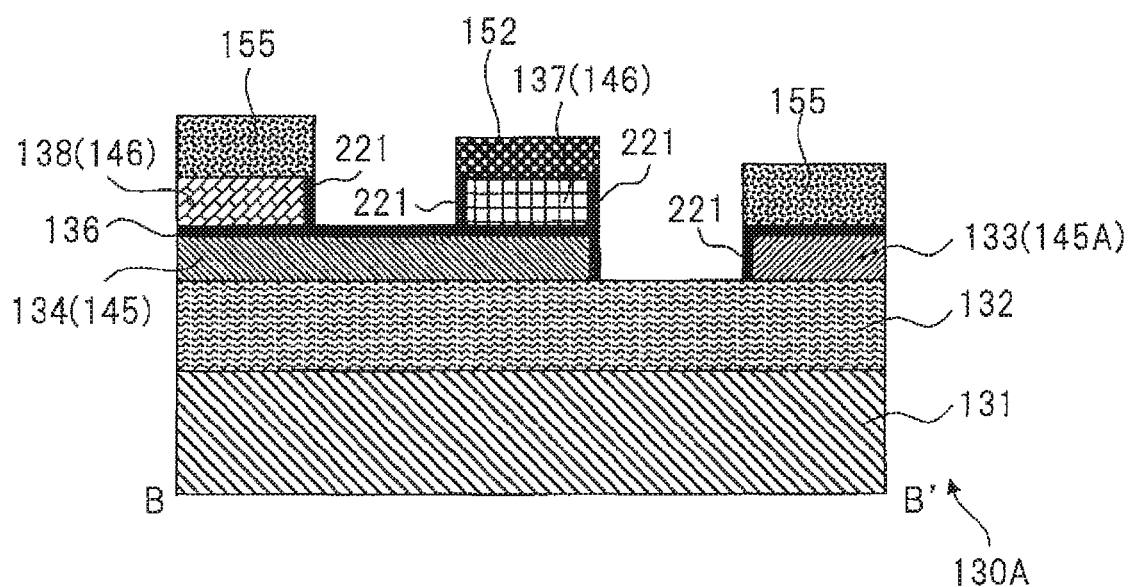
FIG. 31 is a principal portion sectional view along a B-B' line of FIG. 20, which follows FIG. 29.

FIGS. 30 and 31 are a principal portion sectional view along the A-A' line and a principal portion sectional view along the B-B' line during the manufacturing process following FIGS. 28 and 29. Thermal oxidation processing is applied to the substrate 130A, and a side-wall insulating film 221 is formed on side walls of the first silicon layer 145 and the second silicon layer 146 exposed from the grating mask 155 and the core forming mask 152.

Figure 32:
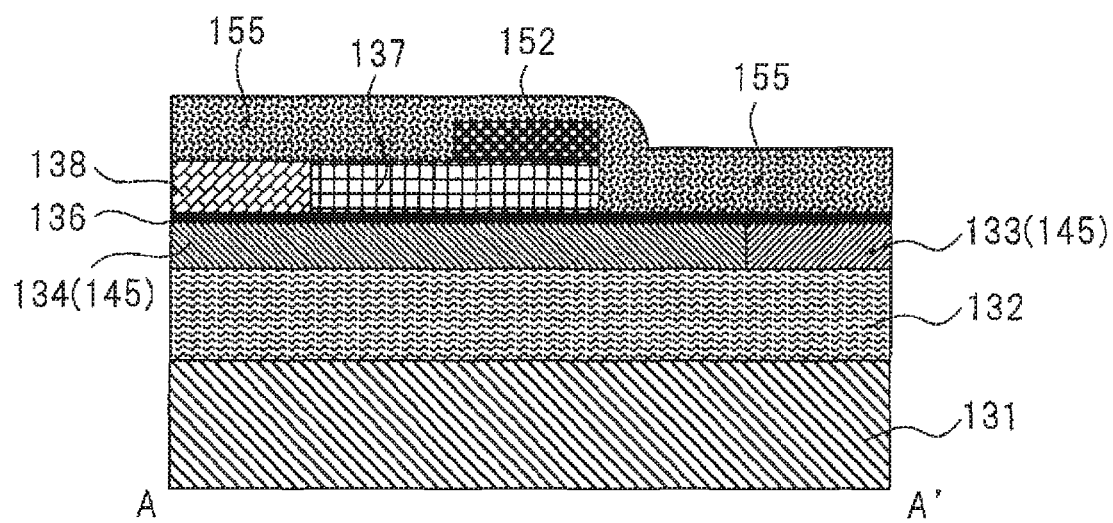
FIG. 32 is a principal portion sectional view along an A-A' line of FIG. 20, which follows FIG. 30.
Figure 33:
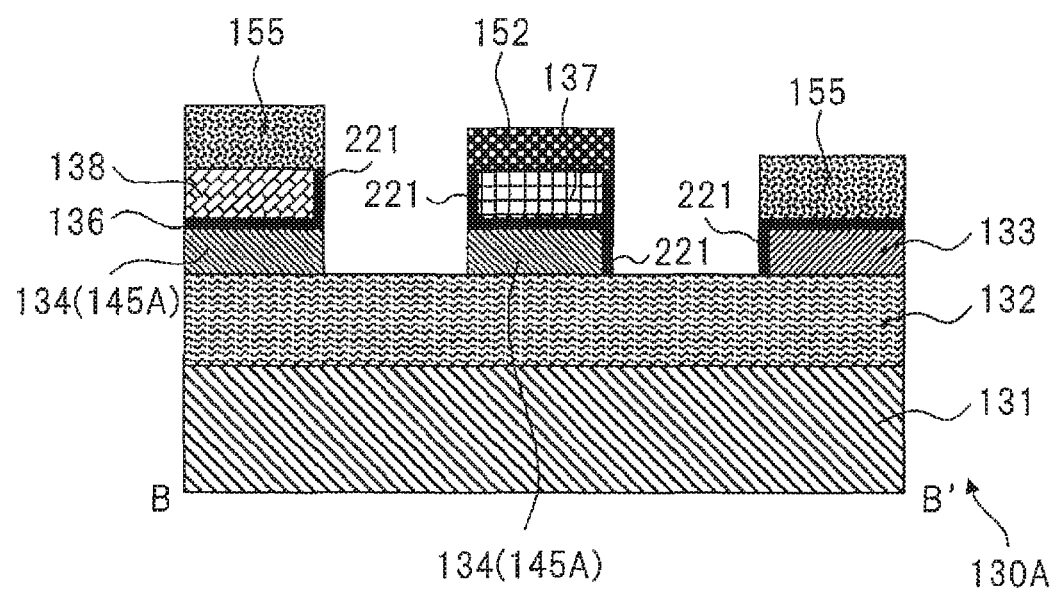
FIG. 33 is a principal portion sectional view along a B-B' line of FIG. 20, which follows FIG. 31.

FIGS. 32 and 33 are a principal portion sectional view along the A-A' line and a principal portion sectional view along the B-B' line during the manufacturing process following FIGS. 30 and 31. As illustrated in FIG. 33, the anisotropic dry etching such as RIE is applied to the substrate 130A, and the gate insulating film 136 and the first silicon layer 145 in the region between the p⁺ type semiconductor region 138 and the p⁻ type semiconductor region 137 are removed. In this stage, the first silicon layer 145 exists below the p⁻ type semiconductor region 137 that configures the left fins 122 in the principal portion sectional view along the A-A' line, as illustrated in FIG. 32.

Figure 34:
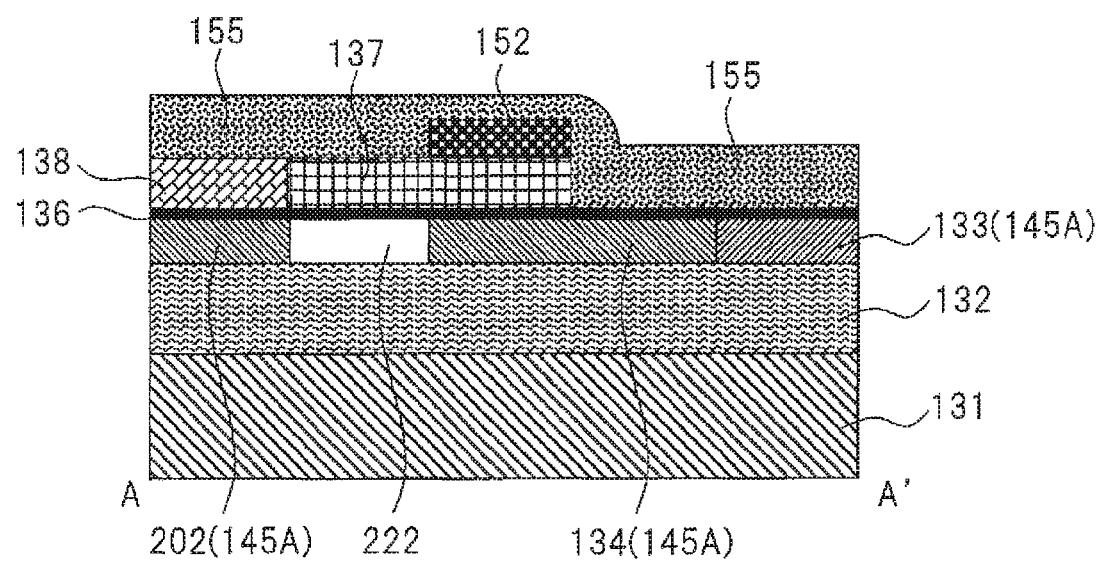
FIG. 34 is a principal portion sectional view along an A-A' line of FIG. 20, which follows FIG. 32.
Figure 35:
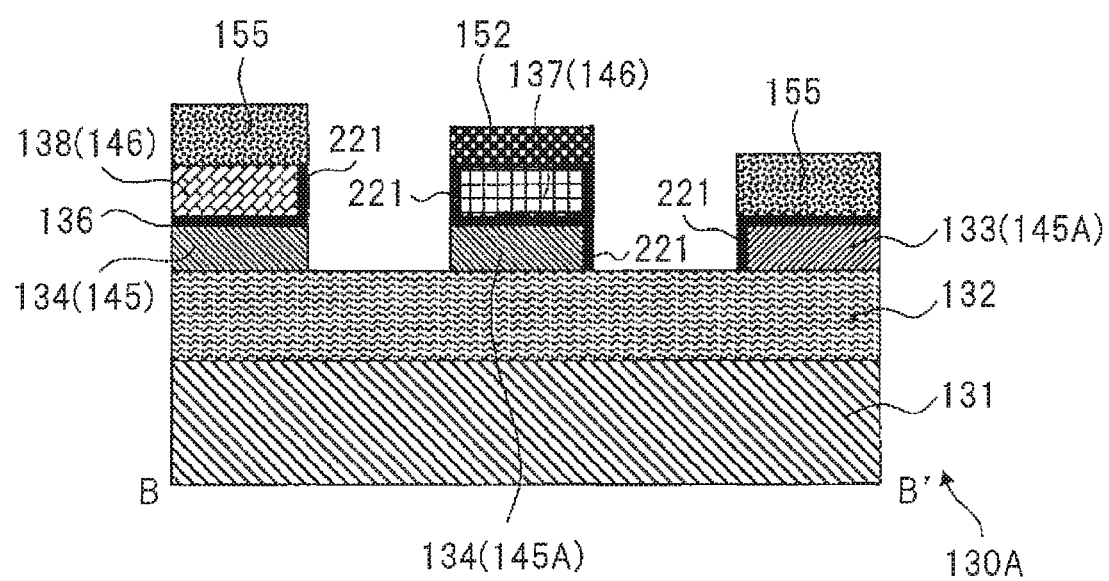
FIG. 35 is a principal portion sectional view along a B-B' line of FIG. 20, which follows FIG. 33.

FIGS. 34 and 35 are a principal portion sectional view along the A-A' line and a principal portion sectional view along the B-B' line during the manufacturing process following FIGS. 32 and 33. As illustrated in FIG. 34, when anisotropic wet etching using an alkaline solution in which TMAH is diluted is applied to the first silicon layer 145, the first silicon layer 145 below the left fins 122 is removed, and a space 222 is formed below the left fins 122. In the anisotropic wet etching using an alkaline solution in which TMAH is diluted, a phenomenon that an etching rate of single crystal silicon differs according to the orientation in the alkaline solution, and especially, etching in the alkaline solution rarely proceeds when a silicon surface is a (111) plane is used. As illustrated in FIG. 35, the side wall of the optical waveguide core 121 is the (111) plane, the width of the optical waveguide core 121 cannot be decreased in the process of etching the first silicon layer 145 below the left fins 122.

Further, the side-wall insulating film 221 is provided to prevent the first silicon layer 145 and the second silicon layer 146 from being etched in the process of the anisotropic wet etching. Especially, the side-wall insulating film 221 prevents the first silicon layer 145 in the position corresponding to the right fins 123 and the second silicon layer 146 in the position corresponding to the left fins 122 from being etched.

Next, after the grating mask 155 is removed by a heated phosphoric acid or the like, the interlayer insulating film 139 is deposited on the substrate 130A, and a conductor plug 142 and electrodes 111 and 112 are formed similarly to the first embodiment, so that the optical modulator 115C illustrated in FIGS. 21 and 22 is completed. Note that, in the process of forming the interlayer insulating film 139, the space 222 below the left fins 122 is also filled with the interlayer insulating film 139, and the insulating region 211 is formed.

Similarly to the first embodiment, a width W1 of the optical waveguide core 121 is determined by the core forming mask 152, and thus manufacturing accuracy thereof is about ±5 nm, and highly accurate control of the width of the optical waveguide core becomes possible without being affected by alignment accuracy of the mask.

Fifth Embodiment

Figure 36:
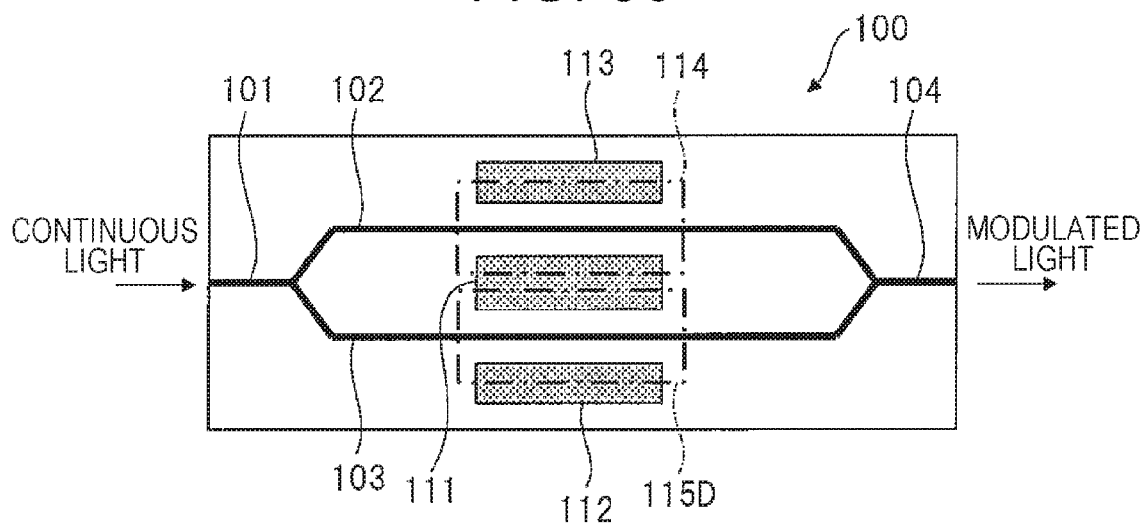
FIG. 36 is a top view of a Mach-Zehnder-type modulator according to a fifth embodiment.
Figure 37:
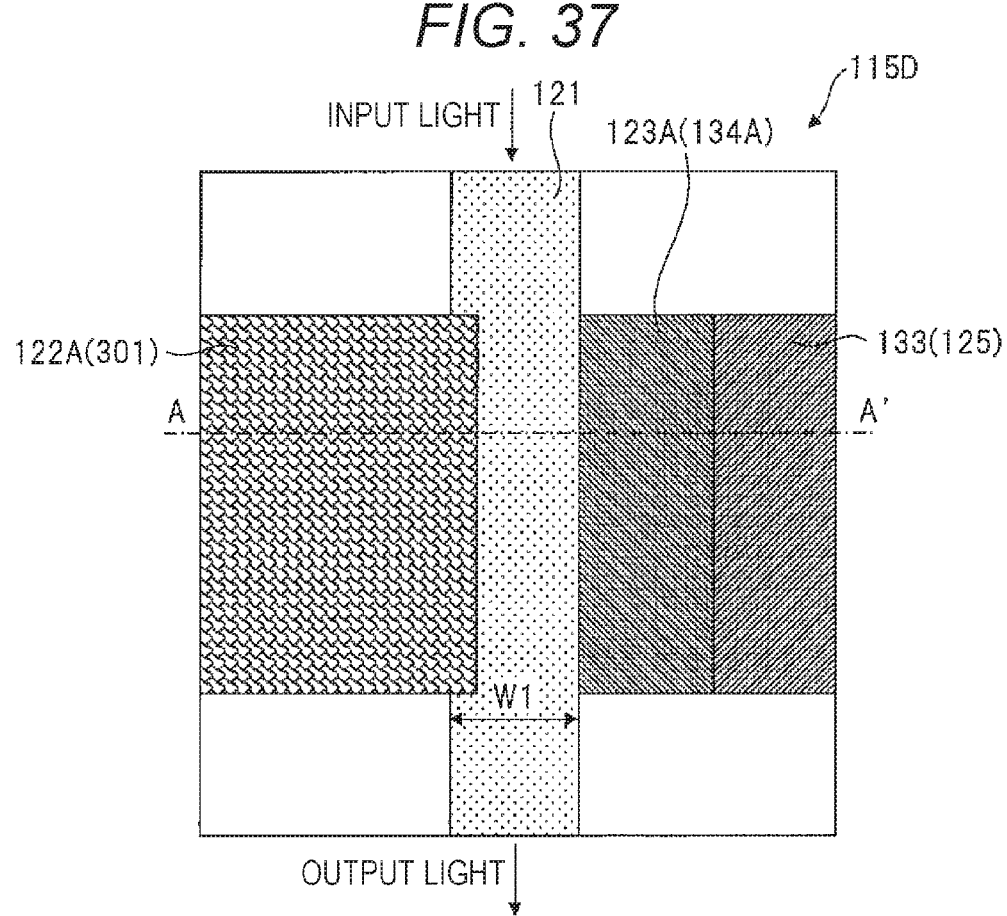
FIG. 37 is a principal portion plan view of an optical modulator according to the fifth embodiment.
Figure 38:
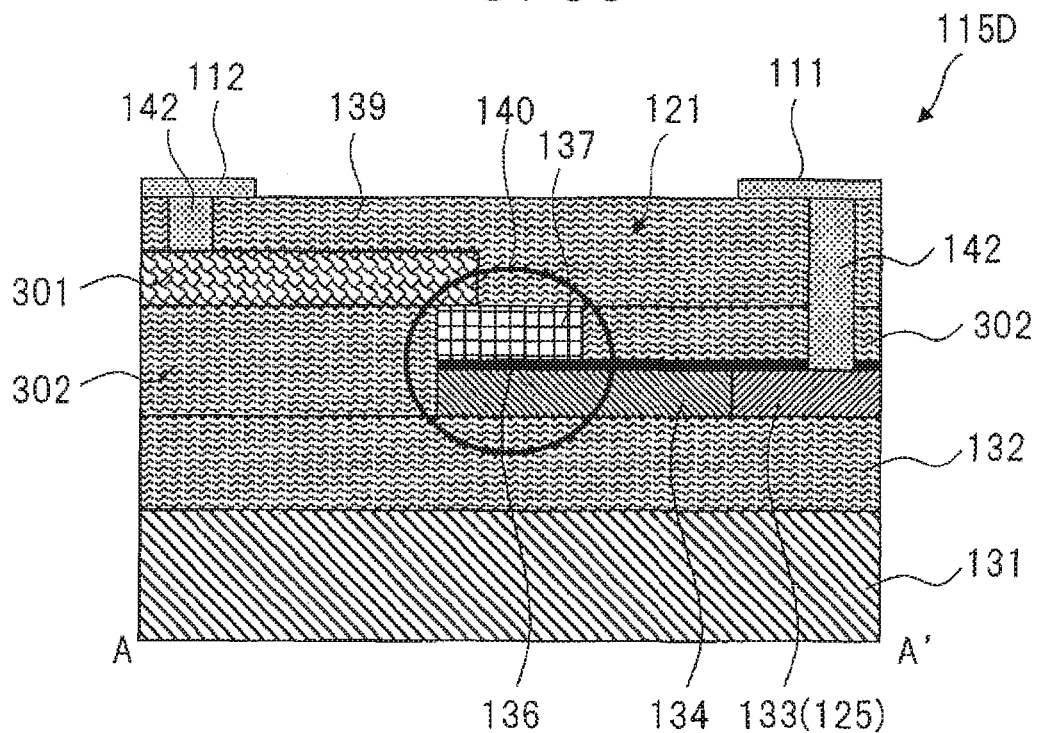
FIG. 38 is a principal portion sectional view along an A-A' line of FIG. 37.

A fifth embodiment corresponds to a modification of the first embodiment, and FIG. 36 illustrates a modification of the optical modulator 115 in the Mach-Zehnder-type modulator 100 illustrated in FIG. 1. FIG. 37 is a principal portion plan view of an optical modulator 115D of the fifth embodiment, and FIG. 38 is a principal portion sectional view along the A-A' line of FIG. 37. FIGS. 39 to 47 are principal portion plan views and principal portion sectional views during a process of manufacturing the optical modulator 115D of the fifth embodiment. A portion denoted with a similar reference sign to the first embodiment has a configuration similar to the first embodiment.

The fifth embodiment is different in a structure of a portion that connects an optical waveguide core 121, and electrodes 111 and 112, compared with the optical modulator 115 of the first embodiment.

As illustrated in FIG. 37, an optical waveguide core 121 is electrically connected with an electrode 111 through a right fin 123A and a right pad 125. Note that the right fin 123A has a plate pattern, instead of a grating pattern. The optical waveguide core 121 is electrically connected with an electrode 112 through a left fin 122A. The left fin 122A is configured from a p-type polycrystal silicon film 301 having low impurity concentration. The p-type polycrystal silicon film 301 also has a plate pattern.

As illustrated in FIG. 38, the optical waveguide core 121 is configured from a $p^-$ type semiconductor region 137 made of a single crystal silicon layer, a gate insulating film 136, and an $n^-$ type semiconductor region 134 made of a single crystal silicon layer. That is, the optical waveguide core 121 is a region where the three of the $p^-$ type semiconductor region 137, the gate insulating film 136, and the $n^-$ type semiconductor region 134 are layered. The $n^-$ type semiconductor region 134 that configures the optical waveguide core 121 is connected to an electrode 111 through an $n^-$ type semiconductor region 134 that configures the right fin 123A, an $n^+$ type semiconductor region 133 that configures the right pad 125, and a conductor plug 142. The $p^-$ type semiconductor region 137 that configures the optical waveguide core 121 is connected to an electrode 112 through the p-type polycrystal silicon film 301 that configures the left fin 122A and the conductor plug 142.

A left side of the $n^-$ type semiconductor region 134 that configures the optical waveguide core 121 is coated with an insulating film 302. Further, the right and left of the $p^-$ type semiconductor region 137 that configures the optical waveguide core 121 are coated with the insulating film 302. A part of an upper plane of the $p^-$ type semiconductor region 137 is connected to the p-type polycrystal silicon film 301, and portions other than the part are coated with an interlayer insulating film 139 made of a silicon oxide film. Further, a lower portion of the $n^-$ type semiconductor region 134 that configures the optical waveguide core 121 is coated with a buried insulating film 132 made of a silicon oxide film.

Next, a method of manufacturing the optical modulator 115D of the fifth embodiment will be described.

Figure 39:
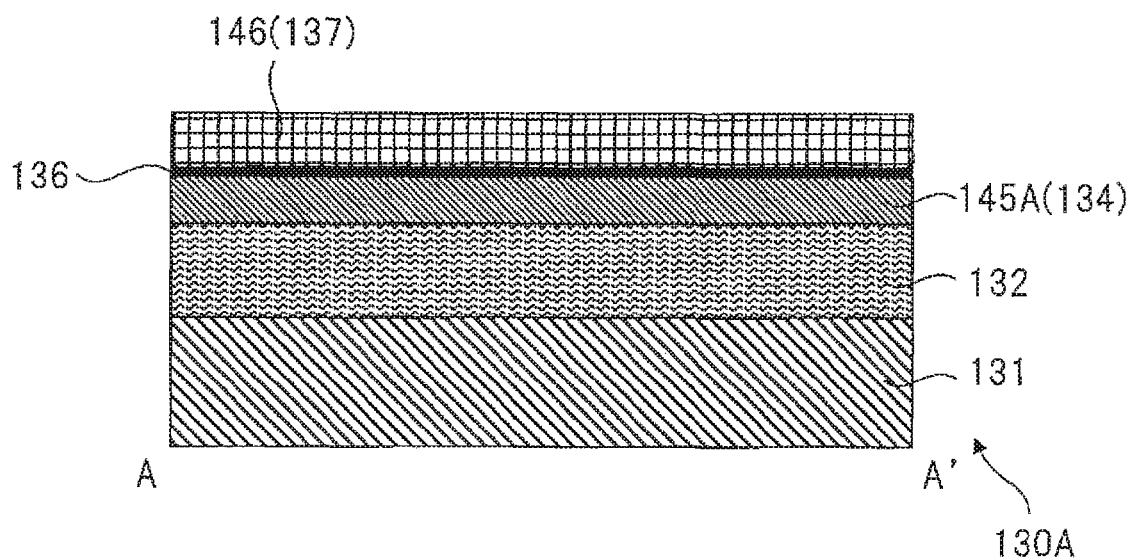
FIG. 39 is a principal portion sectional view during a process of manufacturing the optical modulator according to the fifth embodiment.

FIG. 39 is a principal portion sectional view during a process of manufacturing the optical modulator 115D of the fifth embodiment. As illustrated in FIG. 39, first, a substrate 130A is prepared. This substrate 130A has a structure in which a silicon substrate 131, the buried insulating film 132, a first silicon layer 145A, the gate insulating film 136, and a second silicon layer 146 are laminated in order, similar to the third embodiment.

Figure 40:
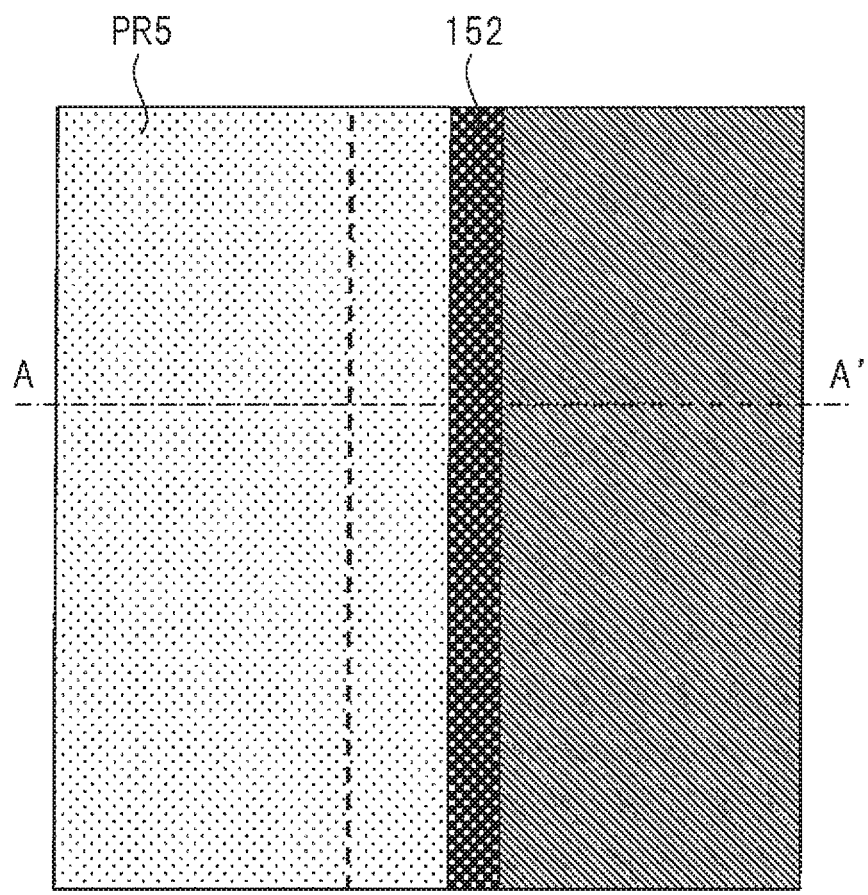
FIG. 40 is a principal portion plan view during the process of manufacturing the optical modulator, which follows FIG. 39.
Figure 41:
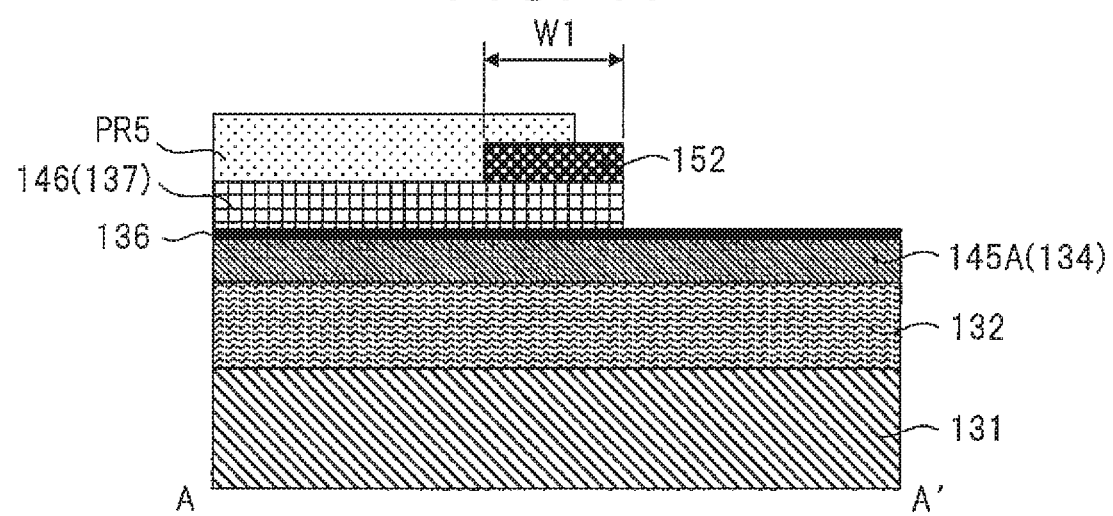
FIG. 41 is a principal portion sectional view along an A-A' line of FIG. 40.

FIGS. 40 and 41 are a principal portion plan view and a principal portion sectional view during the manufacturing process following FIG. 39. A core forming mask 152 made of a silicon oxide film and a photoresist film PR5 are formed, and anisotropic dry etching such as RIE is applied to the second silicon layer 146, using the aforementioned films as a mask, and the second silicon layer 146 is patterned. A right-side end portion (side wall) of the second silicon layer 146 accords with a right-side end portion (side wall) of the core forming mask 152. This method is similar to the method of the first or fourth embodiment. After the anisotropic dry etching of the second silicon layer 146, the photoresist film PR5 is removed. FIG. 40 does not illustrate the gate insulating film 136.

Figure 42:
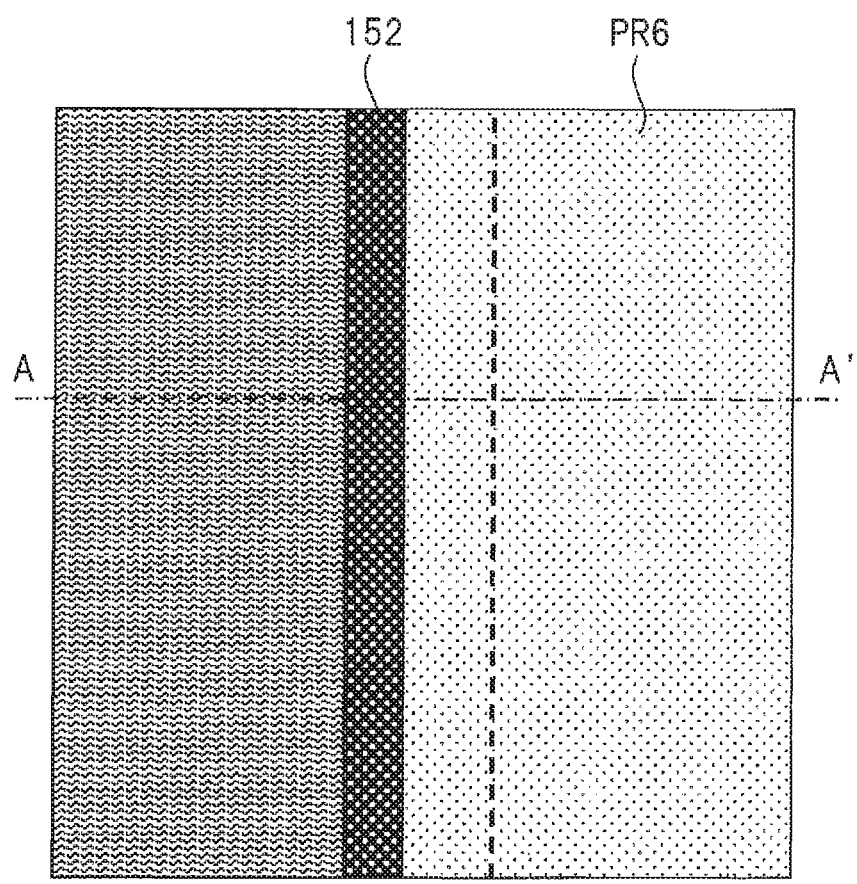
FIG. 42 is a principal portion plan view during the process of manufacturing the optical modulator, which follows FIG. 41.
Figure 43:
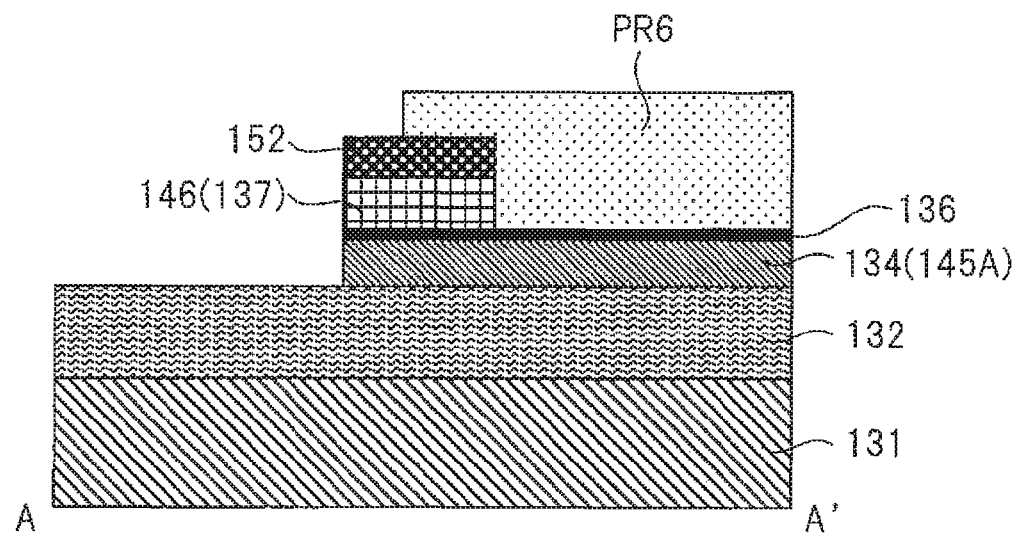
FIG. 43 is a principal portion sectional view along an A-A' line of FIG. 42.

FIGS. 42 and 43 are a principal portion plan view and a principal portion sectional view during the manufacturing process following FIG. 41. A photoresist film PR6 that coats the $n^-$ type semiconductor region 134 in which the right fin 123A and the right pad 125 are formed, and a left-side end portion of which is positioned on the core forming mask 152 is formed, and the second silicon layer 146, the gate insulating film 136, and the first silicon layer 145 are removed by the anisotropic dry etching such as RIE, using the core forming mask 152 and the photoresist film PR6 as a mask. Left-side end portions (side walls) of the second silicon layer 146, the gate insulating film 136, and the first silicon layer 145 accord with a left-side end portion (side wall) of the core forming mask 152. By the two-time anisotropic dry etching process, the $p^-$ type semiconductor region 137 and the $n^-$ type semiconductor region 134 are formed. After that, the photoresist film PR6 and the core forming mask 152 are removed.

Figure 44:
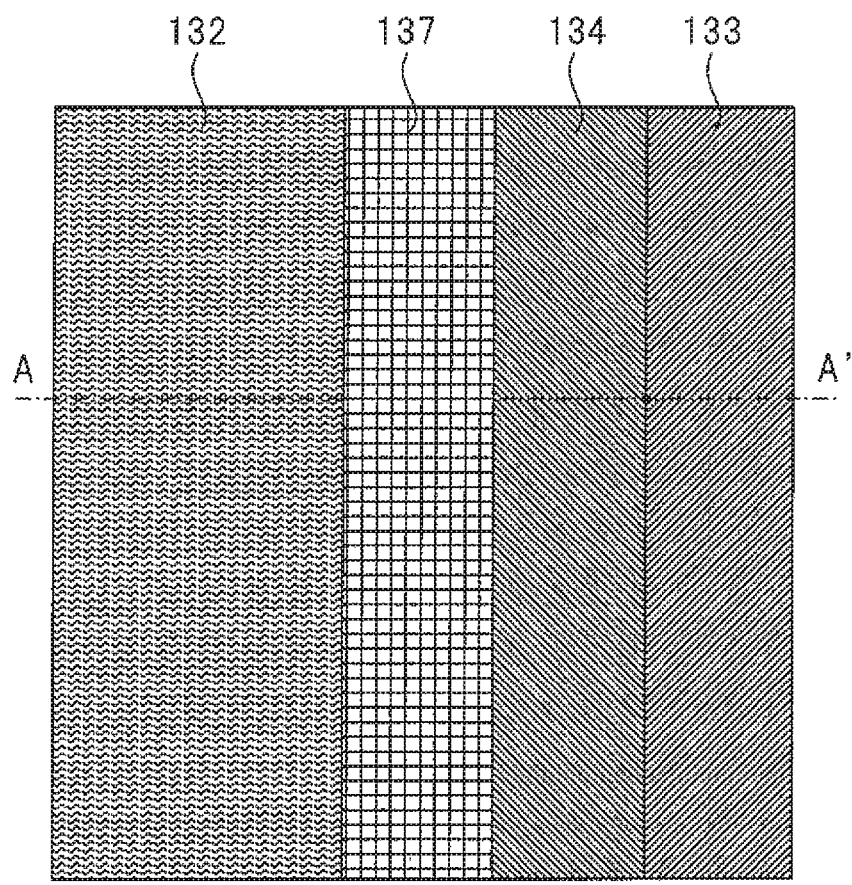
FIG. 44 is a principal portion plan view during the process of manufacturing the optical modulator, which follows FIG. 43.
Figure 45:
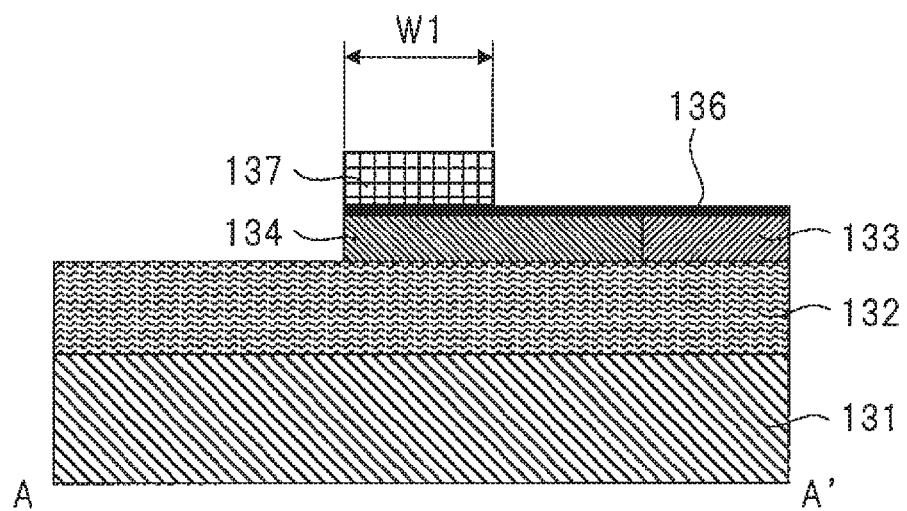
FIG. 45 is a principal portion sectional view along an A-A' line of FIG. 44.

FIGS. 44 and 45 are a principal portion plan view and a principal portion sectional view during the manufacturing process following FIG. 43. As illustrated in FIGS. 44 and 45, the $n^+$ type semiconductor region 133 is formed. The $n^+$ type semiconductor region 133 is formed similarly to the first embodiment.

Figure 46:
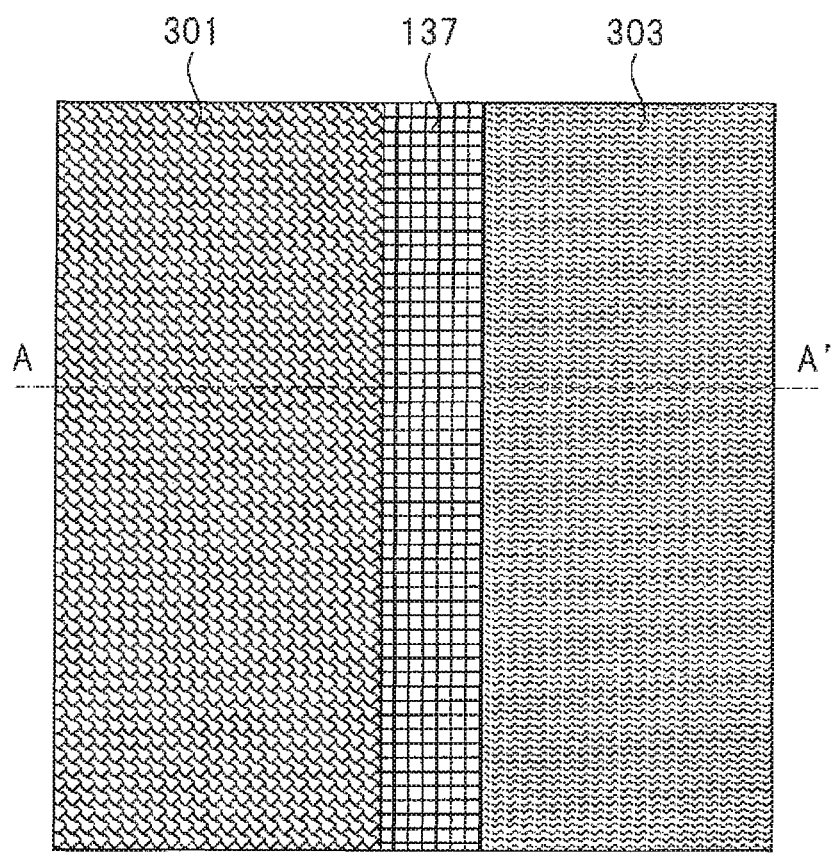
FIG. 46 is a principal portion plan view during the process of manufacturing the optical modulator, which follows FIG. 45.
Figure 47:
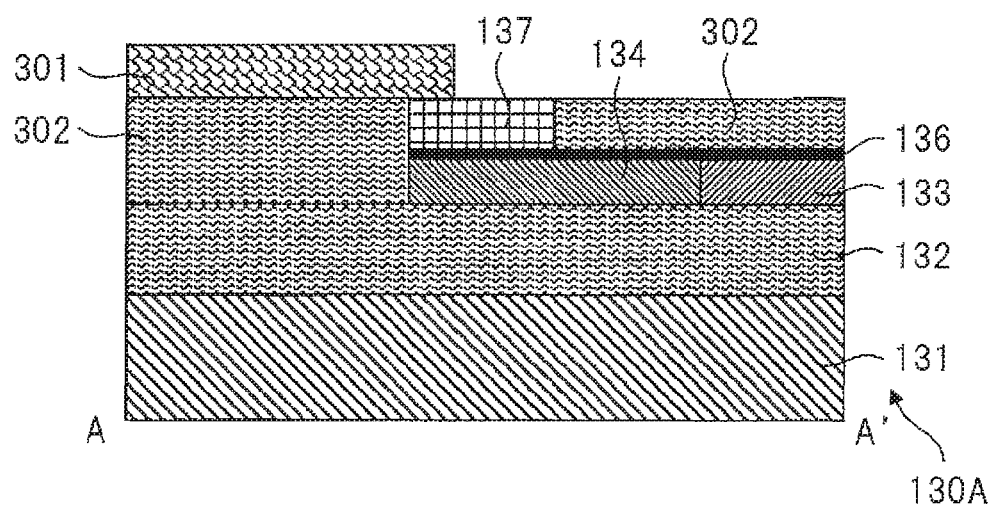
FIG. 47 is a principal portion sectional view along an A-A' line of FIG. 46.

FIGS. 46 and 47 are a principal portion plan view and a principal portion sectional view during the manufacturing process following FIG. 45. After the insulating film 302 such as a silicon oxide film is deposited on the substrate 130A, the insulating film 302 is polished by a CMP method, so that a surface of the $p^-$ type semiconductor region 137 is exposed. Next, the p-type polycrystal silicon layer 301 containing impurities such as B (boron) is formed, and patterning is performed such that a part of the p-type polycrystal silicon layer 301 comes in contact with a surface of the p⁻ type semiconductor region 137, and extends to the insulating film 302 on the right side of the p⁻ type semiconductor region 137.

Next, the interlayer insulating film 139 is deposited on the substrate 130A, and a conductor plug 142 and electrodes 111 and 112 are further formed similarly to the first embodiment, so that the optical modulator 115D illustrated in FIG. 38 is completed.

The second silicon layer 146, the gate insulating film 136, and the first silicon layer 145 are patterned with a width W1 of the core forming mask 152. Therefore, the width W1 of the optical waveguide core 121 can be highly accurately formed.

Further, the n⁻ type semiconductor region 134 and the p⁻ type semiconductor region 137 positioned up and down of the gate insulating film 136 are formed of a single crystal silicon film. Therefore, an optical loss of light that passes through the optical waveguide core 121 can be decreased.

Further, the optical waveguide core 121 is configured from the linear pattern. Therefore, the manufacturing process becomes easy, and improvement of manufacturing yield and the like can be achieved, compared with the first to fourth embodiments.

Sixth Embodiment

Figure 48:
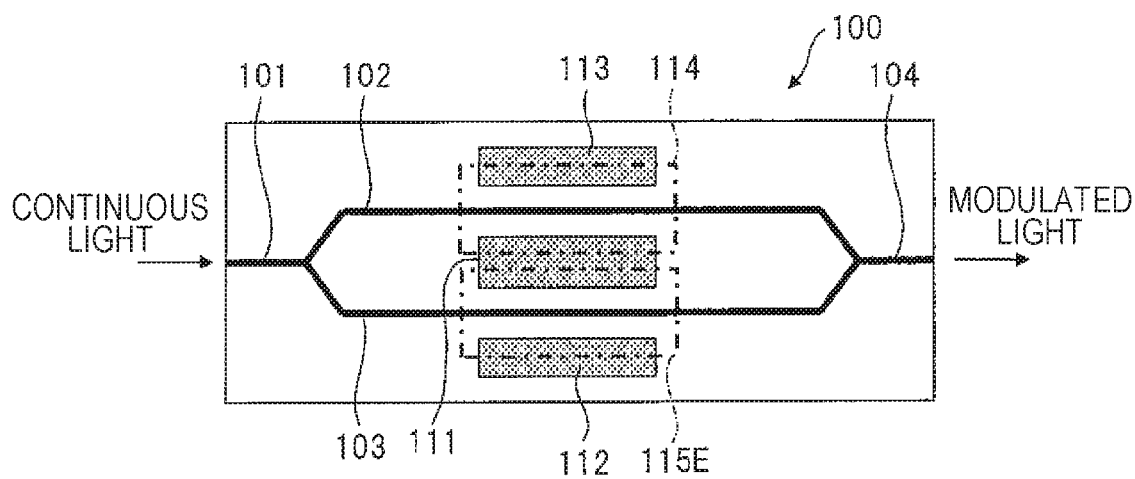
FIG. 48 is a top view of a Mach-Zehnder-type modulator according to a sixth embodiment.
Figure 49:
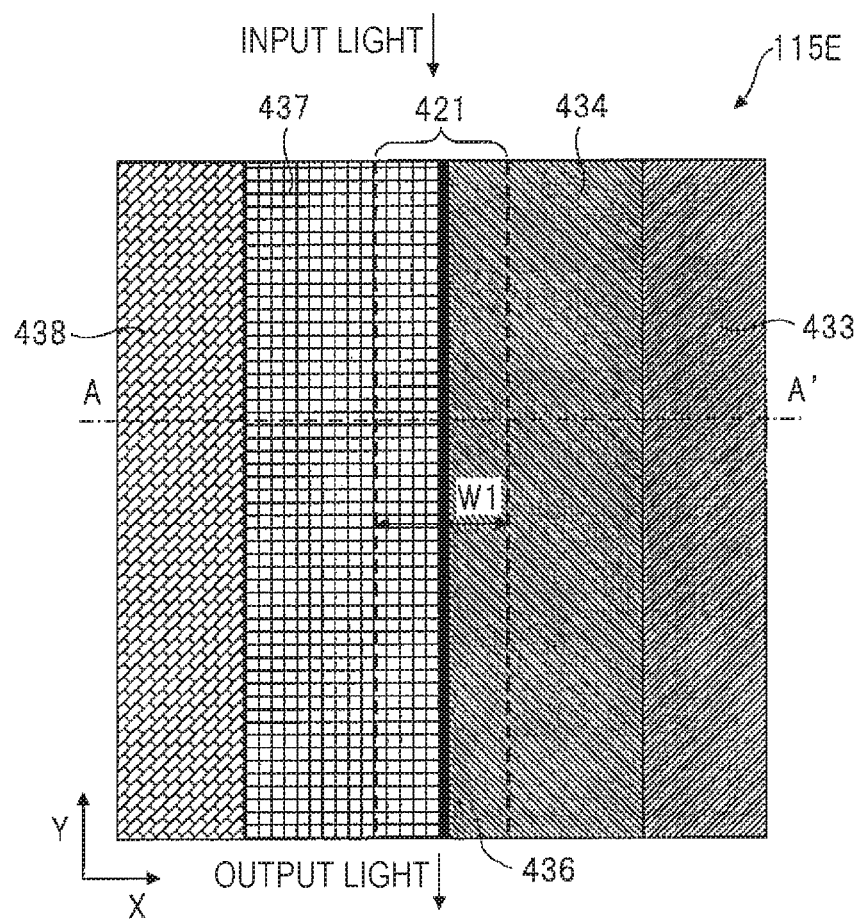
FIG. 49 is a principal portion plan view of an optical modulator according to the sixth embodiment.
Figure 50:
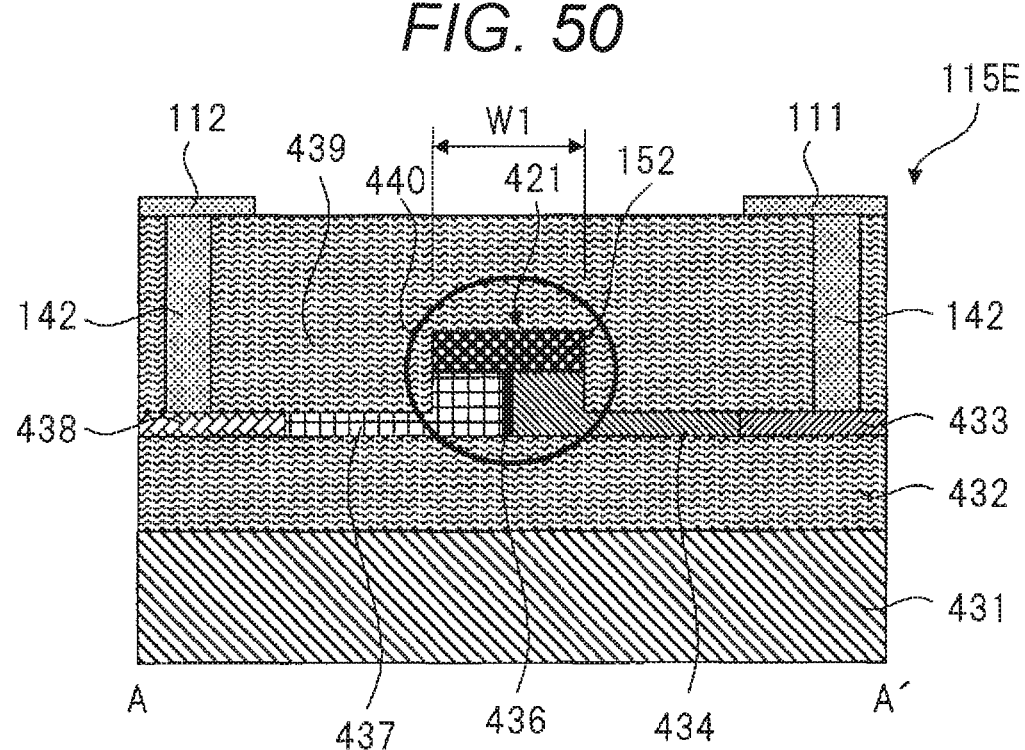
FIG. 50 is a principal portion sectional view along an A-A' line of FIG. 49.

FIG. 48 is a top view of a Mach-Zehnder-type modulator according to a sixth embodiment, FIG. 49 is a principal portion plan view of an optical modulator 115E, and FIG. 50 is a principal portion sectional view along an A-A' line of FIG. 49. FIGS. 51 to 63 are principal portion plan views and principal portion sectional views during a process of manufacturing the optical modulator 115E of the sixth embodiment.

In the optical modulator 115E of the sixth embodiment, a p⁻ type semiconductor region 437, a gate insulating film 436, an n⁻ type semiconductor region 434 that configure an optical waveguide core 421 are arranged in a cross direction on a buried insulating film 432. The gate insulating film 436 is arranged in a vertical direction to a silicon substrate 431.

As illustrated in FIG. 49, the optical waveguide core 421 having a width W1 extends on the buried insulating film 432 in a Y direction, and a p⁺ type semiconductor region 438 and an n⁺ type semiconductor region 433 extend in the Y direction in parallel to the optical waveguide core 421. The p⁻ type semiconductor region 437 that is apart of the optical waveguide core 421 extends in the Y direction between the optical waveguide core 421 and the p⁺ type semiconductor region 438. Further, the n⁻ type semiconductor region 434 that is a part of the optical waveguide core 421 extends in the Y direction between the optical waveguide core 421 and the n⁺ type semiconductor region 433. FIG. 49 does not illustrate electrodes 111 and 112, and illustrates the p⁺ type semiconductor region 438, the p⁻ type semiconductor region 437, the gate insulating film 436, the n⁻ type semiconductor region 434, and the n⁺ type semiconductor region 433. The p⁻ type semiconductor region 437 and the n⁻ type semiconductor region 434 have a plate pattern similar to the n⁻ type semiconductor region 123A of the fifth embodiment. However, a grating pattern like the first embodiment can be employed.

As illustrated in FIG. 50, the optical waveguide core 421 is configured from the p⁻ type semiconductor region 437, the gate insulating film 436, and the n⁻ type semiconductor region 434 arranged in a horizontal direction, and both right and left sides of the optical waveguide core 421 are coated with an interlayer insulating film 439 made of a silicon oxide film. The p⁻ type semiconductor region 437 that configures the optical waveguide core 421 is electrically connected with the electrode 112 through the p⁺ type semiconductor region 438 and the conductor plug 142. The n⁻ type semiconductor region 434 that configures the optical waveguide core 421 is electrically connected with the electrode 111 through the n⁺ type semiconductor region 434 and the conductor plug 142.

Next, a method of manufacturing the optical modulator 115E of the sixth embodiment will be described.

Figure 51:
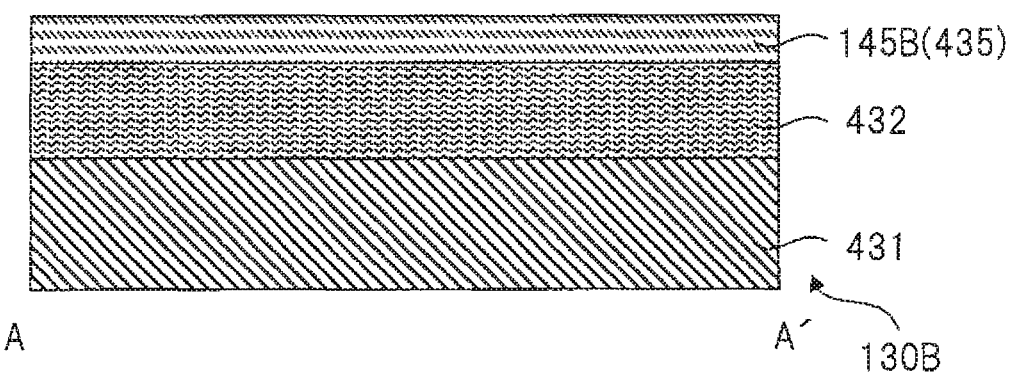
FIG. 51 is a principal portion sectional view during a process of manufacturing the optical modulator according to the sixth embodiment.

FIG. 51 is a principal portion sectional view during a process of manufacturing the optical modulator 115E of the sixth embodiment. First, a substrate 130B illustrated in FIG. 51 is prepared. This substrate 130B has a structure in which the buried insulating film 432 and a high resistance silicon layer 435 are laminated in order on the silicon substrate 431. The high resistance silicon layer 435 as a whole is configured from a single crystal silicon layer 145B with resistivity of 100 Ωcm.

Figure 52:
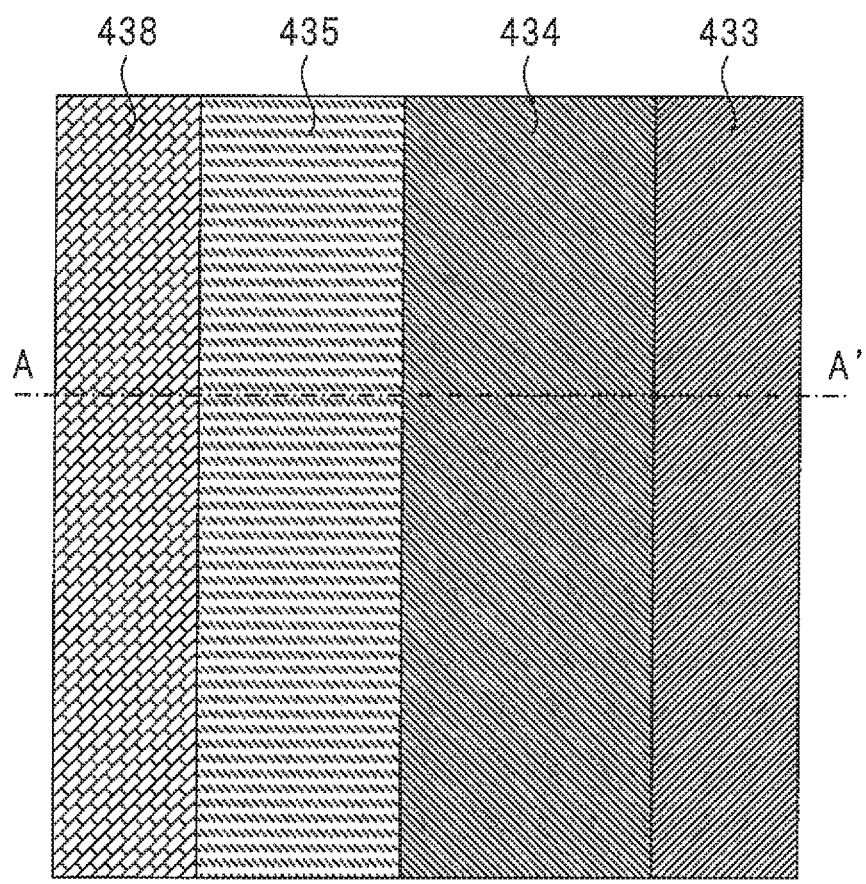
FIG. 52 is a principal portion plan view during the process of manufacturing the optical modulator, which follows FIG. 51.
Figure 53:
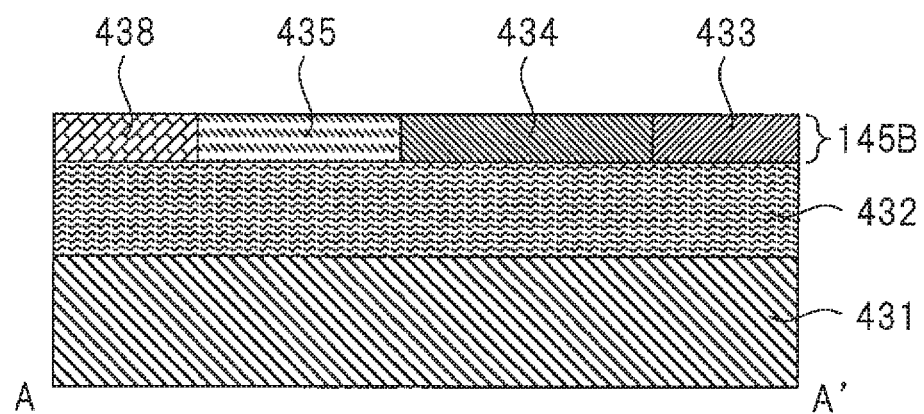
FIG. 53 is a principal portion sectional view along an A-A' line of FIG. 52.

FIGS. 52 and 53 are a principal portion plan view and a principal portion sectional view during the manufacturing process following FIG. 51. By repeating a process of forming a mask made of a photoresist film and a process of implanting impurity ions, the n⁻ type semiconductor region 434, the n⁺ type semiconductor region 433, and the p⁺ type semiconductor region 438 are formed in order. The n⁻ type semiconductor region 434 has the concentration of $1 \times 10^{18}$ cm⁻³ by ion implantation of impurities such as P (phosphorus), and the n⁺ type semiconductor region 433 has the concentration of $1 \times 10^{20}$ cm⁻³ by ion implantation of impurities such as P (phosphorus). The p⁺ type semiconductor region 438 has the concentration of $1 \times 10^{20}$ cm⁻³ by ion implantation of impurities such as B (boron).

Figure 54:
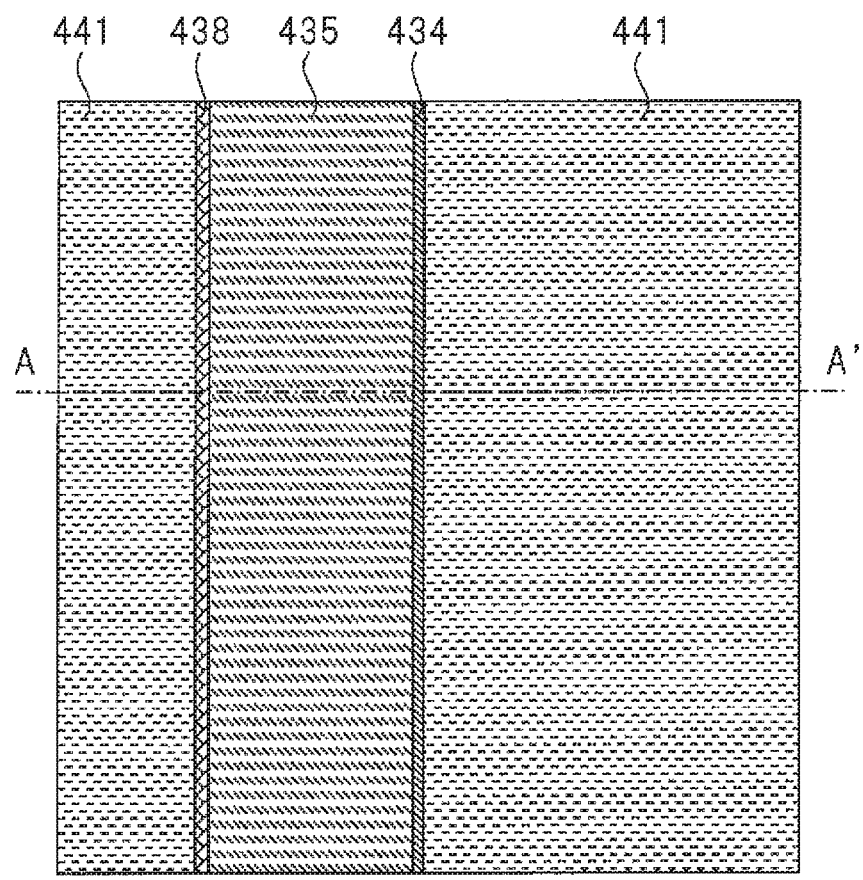
FIG. 54 is a principal portion plan view during the process of manufacturing the optical modulator, which follows FIG. 53.
Figure 55:
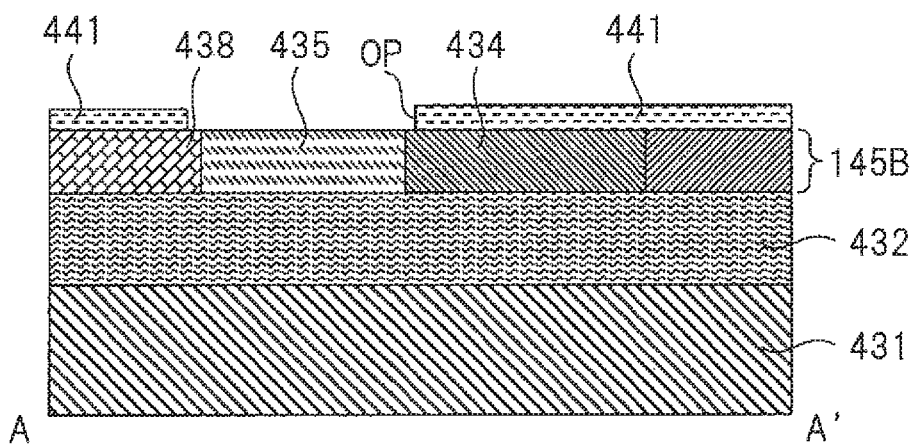
FIG. 55 is a principal portion sectional view along an A-A' line of FIG. 54.

FIGS. 54 and 55 are a principal portion plan view and a principal portion sectional view during the manufacturing process following FIG. 53. A mask layer 441 made of a silicon nitride film is formed on the single crystal silicon layer 145B. The mask layer 441 has an opening OP, and the opening OP causes a region of the high resistance silicon layer 435 to be completely exposed. The p-type impurities such as B (boron) are implanted into the opening OP of the mask layer 441, and the high resistance silicon layer 435 is formed into the p⁻ type semiconductor region 437 with the impurity concentration of $1.5 \times 10^{18}$ cm⁻³. One end portion of the mask layer 441 is positioned on the n⁻ type semiconductor region 434, and the other end portion is positioned on the p⁺ type semiconductor region 438. This configuration is employed not to allow the high resistance silicon layer 435 to remain on the both ends of the p⁻ type semiconductor region 437 even if the mask layer 441 has misalignment.

Figure 56:
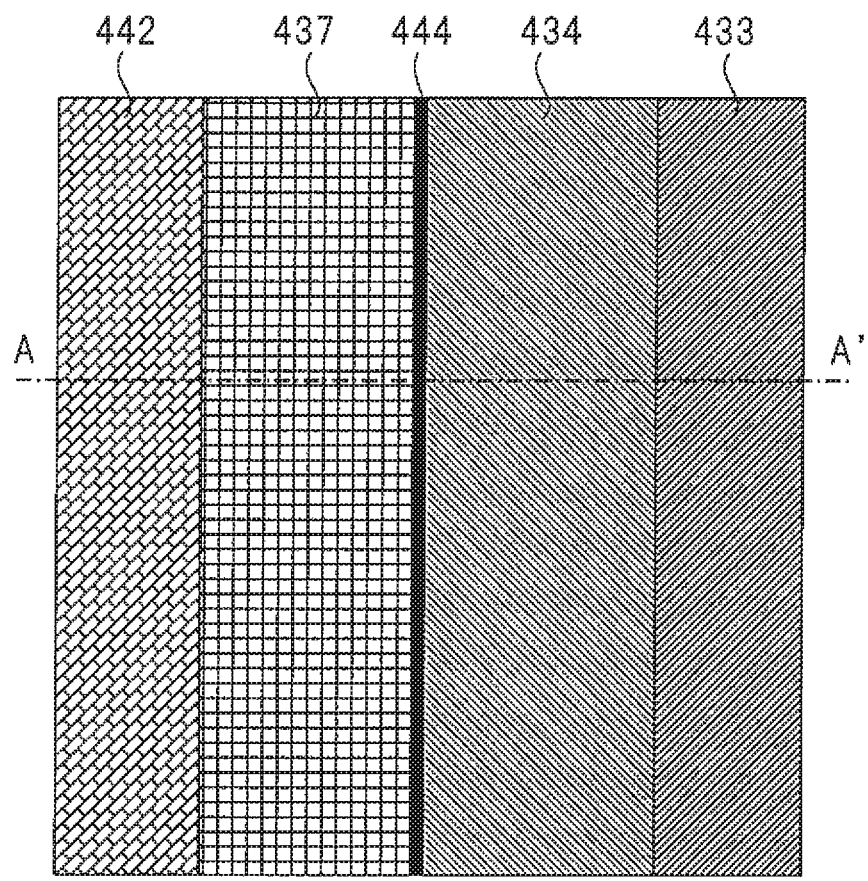
FIG. 56 is a principal portion plan view during the process of manufacturing the optical modulator, which follows FIG. 55.
Figure 57:
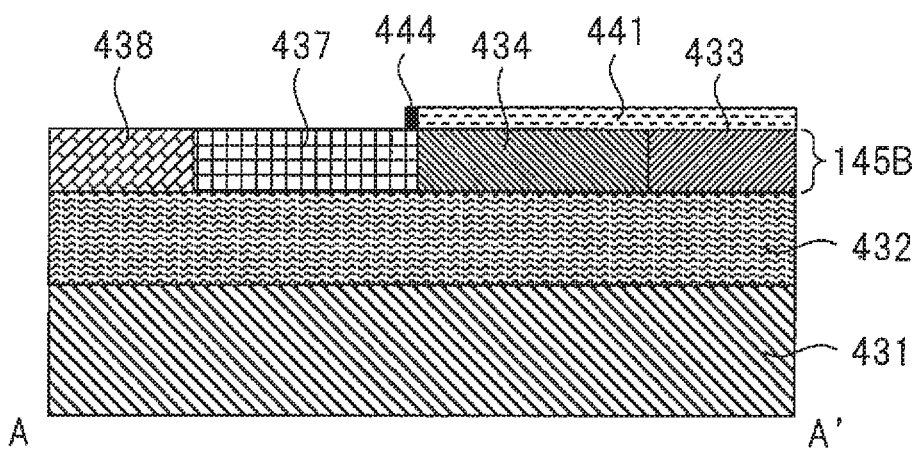
FIG. 57 is a principal portion sectional view along an A-A' line of FIG. 56.

FIGS. 56 and 57 are a principal portion plan view and a principal portion sectional view during the manufacturing process following FIG. 55. The mask layer 441 on the p⁺ type semiconductor region 438 is selectively removed. After that, a silicon oxide film is deposited to coat the mask layer 441 on the n⁻ type semiconductor region 434, and the anisotropic dry etching such as RIE is applied, so that a side-wall insulating film 444 is formed on a side wall of the mask layer 441. FIG. 56 does not illustrate the mask layer 441.

Figure 58:
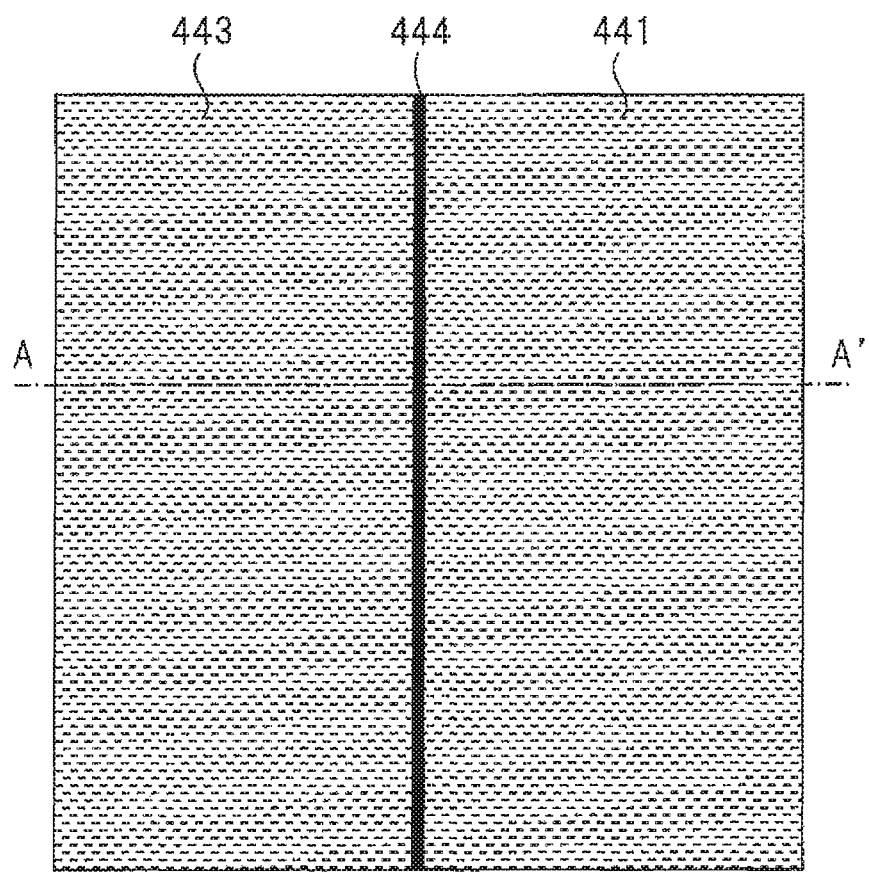
FIG. 58 is a principal portion plan view during the process of manufacturing the optical modulator, which follows FIG. 57.
Figure 59:
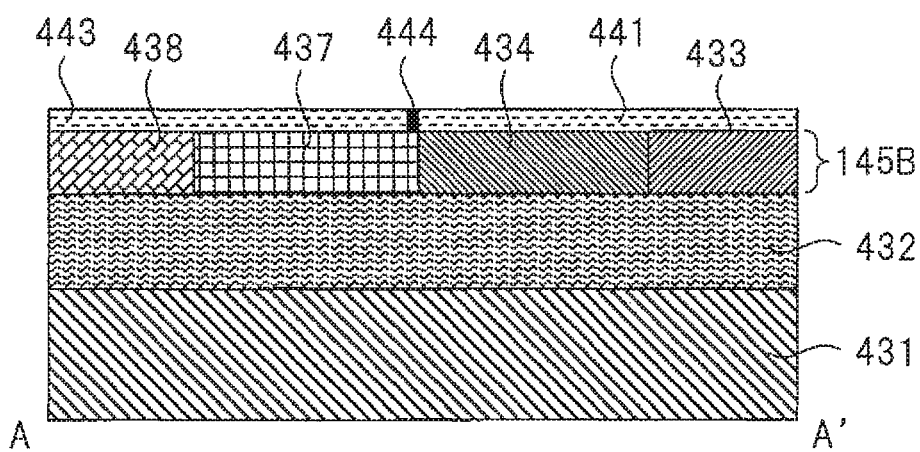
FIG. 59 is a principal portion sectional view along an A-A' line of FIG. 58.

FIGS. 58 and 59 are a principal portion plan view and a principal portion sectional view during the manufacturing process following FIG. 57. After a silicon nitride film 443 is deposited to coat the mask layer 441 and the side-wall insulating film 444, the CMP processing is applied to the silicon nitride film 443, and the CMP processing is stopped at the point of time when a head portion of the side-wall insulating film 444 is exposed, so that the mask layer 443 is formed on a left side of the side-wall insulating film 444, that is, on the p⁻ type semiconductor region 437 and the p⁺ type semiconductor region 438.

Figure 60:
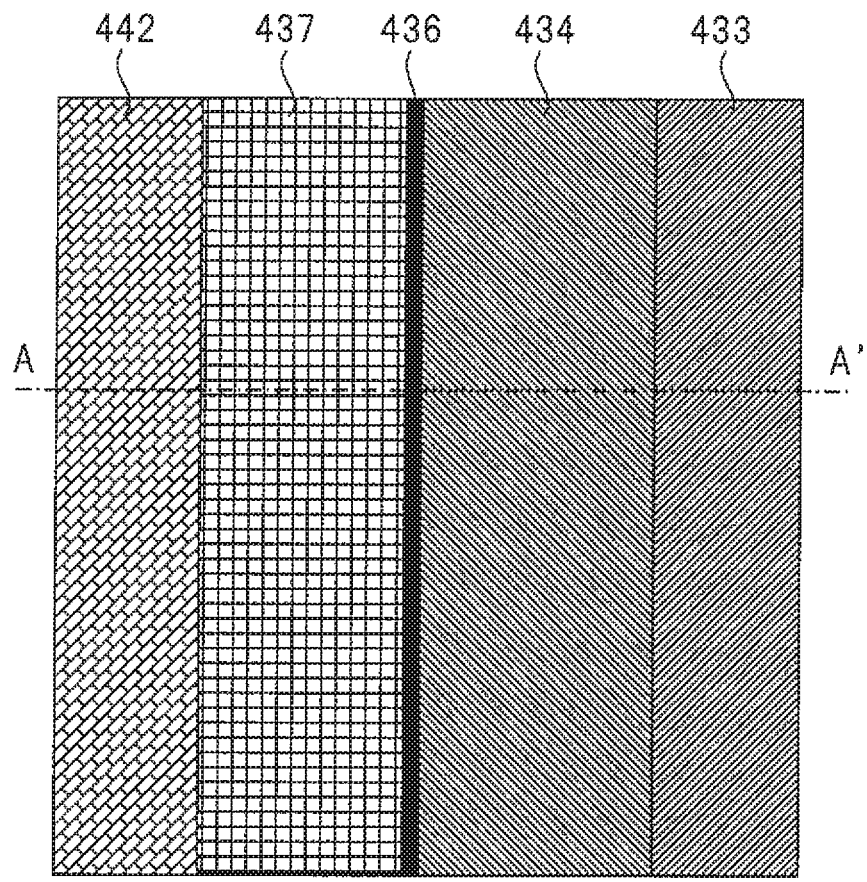
FIG. 60 is a principal portion plan view during the process of manufacturing the optical modulator, which follows FIG. 59.
Figure 61:
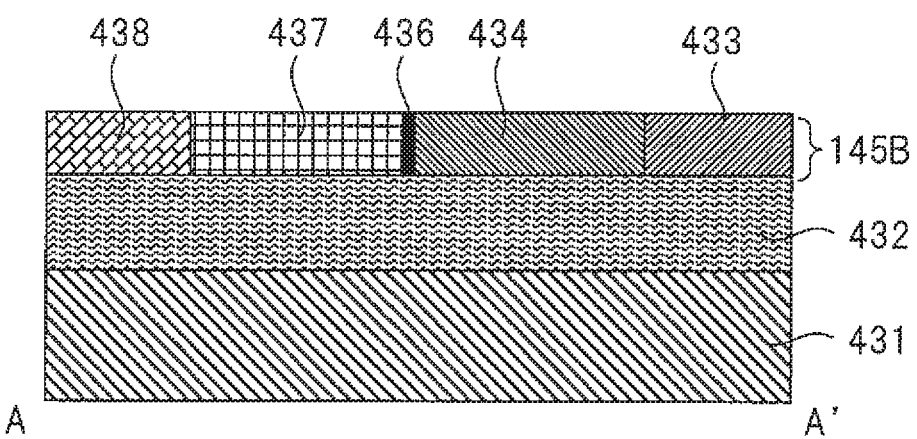
FIG. 61 is a principal portion sectional view along an A-A' line of FIG. 60.

FIGS. 60 and 61 are a principal portion plan view and a principal portion sectional view during the manufacturing process following FIG. 59. The side-wall insulating film 444 made of a silicon oxide film is removed, and the anisotropic dry etching such as RIE is applied to the p⁻ type semiconductor region 437 in the portion where the side-wall insulating film 444 has been removed, using the mask layers 441 and 443 as a mask so that the p⁻ type semiconductor region 437 is removed. After that, the gate insulating film 436 is formed on the portion where the p⁻ type semiconductor region 437 has been removed by an optical CVD method, and the mask layers 441 and 443 are removed.

Figure 62:
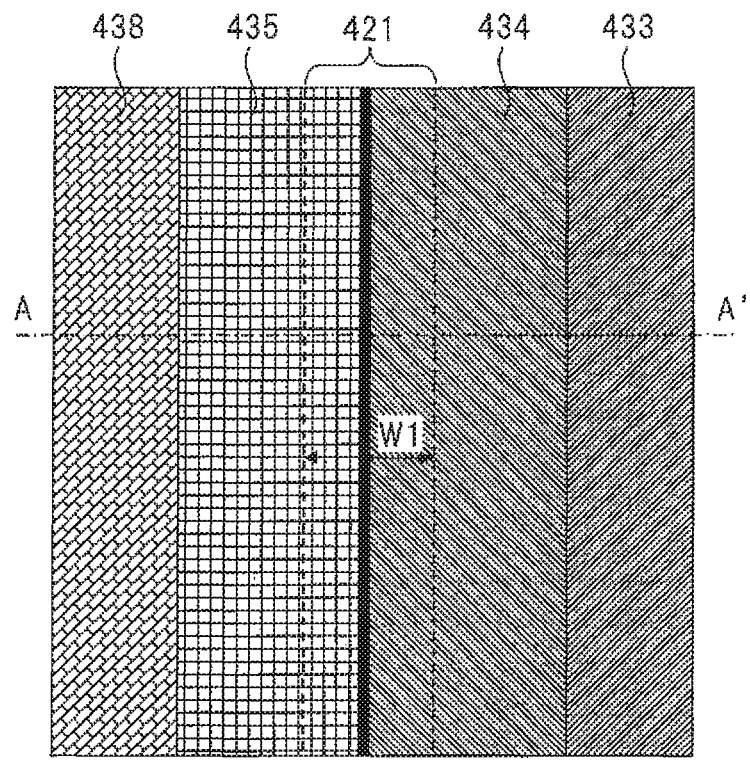
FIG. 62 is a principal portion plan view during the process of manufacturing the optical modulator, which follows FIG. 61.
Figure 63:
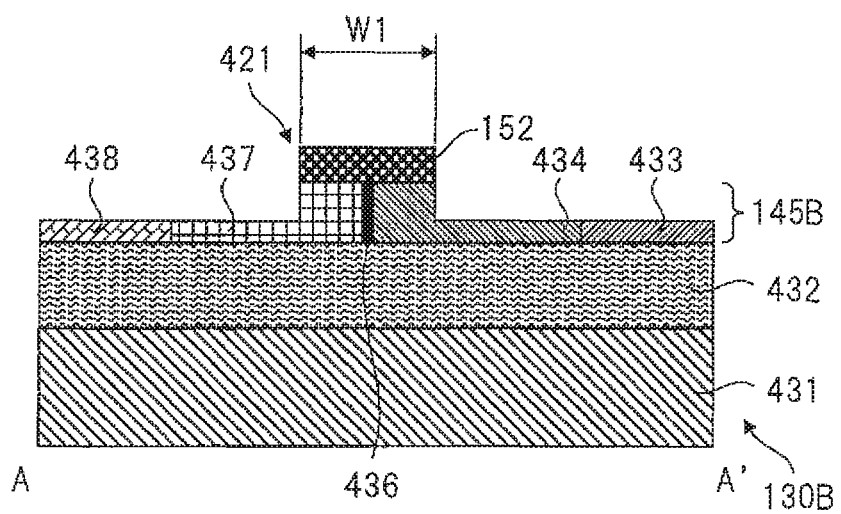
FIG. 63 is a principal portion sectional view along an A-A' line of FIG. 62.

FIGS. 62 and 63 are a principal portion plan view and a principal portion sectional view during the manufacturing process following FIG. 61. A core forming mask 152 having a width W1 and made of a silicon oxide film is formed on the gate insulating film 436, for example, and the anisotropic dry etching such as RIE is applied to the single crystal silicon layer 145B, so that the optical waveguide core 421 having the width W1 is formed.

Following that, as described in the first embodiment, after the interlayer insulating film 439 made of a silicon oxide film is formed, the CMP processing is applied to a surface of the interlayer insulating film 439, and the conductor plug 142 and the electrodes 111 and 112 are formed, so that the optical modulator 115E of the sixth embodiment is completed.

According to the manufacturing method of the sixth embodiment, the gate insulating film 436 can be formed in the boundary portion between the n⁻ type semiconductor region 434 and the p⁻ type semiconductor region 437 by self-alignment. Therefore, modulation efficiency of the optical modulator 115E can be made favorable.

The width of the optical waveguide core can be controlled by the patterning using the core forming mask 152. Therefore, highly accurate processing that does not affect mask and wafer alignment accuracy becomes possible.

Further, the second embodiment can be combined with the sixth embodiment. That is, by causing the orientation of the surface of the high resistance silicon layer 435 of the substrate 130B to be a (110) plane, the direction into which the optical waveguide core 421 extends to be a <11-2 direction>, and the direction into which side-wall gratings 161 and 162 extend to be a <-1-1-2> direction, a groove in which the gate insulating film 436 is formed can be formed by anisotropic wet etching using an alkaline solution in which TMAH is diluted. As a result, the boundary between the n⁻ type semiconductor region 434 and the p⁻ type semiconductor region 437 becomes flat, and an optical loss can be further reduced.

Seventh Embodiment

Figure 64:
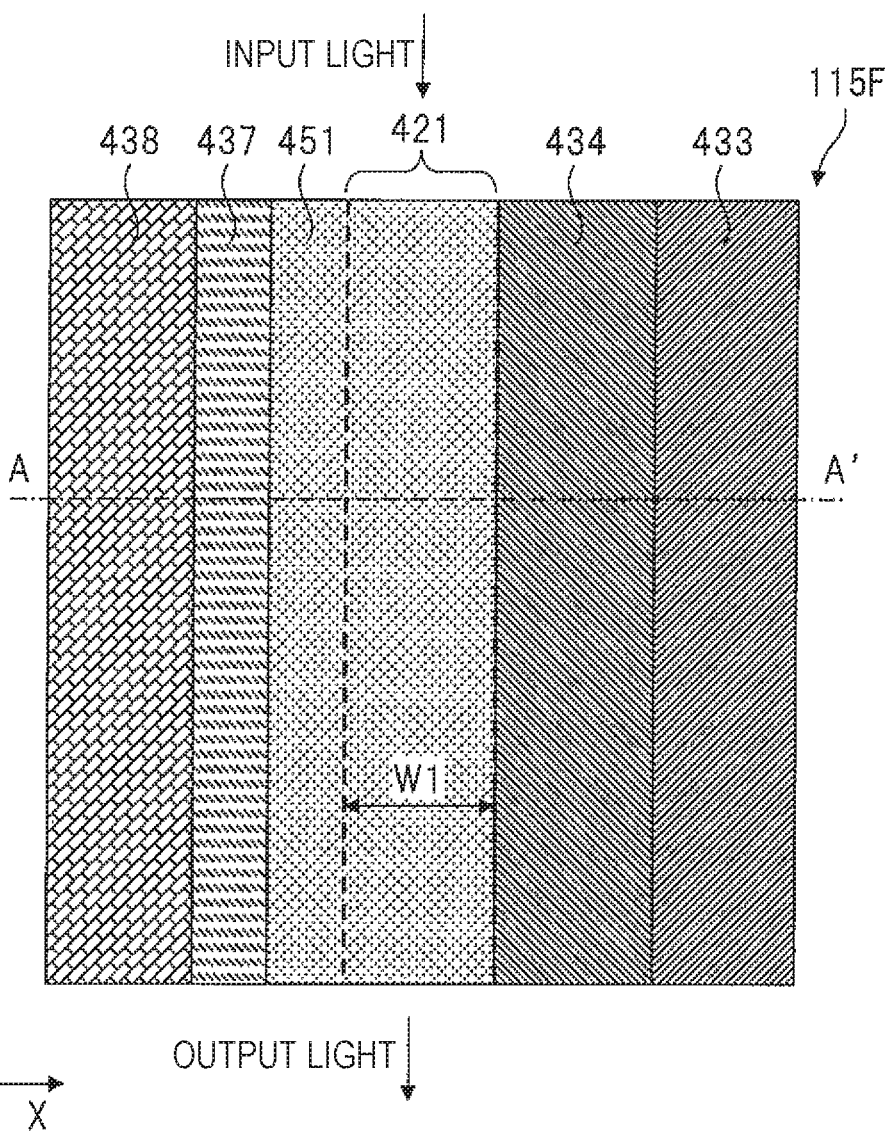
FIG. 64 is a principal portion plan view of an optical modulator according to a seventh embodiment.

A seventh embodiment corresponds to a modification of the sixth embodiment, and is a modification of the modulator 115E in the Mach-Zehnder-type modulator 100 illustrated in FIG. 48. FIG. 64 is a principal portion plan view of an optical modulator 115F according to the seventh embodiment, and FIG. 65 is a principal portion sectional view along an A-A' line of FIG. 64.

As illustrated in FIG. 64, on a principal surface of a silicon substrate 431, an optical waveguide core 421 having a width W1 extends in a Y direction, and a p⁺ type semiconductor region 438 and an n⁺ type semiconductor region 433 extend in the Y direction in parallel to the optical waveguide core 421. A p-type crystal silicon layer 451 that is a part of the optical waveguide core 421 and a p⁻ type semiconductor region 437 adjacent to the p-type crystal silicon layer 451 extend in the Y direction between the optical waveguide core 421 and the p⁺ type semiconductor region 438. Further, an n⁻ type semiconductor region 434 that is apart of the optical waveguide core 421 extends in the Y direction between the optical waveguide core 421 and the n⁺ type semiconductor region 433. FIG. 64 does not illustrate electrodes 111 and 112, and illustrates the p⁺ type semiconductor region 438, the p⁻ type semiconductor region 437, the gate insulating film 436, the n⁻ type semiconductor region 434, and the n⁺ type semiconductor region 433.

Figure 65:
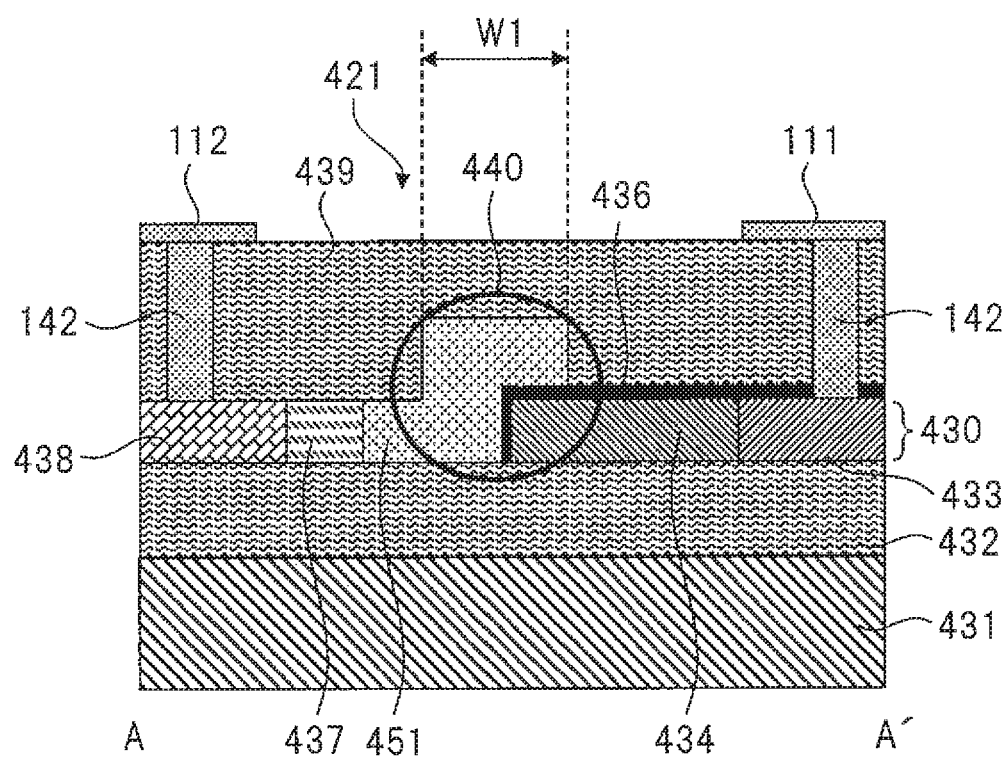
FIG. 65 is a principal portion sectional view along an A-A' line of FIG. 64.

As illustrated in FIG. 65, the p⁺ type semiconductor region 438, the p⁻ type semiconductor region 437, the p-type crystal silicon layer 451, the n⁻ type semiconductor region 434, and the n⁺ type semiconductor region 433 are arranged in order on a buried insulating film 432. A part of the p-type crystal silicon layer 451 runs onto the n⁻ type semiconductor region 434. The gate insulating film 436 lies between the p-type crystal silicon layer 451 and the n⁻ type semiconductor region 434. The p-type crystal silicon layer 451, the gate insulating film 436, and the n⁻ type semiconductor region 434 configure the optical waveguide core 421. Further, both right and left sides and an upper portion of the p-type crystal silicon layer 451 that configures the optical waveguide core 421 having the width W1 are coated with an interlayer insulating film 439 made of a silicon oxide film. Further, the p⁺ type semiconductor region 438 and the n⁺ type semiconductor region 433 are electrically connected to the electrodes 112 and 111 through a conductor plug 142.

Next, a method of manufacturing the optical modulator 115F of the seventh embodiment will be described. First, a substrate 130B in which a buried insulting film 432 and a high resistance silicon layer 435 are laminated in order on a silicon substrate 431 is prepared, similarly to the sixth embodiment. The high resistance silicon layer 435 is made of a single crystal silicon layer 430.

Figure 66:
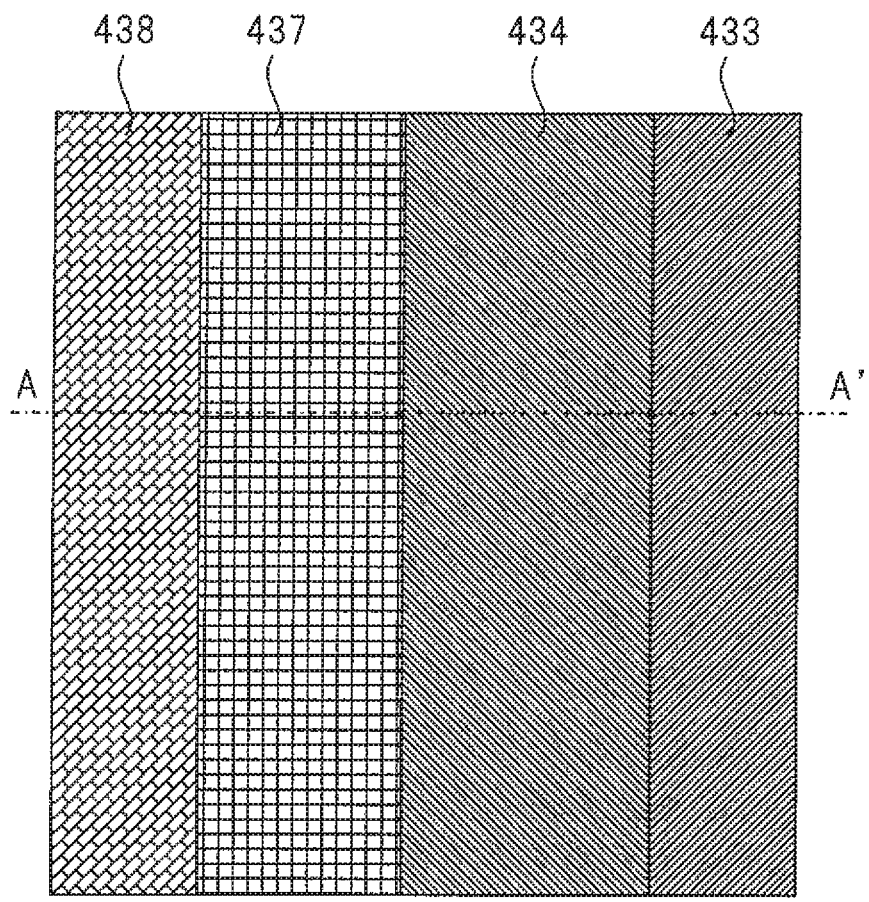
FIG. 66 is a principal portion plan view during a process of manufacturing the optical modulator according to the seventh embodiment.
Figure 67:
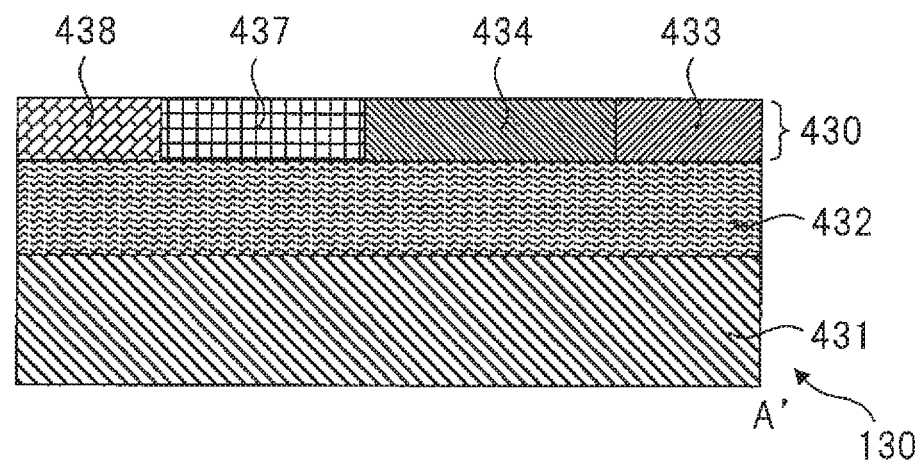
FIG. 67 is a principal portion sectional view along an A-A' line of FIG. 66.

FIGS. 66 and 67 are a principal portion plan view and a principal portion sectional view during a process of manufacturing the optical modulator 115F of the seventh embodiment. The p⁺ type semiconductor region 438, the p⁻ type semiconductor region 437, the n⁻ type semiconductor region 434, and the n⁺ type semiconductor region 433 are formed on the buried insulating film 432. This manufacturing method is similar to the method described using FIGS. 52 to 55 of the sixth embodiment.

Figure 68:
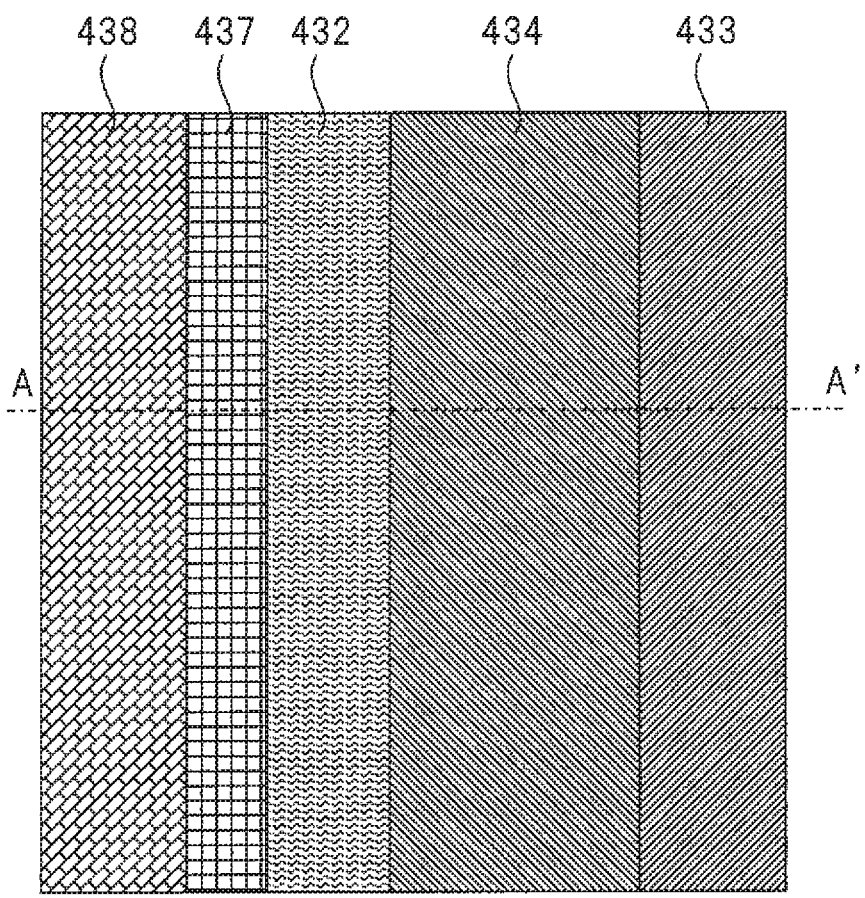
FIG. 68 is a principal portion plan view during the process of manufacturing the optical modulator, which follows FIG. 67.
Figure 69:
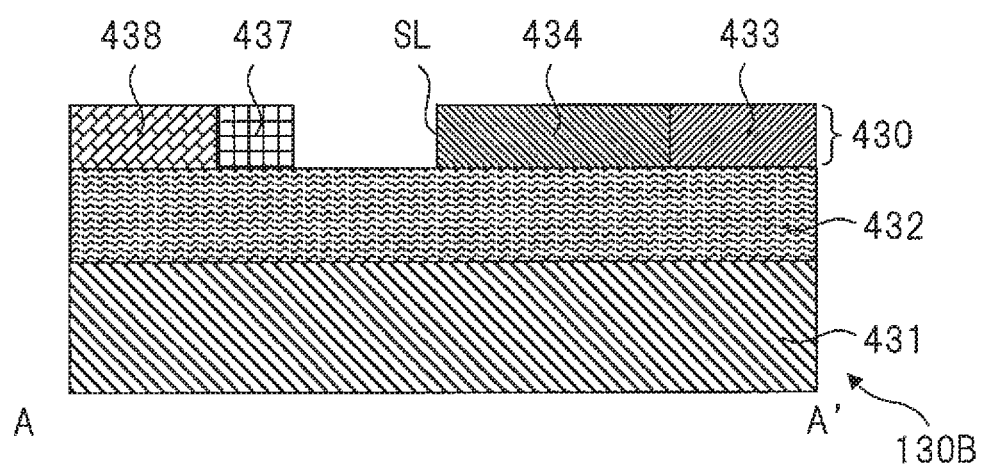
FIG. 69 is a principal portion sectional view along an A-A' line of FIG. 68.

FIGS. 68 and 69 are a principal portion plan view and a principal portion sectional view during the manufacturing process following FIG. 67. Anisotropic dry etching such as RIE is applied to the single crystal silicon layer 430, using a photoresist film (not illustrated) or the like as a mask, and a part of the p⁻ type semiconductor region 437 is removed by about a width of 400 nm.

Figure 70:
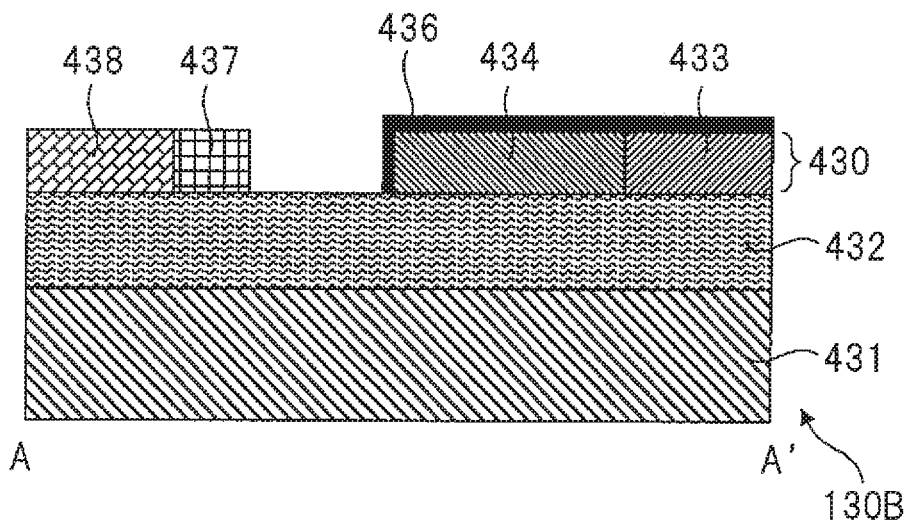
FIG. 70 is a principal portion sectional view during the process of manufacturing the optical modulator, which follows FIG. 69.

FIG. 70 is a principal portion sectional view during the manufacturing process following FIG. 69. By applying thermal oxidation to a surface of the single crystal silicon layer 430, the gate insulating film 436 is formed to have a film thickness of about 4 to 6 nm, for example, and next, the gate insulating film formed on the p⁺ type semiconductor region 438 and the p⁻ type semiconductor region 437 is selectively removed.

Figure 71:
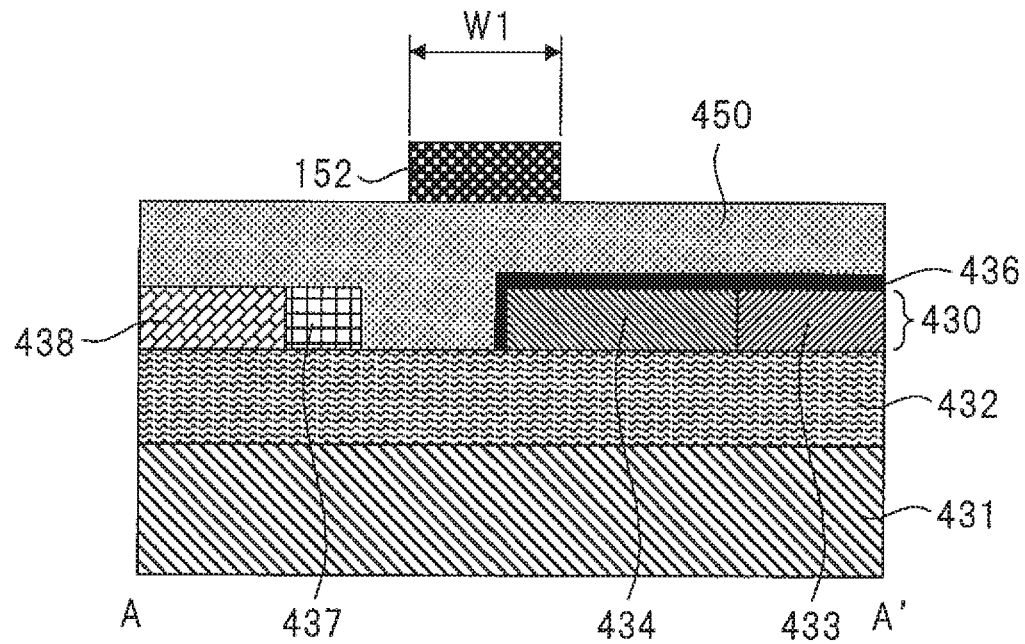
FIG. 71 is a principal portion sectional view during the process of manufacturing the optical modulator, which follows FIG. 70.

FIG. 71 is a principal portion sectional view of the manufacturing process following FIG. 70. An amorphous silicon layer 450 is deposited on the gate insulating film 436 by a CVD method or the like, and a core forming mask 152 with a width W1 is formed on the amorphous silicon layer 450. The core forming mask 152 is made of a silicon oxide film, for example. Next, the anisotropic dry etching such as RIE is applied to the amorphous silicon layer 450, and the amorphous silicon layer 450 remains only in the region coated with the core forming mask 152. Next, the core forming mask 152 is removed. Note that the core forming mask 152 may remain.

Figure 72:
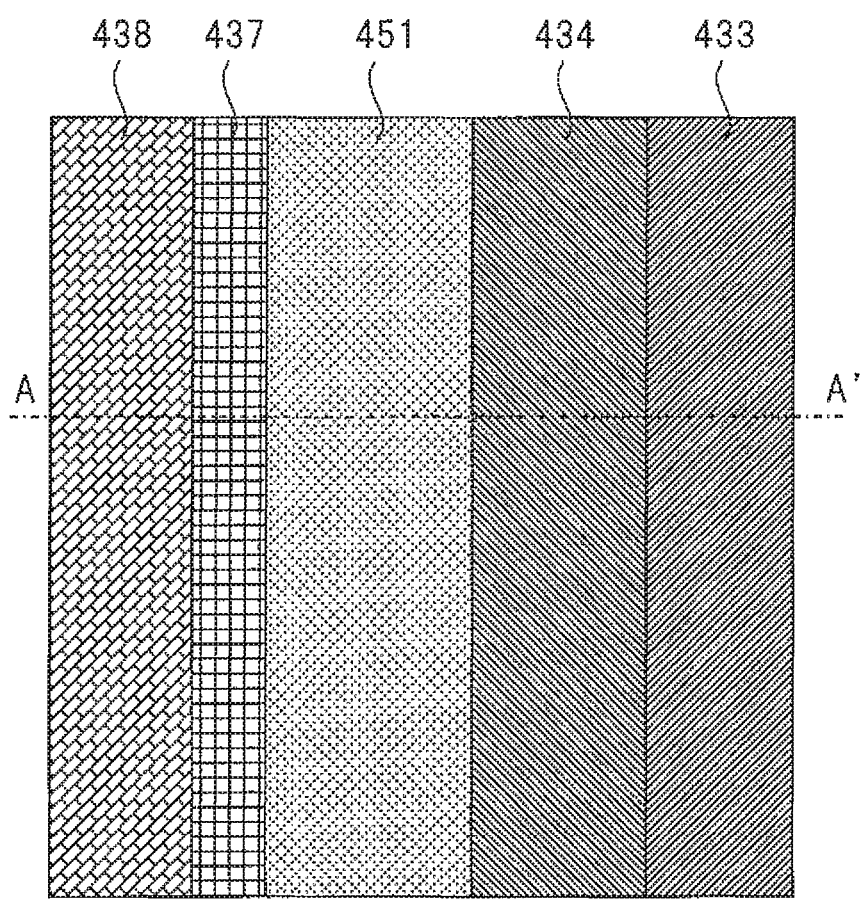
FIG. 72 is a principal portion plan view during the process of manufacturing the optical modulator, which follows FIG. 71.
Figure 73:
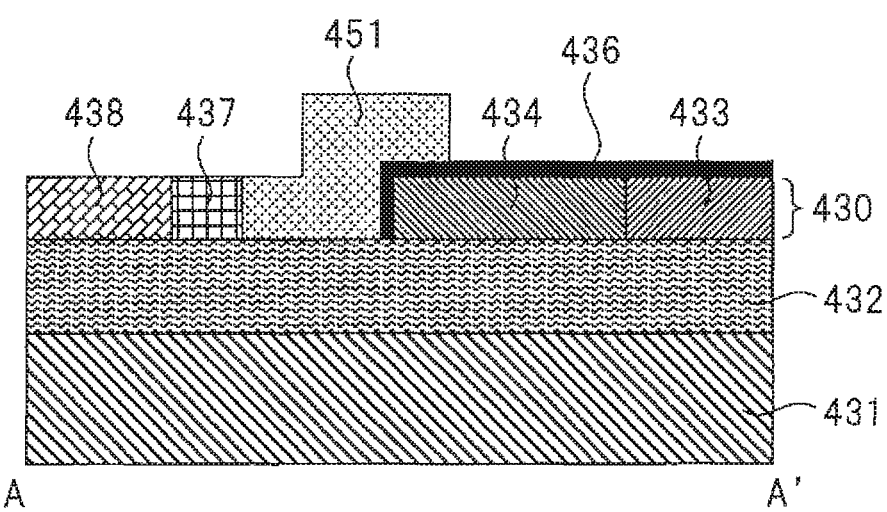
FIG. 73 is a principal portion sectional view along an A-A' line of FIG. 72.

FIGS. 72 and 73 are a principal portion plan view and a principal portion sectional view during the manufacturing process following FIG. 71. Thermal treatment is applied to the patterned amorphous silicon layer 450, and the amorphous silicon layer 450 is formed into the p-type crystal silicon layer 451. The amorphous silicon layer 450 is in contact with the p⁻ type semiconductor region 437 made of the single crystal silicon layer 430. Therefore, by crystallizing the amorphous silicon layer 450 using the p⁻ type semiconductor region 437 as a core, the p-type crystal silicon layer 451 is formed. The p-type crystal silicon layer 451 is a low-impurity concentration region equivalent to the p⁻ type semiconductor region 437.

Further, after a process of forming the interlayer insulating film 439, the conductor plug 142, and the electrodes 111 and 112 is performed, the optical modulator 115F of the seventh embodiment illustrated in FIG. 65 is completed.

The width W1 of the optical waveguide core 421 is determined by a mask width when patterning the amorphous silicon layer 450. Therefore, manufacturing accuracy thereof is about ±5 nm, and highly accurate control becomes possible without being affected by alignment accuracy of the mask.

Further, both of the p-type crystal silicon layer 451 that configures the optical waveguide core 421 and the n⁻ type semiconductor region 434 are formed of a crystal silicon layer. Therefore, an optical loss of the optical modulator 115F is decreased.

As described above, the invention made by the inventor has been specifically described on the basis of the embodiments. The present invention is not limited by the embodiments, and various modifications can be made without departing from the scope of the invention.

REFERENCE SIGNS LIST 115 optical modulator
121 optical waveguide core
134 n⁻ type semiconductor region
136 gate insulating film
137 p⁻ type semiconductor region

The invention claimed is:
1. An optical modulator comprising:
a first crystal silicon layer of a first conductivity type;
a second crystal silicon layer having a second conductivity type opposite to the first conductivity type, and arranged on the first crystal silicon layer;
a gate insulating film lying between the first crystal silicon layer and the second crystal silicon layer;
a first electrode electrically connected to the first crystal silicon layer; and
a second electrode electrically connected to the second crystal silicon layer;
a first fin extending from the second side wall of the first crystal silicon layer to side opposite to the first side wall; and
a second fin extending from the third side wall of the second crystal silicon layer to a side opposite to the fourth side wall, wherein
the first crystal silicon layer includes a first side wall and a second side wall facing each other, and the second crystal silicon layer includes a third side wall and a fourth side wall facing each other,
a first width of the first crystal silicon layer, the first width being a distance from the first side wall to the second side wall, and a second width of the second crystal silicon layer, the second width being a distance from the third side wall to the fourth side wall, are equal,
the first side wall is positioned in a position where the first side wall is layered with the third side wall, and the second side wall is positioned in a position where the second side wall is layered with the fourth side wall,
the first crystal silicon layer, the gate insulating film, and the second crystal silicon layer configure an optical waveguide core, and
a refractive index of the optical waveguide core is changed by applying an electrical signal to the first electrode and the second electrode.
2. The optical modulator according to claim 1, wherein the first side wall, the second side wall, the third side wall, and the fourth side wall are coated with an interlayer insulating film.
3. The optical modulator according to claim 1, further comprising:
an insulating film arranged adjacent to the first side wall and arranged below the second fin through the gate insulating film.
4. The optical modulator according to claim 1, further comprising:
a high resistance layer arranged adjacent to the first side wall and arranged below the second fin through the gate insulating film.
5. The optical modulator according to claim 4, wherein resistivity of the high resistance layer is 100 times or more of resistivity of the first crystal silicon layer.
6. The optical modulator according to claim 1, further comprising:
a semiconductor region of the second conductivity type arranged adjacent to the first side wall and arranged below the second fin through the gate insulating film.
7. The optical modulator according to claim 1, wherein an extending direction of the optical waveguide core is an <11-2> direction, and extending directions of the first fin and the second fin are an <-1-1-2> direction.

* * * * *